(12) United States Patent
Delurgio et al.

(10) Patent No.: US 7,130,811 B1
(45) Date of Patent: *Oct. 31, 2006

(54) APPARATUS FOR MERCHANDISE PROMOTION OPTIMIZATION

(75) Inventors: Phil Delurgio, Walnut Creek, CA (US); Hua Lee, Los Altos, CA (US); Michael Neal, San Francisco, CA (US); Rob Parkin, San Francisco, CA (US); Suzanne Valentine, Atlanta, GA (US); Krishna Venkatraman, Menlo Park, CA (US)

(73) Assignee: DemandTec, Inc., San Carlos, CA (US)

( * ) Notice: Subject to any disclaimer, the term of this patent is extended or adjusted under 35 U.S.C. 154(b) by 1089 days.

This patent is subject to a terminal disclaimer.

(21) Appl. No.: 09/849,621

(22) Filed: May 5, 2001

(51) Int. Cl.
*G06Q 99/00* (2006.01)
(52) U.S. Cl. .......................... 705/10; 705/400
(58) Field of Classification Search .................. 705/10, 705/400
See application file for complete search history.

(56) References Cited

U.S. PATENT DOCUMENTS

| | | | |
|---|---|---|---|
| 3,017,610 A * | 1/1962 | Auerbach et al. | 340/146.2 |
| 4,744,026 A | 5/1988 | Vanderbei | |
| 5,063,506 A | 11/1991 | Brockwell et al. | |
| 5,117,354 A | 5/1992 | Long et al. | |
| 5,212,791 A | 5/1993 | Damian et al. | |
| 5,249,120 A | 9/1993 | Foley | |
| 5,299,115 A | 3/1994 | Fields et al. | 364/401 |
| 5,377,095 A | 12/1994 | Maeda et al. | 705/10 |
| 5,459,656 A | 10/1995 | Fields et al. | 364/401 |
| 5,521,813 A | 5/1996 | Fox et al. | |
| 5,615,109 A | 3/1997 | Eder | |
| 5,694,551 A | 12/1997 | Doyle et al. | |
| 5,712,985 A | 1/1998 | Lee et al. | |
| 5,732,401 A | 3/1998 | Conway | 705/29 |
| 5,765,143 A | 6/1998 | Sheldon et al. | |
| 5,790,643 A | 8/1998 | Gordon et al. | |
| 5,799,286 A * | 8/1998 | Morgan et al. | 705/30 |

(Continued)

FOREIGN PATENT DOCUMENTS

WO  WO 98/53415  11/1998

OTHER PUBLICATIONS

Montgomery, A. "Creating Micro-Marketing Pricing Strategies Using Supermarket Scanner Data", Marketing Science, vol. 16, No. 4, 1997 (pp. 315-337).*

(Continued)

*Primary Examiner*—Susanna M. Diaz
(74) *Attorney, Agent, or Firm*—Richard K. Huffman; James W. Huffman; Kang S. Lim

(57) ABSTRACT

Apparatus and method for determining an optimum promotion plan for merchandising of products for sale. A scenario/results processor enables a user to prescribe an optimization scenario, and presents the optimum promotion plan to the user, where the optimum promotion plan is determined by execution of the optimization scenario. The demand engine models relationships between potential prices of the products and market demand for the products, where the potential prices correspond to potential promotion events and potential supplier offers. The activity based cost engine estimates demand chain costs for the products based upon the market demand. The promotion optimization engine employs the market demand and the demand chain costs to determine the optimum promotion plan, where the optimum promotion plan maximizes a merchandising performance figure of merit according to the optimization scenario, and where the optimum promotion plan comprises a subset of the promotion events and potential supplier offers.

11 Claims, 44 Drawing Sheets

U.S. PATENT DOCUMENTS

| | | | |
|---|---|---|---|
| 5,822,736 | A | 10/1998 | Hartman et al. |
| 5,873,069 | A | 2/1999 | Reuhl et al. |
| 5,878,400 | A | 3/1999 | Carter, III |
| 5,918,209 | A | 6/1999 | Campbell et al. |
| 5,933,813 | A | 8/1999 | Teicher et al. |
| 5,987,425 | A | 11/1999 | Hartman et al. |
| 6,009,407 | A | 12/1999 | Garg |
| 6,029,139 | A * | 2/2000 | Cunningham et al. ........ 705/10 |
| 6,032,123 | A | 2/2000 | Jameson |
| 6,032,125 | A | 2/2000 | Ando |
| 6,044,357 | A | 3/2000 | Garg ........................... 705/10 |
| 6,052,686 | A | 4/2000 | Fernandez et al. |
| 6,078,893 | A | 6/2000 | Ouimet et al. |
| 6,094,641 | A * | 7/2000 | Ouimet et al. ................ 705/10 |
| 6,125,355 | A | 9/2000 | Bekaert et al. |
| 6,134,534 | A | 10/2000 | Walker et al. |
| 6,173,345 | B1 | 1/2001 | Stevens |
| 6,202,070 | B1 | 3/2001 | Nguyen et al. |
| 6,205,431 | B1 | 3/2001 | Willemain et al. ............ 705/10 |
| 6,308,162 | B1 | 10/2001 | Ouimet et al. |
| 6,321,207 | B1 | 11/2001 | Ye ................................ 705/8 |
| 6,341,268 | B1 | 1/2002 | Walker et al. ................ 705/15 |
| 6,341,269 | B1 | 1/2002 | Dulaney et al. .............. 705/22 |
| 6,397,193 | B1 | 5/2002 | Walker et al. ................ 705/16 |
| 6,405,175 | B1 | 6/2002 | Ng |
| 6,456,986 | B1 | 9/2002 | Boardman et al. .......... 705/400 |
| 6,546,387 | B1 | 4/2003 | Triggs |
| 6,553,352 | B1 * | 4/2003 | Delurgio et al. ............ 705/400 |
| 6,567,824 | B1 | 5/2003 | Fox ............................. 707/104 |
| 6,684,193 | B1 | 1/2004 | Chavez et al. ................. 705/8 |
| 6,697,824 | B1 | 2/2004 | Bowman-Amuah |
| 6,725,208 | B1 | 4/2004 | Hartman et al. .............. 706/23 |
| 6,731,998 | B1 | 5/2004 | Walser et al. |
| 6,826,538 | B1 | 11/2004 | Kalyan et al. |
| 6,910,017 | B1 | 6/2005 | Woo et al. |
| 6,934,931 | B1 | 8/2005 | Plumer et al. |
| 6,965,867 | B1 | 11/2005 | Jameson |
| 2002/0023001 | A1 | 2/2002 | McFarlin et al. |
| 2002/0042739 | A1* | 4/2002 | Srinivasan et al. ........... 705/14 |
| 2002/0107819 | A1 | 8/2002 | Ouimet |
| 2002/0116348 | A1 | 8/2002 | Phillips et al. |
| 2002/0123930 | A1* | 9/2002 | Boyd et al. .................... 705/14 |
| 2002/0198794 | A1 | 12/2002 | Williams et al. |
| 2003/0110072 | A1 | 6/2003 | Delurgio et al. .............. 705/10 |

OTHER PUBLICATIONS

Little, JD "BRANDAID: A marketing-Mix Model, Part 1: Structure" Operations Research, vol. 23, No. 4, Jul.-Aug. 1975 (p. 628-655).*

Abraham, M. "An Implemented System For Improving Promotion Productivity" Marketing Science, 1993 (p. 248-269).*

Abraham, M. "Promoter: An Automated Promotion Evaluation System" Marketing Science, 1987 (p. 101-123).*

Cerf, V. and R.E. Kahn, "A Protocol For Packet Network Interconnection," IEEE Transactions On Communications COM-22, May 1974, (p. 637-648).*

Berners-Lee, T. "Hypertext Markup Language 2.0 Working Paper," Nov. 1995 (pp. 1-3).*

Flanagan, D. JavaScript: The Defiitive Guide, 3rd Edition, published by O'Reilly in Jun. 1998 (ISBN: 1-56592-392-8) section 14.8.*

Buzzell, DB "The Costly Bargin of Trade Promotion" Harvard Business Review, Mar.-Apr. 1990 (p. 141-149).*

Tellis, G. "Tackling The Retailer Decision Maze: Which Brands To Discount, How Much, When and Why," Marketing Science vol. 1, No. 34, year 1995 (pp. 271-299).*

Smith et al. "A Discrete Optimization Model for Seasonal Merchandise Planning." Journal of Retailing, vol. 74, No. 2, p. 193(29), Summer 1998.*

Barth, Brad. "ShopKo Holds the Price Line." Daily News Record, p. 10, Oct. 4, 2000.*

"Essentus and Spotlight Solutions Partnership Delivers Precise Markdown Decisions." Business Wire, p. 1444, Apr. 17, 2000.*

"Manugistics Agrees to Acquire Talus Solutions." PR Newswire, p. NA, Sep. 21, 2000.*

"Goodyear Implements Trilogy's MultiChannel Pricing Solutions as Its Enterprise-Wide E-Pricer Platform." Business Wire, p. 2286, Jun. 27, 2000.*

"IMRglobal Signs New Product Implementation Agreement with Retek to Improve Retail Pricing and Markdown Process." Business Wire, p. 1590, Jun. 7, 2000.*

"New Tools for Modeling Elasticity, Optimizing Prices and Collecting Live Pricing from the Web to Debut at Retail Systems 2000 in Chicago." Business Wire, p. 1484, Apr. 18, 2000.*

"KhiMetrics and Retek Form Marketing Alliance for Comprehensive Retail Pricing Solution." PR Newswire, p. NA, Feb. 19, 2001.*

"KhiMetrics Helps Retailers Increase Margins With Two New Tools for Their Retail Revenue Management Application Suite." PR Newswire, Mar. 1, 2001.*

"Merriam Webster's Collegiate Dictionary", $10^{th}$ edition, p. 585, Merriam-Webster Incorporated, 1999.

Hernandez, Mauricio A., and Salvatore J. Stolfo, "Real-world Data is Dirty: Data Cleansing and the Merge/Purge Problem", Data Mining and Knowledge Discovery, vol. 2, Issue 1, Jan. 1998.

Alan L. Montgomery and Peter R. Rossi, "Estimating Price Elasticities with Theory-Based Priors," Journal of Marketing Research vol. XXXVI, Nov. 1999 (pp. 413-423).

Boatwright, Peter et al., "Account-Level Modeling for Trade Promotion: An Application of a Constrained Parameter Hierarchical Model," Journal of the American Statistical Association, vol. 94, No. 448, Dec. 1999 (pp. 1063-1073).

Alan L. Montgomery, "Creating Micro-Marketing Pricing Strategies Using Supermarket Scanner Data," Marketing Science, vol. 16, No. 4, 1997 (pp. 315-337).

Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp. 304-315).

Arnold Zellner, "On Assessing Prior Distribution sand Bayesian Regression Analysis With G-Prior Distributions," Elsevier Science Publishers, 1986 (pp. 233-243).

A.F.M. Smith, "A General Bayesian Linear Model," University of Oxford, Apr. 1972.

D. V. Lindley and A.F.M. Smith, "Bayes Estimates for the Linear Model," University College, Dec. 1971.

George C. Tiao and Arnold Zellner, "On the Bayesian Estimation of Multivariate Regression," University of Wisconsin, Jan. 1964.

Arnold Zellner, "An Efficient Method of Estimating Seemingly Unrelated Regressions and Tests for Aggregation Bias," University of Wisconsin, Jun. 1962.

"PCT International Search Report", Application No. PCT/US03/30488, mailed Jan. 28, 2004.

Bruce G.S. Hardie et al., "Attribute-based Market Share Models: Methodological Development and Managerial Applications", University of Pennsylvania, Working Paper 98-009, pp. 1-48, 1998.

Rossi, Delorgio, & Kantor; "Making Sense of Scanner Data;" Harvard Business Review, Reprint F00205, 2000.

"Pacificorp IRP: Renewables Costs Must Drop 65% to be Competitive with Gas," dated Dec. 8, 1995.

Robert J. Dolan, "How Do You Know When the Price is Right?", Harvard Business Review, Sep.-Oct. 1995, p. 4-11.

"PCT International Search Report", Application No. PCT/US02/36710, mailed Jul. 21, 2003.

Yoeman, John Cornelius Jr., "The Optimal Offering Price for Underwritten Securities", 1993, vol. 55/01-A of Dissertation Abstracts International, p. 4743 (Abstract Only).

Montgomery: "The Impact of Micro-Marketing on Pricing Strategies", 1994 The University of Chicago, vol. 55/12-A of Dissertation Abstracts International, p. 3922 (Abstract only).

Busch: "Cost modeling as a technical management tool", Reasearch-Technology Management, Nov./Dec. 1994, vol. 37, No. 6, pp. 50-56.

"Pacificorp IRP: Renewables Costs Must Drop 65% to be Competitive with Gas."

"Report of Novelty Search" by Patentec, dated Jul. 25, 2001.

Stephen J. Hoch et al., "Store Brands and Category Management", The Wharton School, University of Pennsylvania, Mar. 1998, pp. 1-38.

Bruce G.S. Hardie et al., "Attribute-based Market Share Models: Methodological Development and Managerial Applications", The Wharton School, University of Pennsylvania, Working Paper 98-009, pp. 1-48.

Alan Mercer, "Non-linear Price Effects", Journal of the Market Research Society, dated Jul. 1, 1996, p. 227.

Rockney G. Walters, "Assessing the Impact of Retail Price Promotions on Product Substitution, Complementary Purchase, and Interstore Sales Displacement", Journal of Marketing, vol. 55, Apr. 1991, pp. 17-28.

Robert C. Blattberg et al., "How Promotions Work", Marketing Science, vol. 14, No. 3, Part 2 of 2, 1995, pp. G122-G132.

Peter M. Guadagni et al., "A Logit Model of Brand Choice Calibrated on Scanner Data", Marketing Science, vol. 2, No. 3, Summer 1983, pp. 203-238.

Lee G. Cooper et al., "Standardizing Variables in Multiplicative Choice Models", Journal of Consumer Research, vol. 10, Jun. 1983, pp. 96-108.

Eileen Bridges et al., "A High-Tech Product Market Share Model with Customer Expectations" Marketing Science, vol. 14, No. 1, Winter 1995, pp. 61-81.

Richard R. Batsell, et al., "A New Class of Market Share Models", Marketing Science, vol. 4, No. 3, Summer 1985, pp. 177-198.

Jagmohan S. Raju, "The Effect of Price Promotions on Variability in Product Category Sales", Marketing Science, vol. 11, No. 3, Summer 1992, pp. 207-220.

Robert J. Dolan, "How Do You Know When the Price Is Right?", Harvard Business Review, Sep.-Oct. 1995, pp. 5-11.

Fusun Gonul, "Modeling Multiple Sources of Heterogeneity in Multinomial Logit Models: Methodological and Managerial Issues", Marketing Science, vol. 12, No. 3, Summer 1993, pp. 213-229.

Robert M. Schindler et al., "Increased Consumer Sales Response through Use of 99-Ending Prices", Journal of Retailing, Jun. 1, 1996, p. 187.

Francis J. Mulhern et al., "The Relationship between Retail Price Promotions and Regular Price Purchases", Journal of Marketing, vol. 59, Oct. 1995, pp. 83-90.

John Deighton et al., "The Effects of Advertising on Brand Switching and Repeat Purchasing", Journal of Marketing Research, vol. XXXI, Feb. 1994, pp. 28-43.

Sunil Gupta, "Reflections on 'Impact of Sales Promotions on When, What, and How Much to Buy'", Journal of Marketing Research, vol. XXX, Nov. 1993, pp. 522-524.

Richard A. Briesch, "Does It Matter How Price Promotions Are Operationalized?", Marketing Letters 8:2 (1997), pp. 167-181.

Byung-Do Kim et al., "Modeling the Distribution of Price Sensitivity and Implications for Optimal Retail Pricing", Journal of Business & Economic Statistics, Jul. 1995, vol. 13, No. 3.

William R. Dillon et al., "A Segment-level Model of Category Volume and Brand Choice", Marketing Science, vol. 15, No. 1, 1996, pp. 38-59.

Stephen J. Hoch et al., "Determinants of Store-Level Price Elasticity", Journal of Marketing Research, vol. XXXII (Feb. 1995), pp. 17-29.

Magid M. Abraham et al., "An Implemented System for Improving Promotion Productivity Using Store Scanner Data", Marketing Science, vol. 12, No. 3, Summer 1993.

Peter S. Fader et al., "Modeling Consumer Choice among SKUs", Journal of Marketing Research, vol. XXXIII (Nov. 1996), pp. 442-452.

Rossi, Delurgio, & Kantor; "Making Sense of Scanner Data;" Harvard Business Review, Reprint F00205.

Bucklin & Gupta, "Brand Choice, Purchase Incidence, and Segmentation: An Integrated Modeling Approach," Journal of Marketing Research, May 1992, pp. 201-215, vol. XXIX.

Smith, Mathur, & Kohn; "Bayesian Semiparametric Regression: An Exposition and Application to Print Advertising;" Jan. 3, 1997; Austrailian Graduate School of Management, University of New South Wales, Sydnet 2052, Austrailia.

Blattberg and Deighton, "Manage Marketing by the Customer Equity;" Harvard Business Review, Jul.-Aug. 1996, pp. 136-144.

Christen, Gupta, Porter, Staelin, & Wittink; "Using Market-Level Data to Understand the Effectiveness of Promotional Activities;" Dec. 22, 1995.

Link, "Are Aggregate Scanner Data Models Biased?," Journal of Advertising Research, Sep./Oct. 1995, pp. RC8-RC12, ARF.

Russell & Kamakura, "Understanding Brand Competition Using Micro and Macro Scanner Data," Journal of Marketing Research, vol. XXXI (May 1994), pp. 289-303.

Jones, "The Double Jeopardy of Sales Promotions," Harvard Business Review, Sep.-Oct. 1999, pp. 145-152.

Buzzell, Quelch, & Salmon; "The Costly Bargain of Trade Promotion;" Harvard Business Review, Reprint 90201, Mar.-Apr. 1990, pp. 1-9.

Curry, Divakar, Mathur, & Whiteman; "BVAR as a Category Management Tool: An Illustration and Comparison with Alternative Techniques;" Journal of Forecasting, vol. 14, Iss No. 3 (1995), pp. 181-199.

Gural, "Price Optimization System;" Letter to Kang Lim, ESQ., DTD Feb. 9, 2001, Patentec, Reference No. 7220.

Scherage, Dan, "You Do the Math," Chain Store Age, v76, n7, Jul. 2000.

Binkley, James K.; Connor, John M.; "Grocery Market Pricing and the New Competitive Environment." Journal of Retailing, v74, n2, Summer 1998.

"Report of Novelty Search," DTD Feb. 9, 2001, Patentec, Reference No. 7220, Feb. 9, 2001.

"Gymboree Enhances Price Management," Retail Systems Alert, vol. 13, No. 6, Jun. 2000.

"PCT International Search Report," Application No. PCT/US02/14977, mailed May 5, 2003.

Dyer et al., "Case Studies in Marketing Decisions Using Expert Choice," Decision Support Software, 1988, pp. 2-7, 73-108.

Barth, Brad, "Shopko Tests Automated Markdowns", WWD Oct. 4, 2000, pp. 1-3.

Cook, Martie, "Optimizing Space and Sales with Markdown Software", Office.com, May 31, 2000, p. 1.

"Essentus and Spotlight Solutions Partnership Delivers Precise Markdown Decisions", Business Wire, Apr. 17, 2000, 3 pages.

Melcer, Rachel, "Local Tech Firm Creates Retail Markdown Tool", Business Courier online, Mar. 24, 2000, pp. 1-4.

Technology Strategy Incorporated, www.grossprofit.com, Mar. 2, 2000, pp. 1-20.

Kadiyali et al., "Manufacturer-retailer Channel Interactions and Implications for Channel Power: An Investigation of Pricing in Local Market", Marketing Science, Spring 2000, V. 19, Issue 2.

Andrew B. Gelman et al., "Bayesian Data Analysis", pp. 439-455, Chapman & Hall/CRC, First Edition 1995, Reprinted 2000.

Hillier, Frederick S., et al., "Introduction to Operations Research", McGraw-Hill, Inc., 1995, Sixth Edition, pp. 1-14.

* cited by examiner

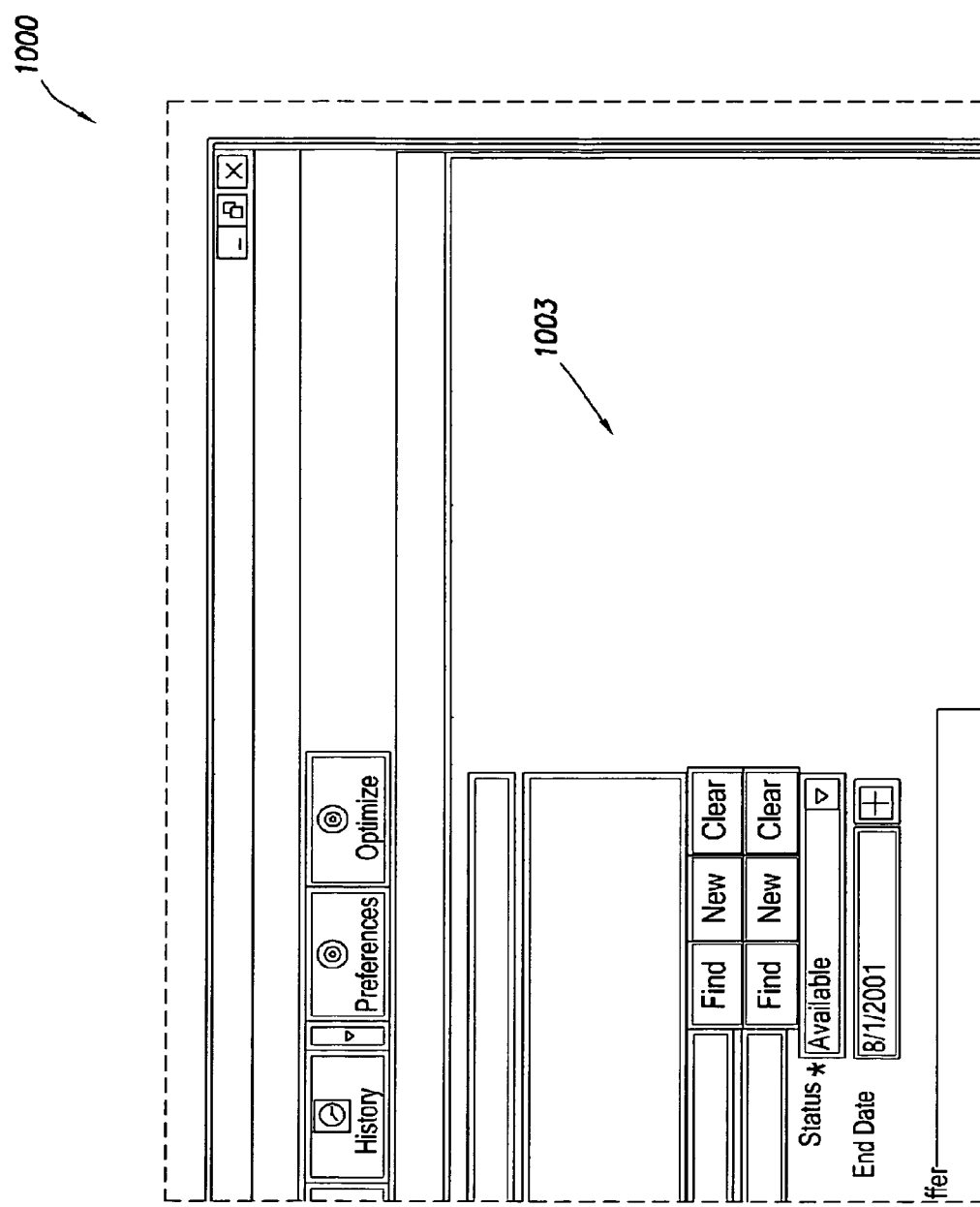

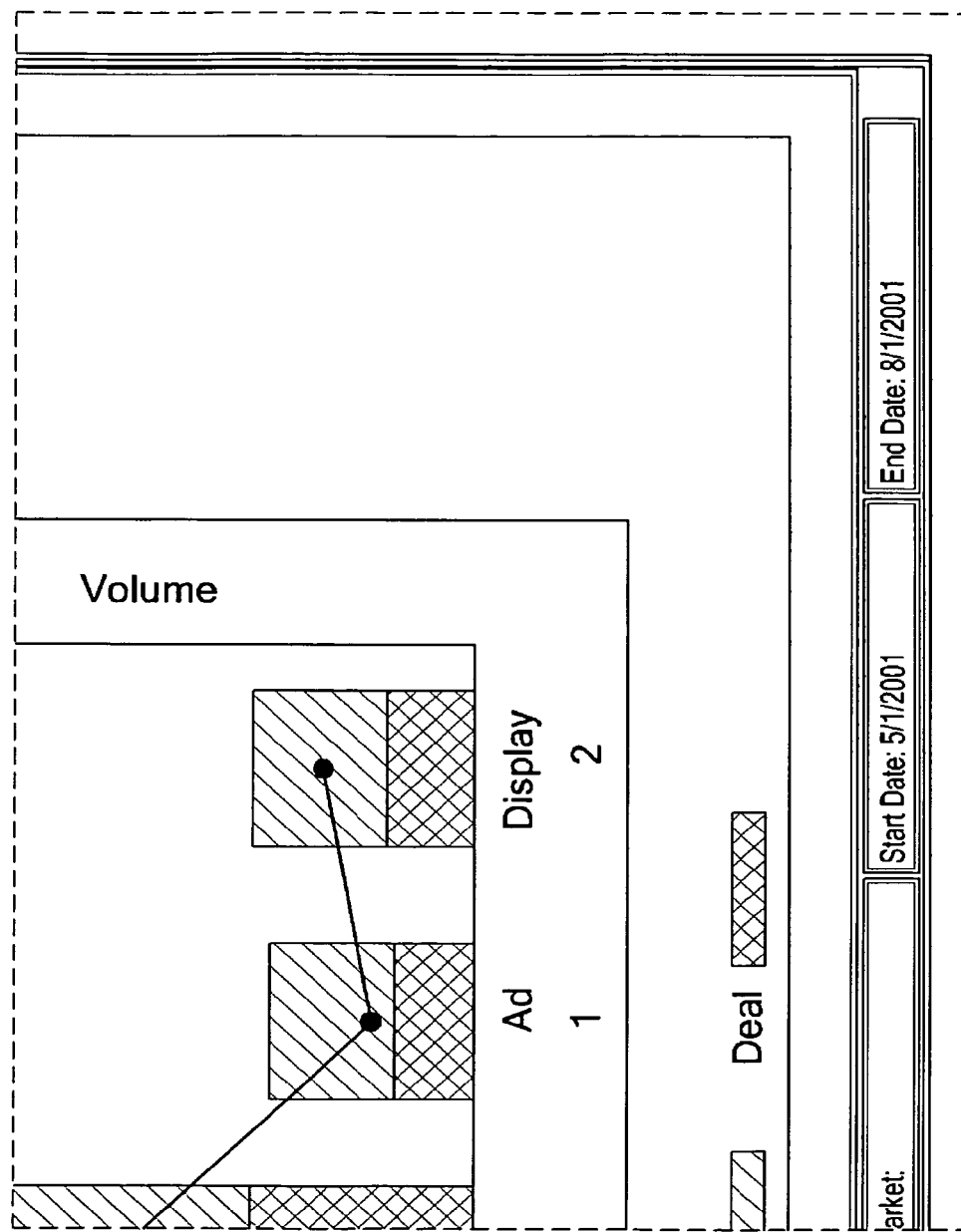

APPARATUS FOR MERCHANDISE PROMOTION OPTIMIZATION

CROSS-REFERENCE TO RELATED APPLICATIONS

This application is related to the following co-pending U.S. patent applications, all of the applications having a common assignee, common inventors, and filed on the same day as this application.

Ser. No. 09/849,168, titled APPARATUS FOR MERCHANDISE PRICE OPTIMIZATION

Ser. No. 09/741,958, titled SYSTEM FOR CREATING OPTIMIZED PROMOTION EVENT CALENDAR

BACKGROUND OF THE INVENTION

1. Field of the Invention

This invention relates in general to the field of econometrics, and more particularly to an apparatus and method for determining optimum promotion strategies for a set of products, where the optimum promotion strategies are determined to maximize a merchandising figure of merit such as revenue, profit, or sales volume.

2. Description of the Related Art

Today, the average net profit generated chains and individual stores within the consumer products retail industry is typically less than two percent of sales. In other words, these stores make less than two dollars profit for every one hundred dollars in revenue. Stores in this industry walk a very fine line between profitability and bankruptcy. Consequently, in more recent years, those skilled within the merchandising arts have studied and developed techniques to increase profits. These techniques are geared toward the manipulation of certain classes of merchandising variables, or "levers." In broad terms, these merchandising levers fall into five categories: price (i.e., for how much a product is sold), promotion (i.e., special programs, generally limited in time, to incite consumers to purchase particular products), space (i.e., where within a store particular products are displayed), logistics (i.e., how much of and when a product is ordered, distributed, and stocked), and assortment (i.e., the mix of products that are sold within a chain or individual store). It has long been appreciated that manipulating certain attributes within each of these "levers" can result in increased sales for some products, while resulting in decreased sales for other, related products. Therefore, it is no surprise that managers within the consumer products merchandising industry are very disinclined to make any types of changes without a reasonably high confidence that the changes will result in increased profits. The margin for error is so small that the implementation of any wrong decision could mean the difference between a profitable status and an unprofitable status.

Ad hoc methods for manipulating merchandising variables in order to increase profits have been employed for years within the industry. And a whole system of conventional wisdoms regarding how to manipulate certain levers has developed, to the extent that courses of undergraduate and graduate study are offered for the purpose of imparting these conventional wisdoms to future members of the industry. For example, category managers (i.e., those who are responsible for marketing a category of related products within a chain of stores) are inclined to believe that high-volume products possess a high price elasticity. That is, the category managers think that they can significantly increase sales volume for these products by making small price adjustments. But this is not necessarily true. In addition, category managers readily comprehend that products displayed at eye level sell better than those at floor level. Furthermore, it is well known that a store can sell more of a particular product (e.g., dips and salsa) when the particular product is displayed next to a complementary product (e.g., chips). Moreover, ad hoc psychological lever manipulation techniques are employed to increase sales, such as can be observed in some stores that constrain the values of particular price digits (e.g., $1.56 as opposed to $1.99) because conventional insights indicate that demand for some products decreases if those products have prices that end in "9."

Although experiential lessons like those alluded to above cannot be applied in a deterministic fashion, the effects of manipulating merchandising variables can most definitely be modeled statistically with a high degree of accuracy. Indeed, there is a quantifiable relationship between each of these merchandising levers and consumer demand for a product, or group of products, within a store, or a group of stores in a retail chain. And the relationship between these levers and consumer demand can be accurately modeled, as long as the modeling techniques that are employed take into account a statistically sufficient number of factors and data such that credible and unbiased results are provided. Examples of these factors include price and sales history as a function of time (e.g., day of the week, season, holidays, etc.), promotion (e.g., temporary price reductions and other promotional vehicles) competition (e.g., price and sales history information for directly competitive products that are normally substitutes), and product size variations. Those skilled within the art typically refer to a model as is herein described as a demand model because it models the relationship between one or more merchandising levers and consumer demand for a group of products.

The degree to which demand for a particular product is correlated to a particular lever is called its "lever elasticity." For example, a product with a low price elasticity can undergo a significant change in price without affecting demand for the product; a high price elasticity indicates that consumer demand for the product is very susceptible to small price variations.

Demand models are used by product category mangers as stand-alone models, or as part of an integrated demand/promotion model. In the stand-alone application, a category manager inputs potential prices corresponding to promotional merchandising events for a product or product group, and the stand-alone model estimates sales for the product or product group. Accordingly, the category manager selects a set of promotion events and supplier offers to maximize sales of the product or product group based upon outputs of the stand-alone demand model. An integrated demand/promotion model typically models demand within a set of promotion event constraints (e.g., temporary price reductions, coupons, advertisements, displays, offers of suppliers during certain promotion events, etc.) provided by the category manager for a product or group of products and establishes an promotion scheme for the product or group of products based partially upon the price elasticity of the product or group of products and the objectives of the model analysis.

Notwithstanding the benefits that category managers are afforded by present day demand/promotion models, their broad application within the art has been constrained to date because of three primary limitations. First, present day demand/promotion models do not take into account the costs associated with providing a product for sale. These costs are referred to as distribution chain costs, or demand chain costs. They are the real costs incurred to purchase, store, distribute, stock, and sell a particular product. Because demand chain costs are not considered, present day models can only determine prices/promotion schemes as a function of demand to maximize sales, or revenue. But one skilled in the art will appreciate that establishing product promotion strategies to maximize revenue in an industry that averages less that two percent net profit may indeed result in decreased profits for a retailer because he/she could potentially sell less high-margin products and more low-margin products during a promotion event. Hence, determining a promotion strategy based upon demand alone can only maximize volume or revenue, not profit. And profit is what makes or breaks a business. Secondly, present day demand/promotion models typically estimate price elasticity for a given product or product group without estimating how changes in price due to a promotion event for the product or product group will impact demand for other, related products or product groups. For instance, present day demand/promotion models can estimate price elasticity for, say, bar soap, but they do not estimate the change in demand for, say, liquid soap, as a result of temporarily changing the prices of bar soap. Consequently, a soap category manager may actually decrease profits within his/her category by focusing exclusively on one subcategory of items without considering how changes within that one subcategory will affect demand for items within related subcategories. Finally, it is well appreciated within the art that present day statistical techniques do not necessarily yield optimum results in the presence of sparse and/or anomalous data.

Therefore, what is needed is a technique for determining optimum promotion strategies for products within a product category that considers the cost of the products as well as the demand for those products and other related products.

In addition, what is needed is a promotion plan optimization apparatus that models the relationship between the prices of products within a given subcategory due to a promotion event and the demand for products within related subcategories.

Furthermore, what is needed is a method for optimizing a promotion plan for products within a plurality of subcategories, where the method for optimizing the promotion plan maximizes a particular merchandising figure of merit that is a function of demand chain costs as well as market demand.

SUMMARY OF THE INVENTION

The present invention provides a superior technique for determining an optimum promotion strategy for products within a product category. Contrasted with present day optimization systems that consider only gross figures in their respective optimizations, promotion plans according to the present invention can be optimized to maximize merchandising figures of merit (e.g., net profit) that take into account demand chain costs associated with the products.

In one embodiment, an apparatus is provided for determining an optimum promotion plan for merchandising of products for sale. The apparatus has a scenario/results processor, a demand engine, an activity based cost engine, and a promotion optimization engine. The scenario/results processor enables a user to prescribe an optimization scenario, and presents the optimum promotion plan to the user, where the optimum promotion plan is determined by execution of the optimization scenario. The demand engine is coupled to the scenario/results processor. The demand engine models relationships between potential prices of the products and market demand for the products, where the potential prices correspond to potential promotion events and potential supplier offers. The activity based cost engine is coupled to the demand engine. The activity based cost engine estimates demand chain costs for the products based upon the market demand, where the demand chain costs include fixed and variable costs for the products for sale. The promotion optimization engine is coupled to the demand engine and the activity based cost engine. The promotion optimization engine employs the market demand and the demand chain costs to determine the optimum promotion plan, where the optimum promotion plan maximizes a merchandising performance figure of merit according to the optimization scenario, and where the optimum promotion plan comprises a subset of the promotion events and potential supplier offers.

One aspect of the present invention features a method for optimizing a promotion plan for merchandising products. The method includes utilizing a computer-based scenario/results processor within an optimization server to present a sequence of data entry templates to a user, whereby the user specifies an optimization scenario; within the optimization server, modeling the relationship between potential prices of the products and market demand for the products, where the potential prices correspond to potential promotion events and potential supplier offers; within the optimization server, estimating demand chain costs for the products according to the modeled market demand, wherein the demand chain costs include fixed and variable costs for the products; within the optimization server, employing the market demand and the demand chain costs to determine optimum promotion events and optimum supplier offers, where the optimum promotion events and optimum supplier offers maximize a merchandising performance figure of merit according to the optimization scenario; and generating a plurality of optimization results templates and providing these templates to the user, where the optimum promotion events and optimum supplier offers are presented. The utilizing includes first providing a promotion event configuration template, for prescribing the potential promotion events; second providing a supplier offer configuration template, for prescribing the potential supplier offers; and third providing a promotion scenario configuration template, for associating the potential promotion events to the products. The third providing includes specifying a forward buy method; enabling/disabling certain ones of the potential supplier offers; adding rules and constraints to the optimization scenario; and indicating store merchandising capacities.

Another aspect of the present invention contemplates a method for generating an optimum promotion plan, where the optimized promotion plan correspond to a set of products, a set of promotion events, and a set of supplier offers. The method includes, within a centralized data base, storing product attribute and sales history data for a plurality of stores, where the product attribute and sales history data corresponds to the set of products; first employing a web server to allow a plurality of supplier computers to prescribe the supplier offers; second employing a web server to provide a user computer with a plurality of scenario/result web pages, the plurality of scenario/result web pages enabling a user to prescribe the promotion events and constraints for generating the optimum promotion plan, wherein the user computer executes a thin web client to access the scenario/result web pages; and determining the optimum promotion plan to maximize either net profit, revenue, or volume, wherein the determining uses both modeled market demand and estimated demand chain costs corresponding to the set of products and where the estimated demand chain costs include fixed and variable costs corresponding to the set of products.

BRIEF DESCRIPTION OF THE DRAWINGS

These and other objects, features, and advantages of the present invention will become better understood with regard to the following description, and accompanying drawings where:

FIG. 11 is a diagram illustrating a supplier offer configuration area within the supplier offer configuration template of FIG. 10.

FIG. 13 is a diagram portraying a promotions area within the configuration template of FIG. 12.

FIG. 20 is a diagram showing a promotion scenario selection template within an optimization wizard according to the exemplary embodiment.

DETAILED DESCRIPTION

In light of the above background on the techniques employed by present day techniques for optimizing promotion strategies for a group of products within a store or group of stores, a detailed description of the present invention will be provided with reference to FIGS. 1 through 22. The present invention overcomes the limitations of present day demand/promotion models by providing a apparatus and methods that enable product managers to optimize promotion events for products within a product group. The optimization afforded by the present invention 1) employs demand chain cost figures to determine an optimum promotion plan for the products, and 2) takes into consideration the effects in demand that prices changes in one set of highly related products will cause in all other sets of highly related products within the product group.

Figure 1:
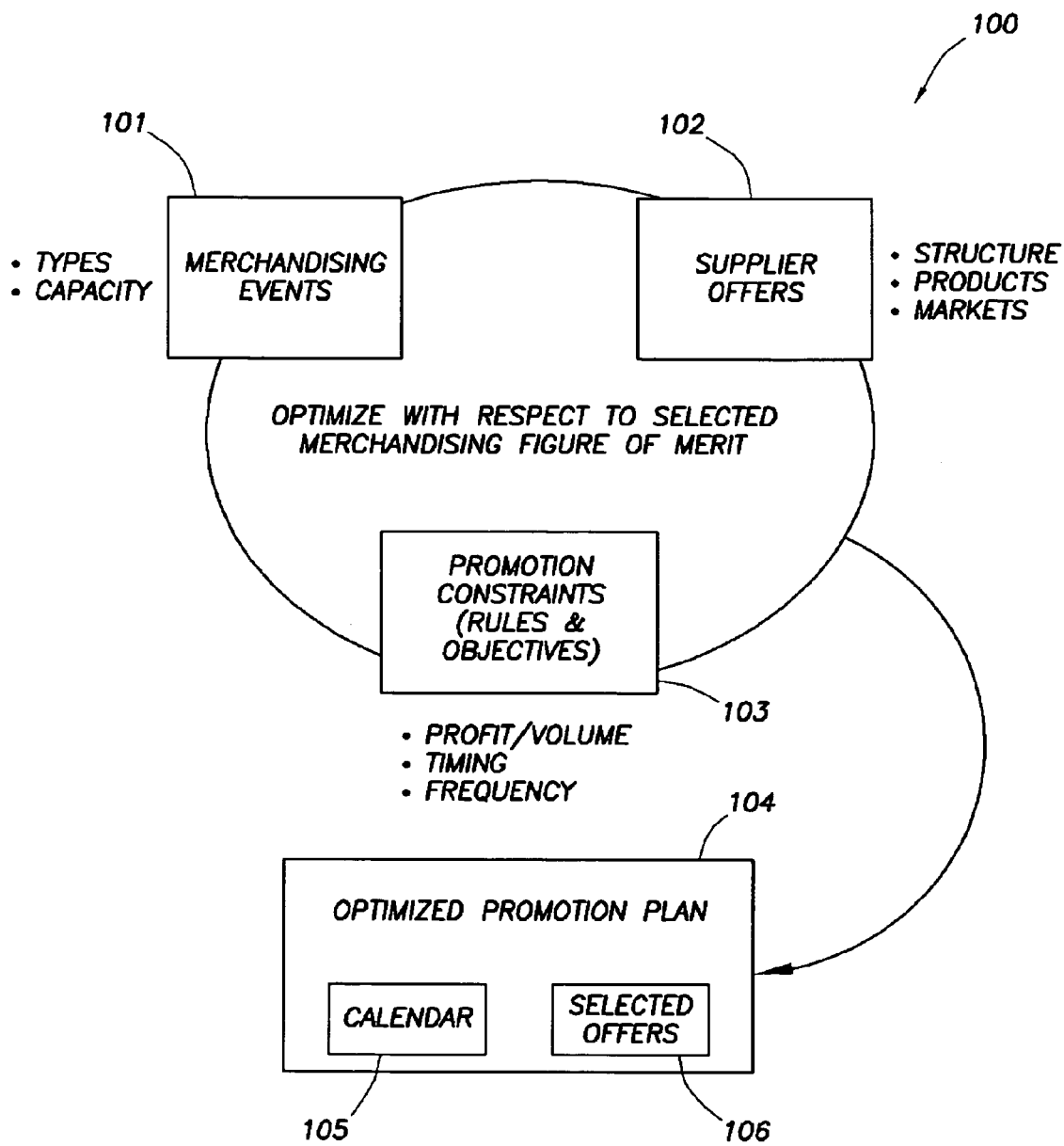
FIG. 1 is a diagram illustrating how elements of a promotion strategy are optimized to produce an optimized promotion plan according to the present invention.

Now referring to FIG. 1, a diagram 100 is presented illustrating how elements of a promotion strategy are optimized to produce an optimized promotion plan 104 according to the present invention. The diagram 100 shows three major categories of elements 101–103 that must be balanced in order to produce the optimized promotion plan 104: merchandising events 101, supplier offers 102, and rules and objectives 103.

First, a manager or retailer must select from a number of different types of merchandising, or promotional, events 101 according to the capacity that each participating store has for conducting the promotional events 101. Exemplary types of merchandising events 101 for a particular product of group of products include combinations of featured displays, advertising, and various forms of temporary price reductions (e.g., coupon, loyalty card, buy-one-get-one, etc.). Merchandising events 101 generally have a particular duration as well, where these combinations of displays, advertising, and price reductions change over the course of the events 101. For example, the first two weeks of a given event 101 may include newspaper inserts and a certain price reduction, while the remaining two weeks of the event 101 will not be advertised. In addition, stores that participate in a certain promotional event 101 have a particular capacity for participating in that event 101 and other events 101 that is a function of display and shelf space, advertising budget, and its ability to support volume associated with the events 101.

Second, the manager must select from a group of supplier offers 102 corresponding to products selected for promotion. For instance, a number of soap manufacturers may simultaneously offer a retailer different types of deals 102 on their corresponding products to include case allowances, accrual funds, percent off programs, rebates, scan programs, count/re-count programs, and fixed payments. To promote products within a product category, the manager must consider the type (i.e., structure) of the various offers 102 for the products, as well as markets for those products within the chain of stores that will be participating in the promotions.

Finally, the manager has to balance the promotion events 101 and supplier deals 102 against some global rules and constraints 103 for promotion that include timing and frequency of the promotions, and objectives of the promotion such as maximizing volume, revenue, profit, or some other merchandising figure of merit.

The output of a promotion strategy optimization according to the present invention is an optimized promotion plan 104 that includes a calendar 105 of merchandising events 101 for a product of group of products along with a set of selected supplier offers 106 for the product of group of products. The calendar 105 and selected offers 106 are based upon maximization of a selected merchandising figure of merit as described above.

Price changes due to a promotional event can be applied according to the present invention to shift consumer demand from a low-margin product to a higher-margin, highly related product. As alluded to above, average profit within the consumer products industry is typically less than two percent, however, one skilled in the art will appreciate that the profits for individual products within a product category are widely dispersed. Hence, an optimum promotion plan 104 to maximize profit according to the present invention is one that shifts consumer demand from a high-sales, low-margin product to a highly correlated product that has a higher margin. Highly correlated products are normally strong substitutes, yet in some cases they may be strong complements. Highly correlated products have very similar attributes from a consumer demand point of view, such as a popular brand of corn flakes and a private label brand of corn flakes.

The promotion plan optimization techniques according to the present invention employ both cost data and price/sales history data products within a product category to affect demand shifts, thereby increasing the average net profit for a store or chain of stores.

Figure 2:
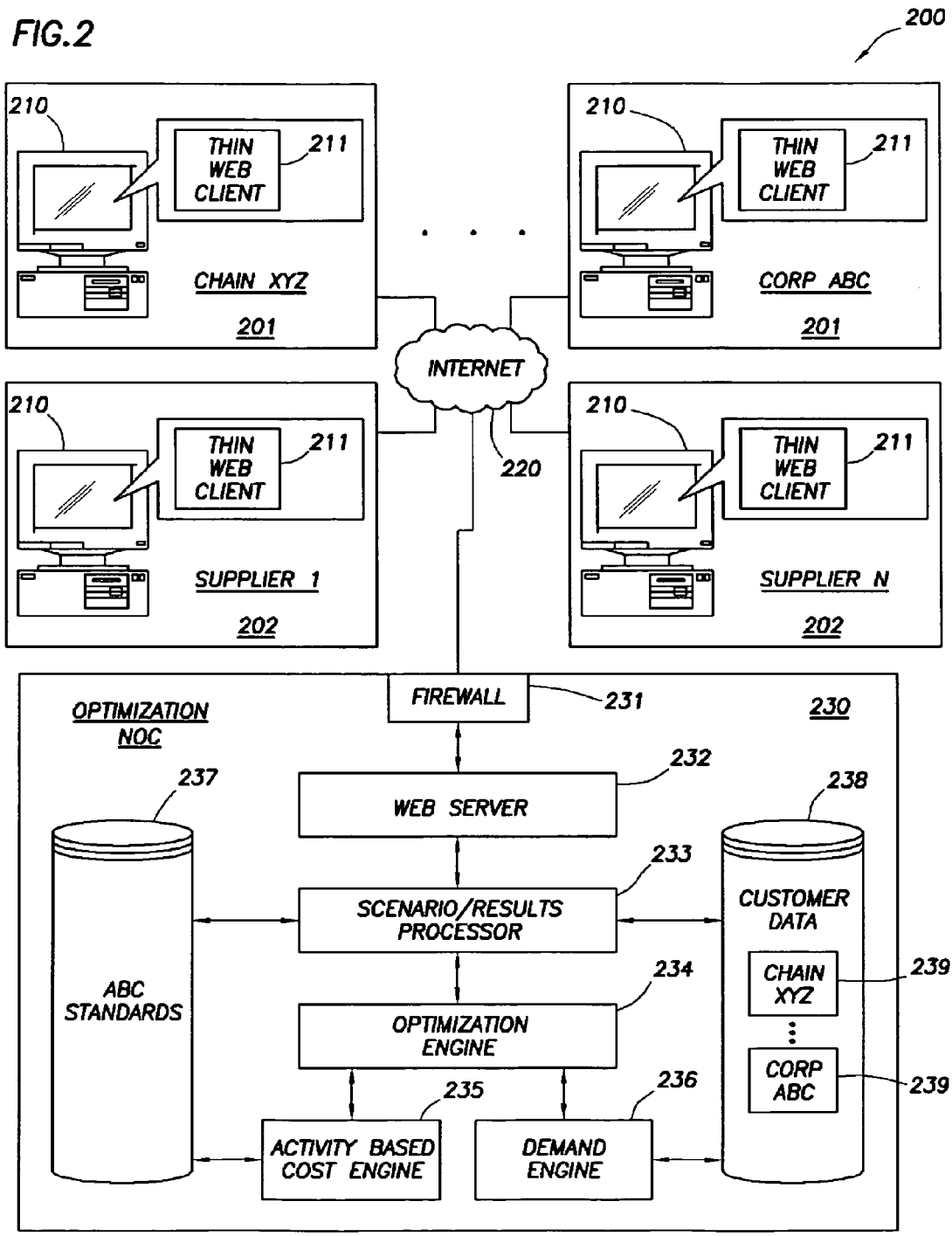
FIG. 2 is a block diagram illustrating an apparatus for merchandise promotion plan optimization according to the present invention.

Now referring to FIG. 2, a block diagram 200 is presented illustrating an apparatus for merchandise promotion plan optimization according to the present invention. The block diagram 200 shows an optimization network operations center (NOC) 230 that is accessed over a data network 220 by a plurality of off-site computers 210 belonging to a plurality of customers 201 and a plurality of suppliers 202. In one embodiment, the data network 220 is the Internet 220 and the off-site computers 210 are executing a Transport Control Protocol (TCP)/Internet Protocol (IP)-based thin web client application 211 such as MICROSOFT® INTERNET EXPLORER® or NETSCAPE® NAVIGATOR®. In an alternative embodiment, the computers 210 execute an additional client application for executing distributed applications such as CITRIX® ICA® Client 211. The optimization NOC 230 has a firewall 231 through which data network packets enter/exit the NOC 230. The firewall 231 is coupled to a web server 232. The web server 232 provides front-end services for a scenario/results processor 233. The scenario/results processor 233 is coupled to an optimization engine 234. The optimization engine 234 interconnects to an activity based cost engine 235, a demand engine 236, an activity based cost (ABC) standards data base 237, and a customer data base 238. The customer data base 238 provides storage for data sets 239 corresponding to a plurality of customers.

In operation, each of the customers maintains a protected data set 239 within the customer data base 238. Point of sale data is uploaded over the data network 220 from files on the customer computers 210 at the customer sites 201 into corresponding data sets 239 within the data base 238 and supplier offers are uploaded into the data sets 239 from supplier computers 210 at the supplier sites 202. The scenario/results processor 233 controls the timing and sequence of customer/supplier activities for uploading data, configuring optimization scenarios, setting rules and constraints, and downloading optimization results for display on the client computers 210 at the client sites 201. In one embodiment, the scenario/results processor 233 builds Hypertext Markup Language (HTML) web pages for transmittal over the data network 220 to the clients 210 at both sites 201, 202. In an alternative embodiment, the scenario/results processor 233 builds Extensible Markup Language (XML) pages for distribution to the clients 210 at both sites 201, 202. In a JAVA®-based embodiment, the scenario/results processor 233 builds, processes, and distributes JAVA applets to the clients 210 at both sites 201, 202.

The web server 232 receives and issues data network transactions over the data network 220 to affect the distribution of web pages, or templates, and to receive commands and data from the customer/supplier client machines 210.

Configured optimization scenarios are executed by the optimization engine 234. Using scenario configuration parameters provided by users through the browser 211 on a client machine 210, the optimization engine 234 directs the demand engine 236 to extract data from the customer data set 239 that applies to the optimization scenario that is being executed. The demand engine 236 predicts sales and market share of products as a function of promotion event price modifications according to rules and constraints of the optimization scenario. The activity based cost engine 235 calculates variable and fixed costs for products selected for promotion at specific store locations according to parameters of the optimization scenario.

The demand engine 236 relies on a mixed-model framework, simultaneously utilizing information in the client data set 239 across all stores and products within a product category, where a product category is defined as a collection of substitutable or complementary products. Furthermore, a demand group is defined to be a set of highly substitutable or complementary products. By way of example, a product category may comprise personal soap products. Demand groups within the personal soap category could consist of bar soaps and liquid soaps. The mixed model methodology is also referred to as "Bayesian Shrinkage" Modeling, because by combining data from various stores and/or products, one skilled can "shrink" individual parameter estimates towards the average estimate, dampening the extreme values that would result if traditional statistical techniques were used.

The demand engine 236 uses the data from the client data set 239 to estimate coefficients that may be used in an equation to predict consumer demand. In a preferred embodiment of the invention, sales for a demand group (S) is calculated, and a market share (F) for a particular product is calculated, so that demand (D) for a particular product is estimated by $D=S \cdot F$. A complete description of the statistical modeling and optimization techniques used within the demand engine 236 for a promotion plan optimization embodiment is found in co-pending U.S. patent application Ser. No. 09/741,958 entitled, System for Creating Optimized Promotion Event Calendar, which is herein incorporated by reference.

The activity based cost engine 235 employs data from the client data set 239 (supplied through the optimization engine 234), industry standard average data for calculating activity based costs from the ABC standards data base 237, and may also receive imputed variables (such as baseline sales and baseline prices) and data from the demand engine 236 (via the optimization engine 234) to calculate fixed and variable costs for the sale of each product. Like the demand engine 236, a detailed description of the activity based cost engine 235 for a promotion plan optimization embodiment is provided in co-pending U.S. patent application Ser. No. 09/741,958 entitled, System for Creating Optimized Promotion Event Calendar. Examples of the types of activity based costs for products that are calculated by the activity based cost engine 235 include bag costs, checkout labor costs, distribution center inventory costs, invoicing costs, transportation costs, and receiving and stocking costs.

The optimization engine 234 executes the optimization scenario that clients configure using the scenario/results processor 233. Using estimated sales and market share data provided by the demand engine 236, along with fixed and variable activity based costs calculated by the activity based cost engine 235, in a price optimization embodiment, the optimization engine 234 determines optimum prices for selected products within one or more demand groups across a product category as constrained by rules and constraints provided by clients. Some of the rules/constraints set by the client include constraints to the types, brands, or sizes of products to be promoted, selection of certain supplier offers for consideration, selection of stores for participation in a promotion event, forward buy methodologies, and constraints for merchandising figures of merit such as minimum turnover or minimum gross profit. Example options for figure of merit selection in a promotion plan optimization embodiment include net profit, volume, and revenue. Like the demand engine 236 and the activity based cost engine 235, the statistical modeling and optimization techniques that are employed by a promotion plan optimization embodiment according to the present invention are provided in co-pending U.S. patent application Ser. No. 09/741,958 entitled, System for Creating Optimized Promotion Event Calendar.

The results of an executed optimization scenario are provided to the customer, or user, via the scenario/results processor 233 through a sequence of result templates. The result data may also be downloaded over the data network 220 to a designated file on the client machine 210.

Figure 3:
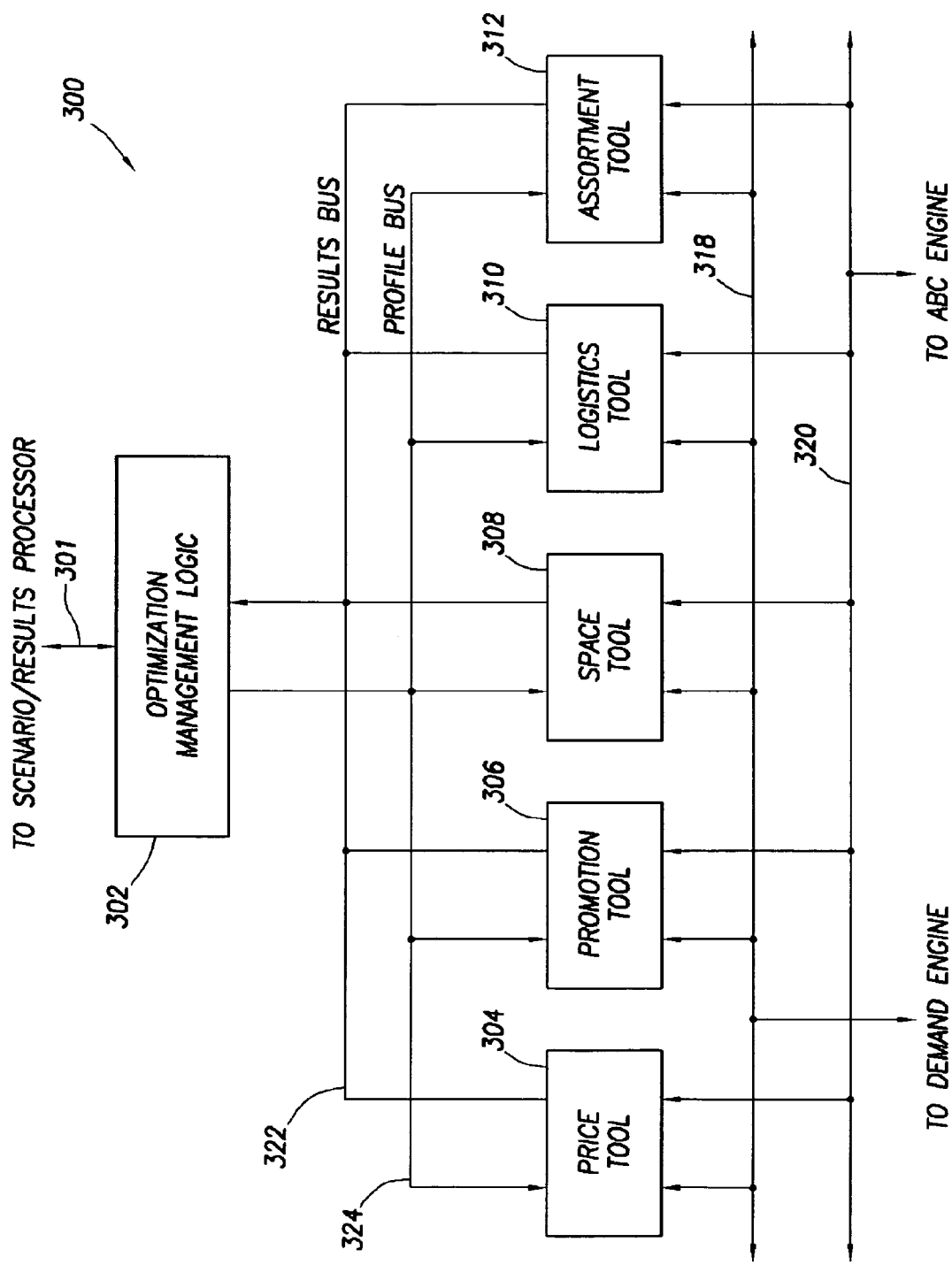
FIG. 3 is a block diagram depicting details of an optimization engine according to the present invention.

Now referring to FIG. 3, a block diagram is presented depicting details of an optimization engine 300 according to the present invention. The optimization engine 300 includes optimization management logic 302 that is coupled to a scenario/results processor (not shown) according to the present invention via bus 301. The optimization engine 300 also includes a price optimization tool 304, a promotion optimization tool 306, a space optimization tool 308, a logistics optimization tool 310, and an assortment optimization tool 312. Profile bus 324 provides optimization profile configuration parameters from the optimization management logic 302 to one or more of the optimization tools 304, 306, 308, 310, 312. The optimization tools 304, 306, 308, 310, 312 communicate result data from executed optimization scenarios to the optimization management logic 302 via result bus 322. Each of the optimization tools 304, 306, 308, 310, 312 are coupled to a demand engine (not shown) via bus 318 and to an ABC engine via bus 320.

In operation, the optimization management logic 302 interprets an optimization scenario configured by a user to direct the retrieval and/or upload of data from the client computer, and the receipt of customer data from the demand engine and ABC standards data from the ABC engine in accordance with the type of optimization that is being performed. The price optimization tool 304 is employed to determine a set of optimum prices for products of a product category comprising a plurality of demand groups. The promotion optimization tool 306 is employed to determine an optimum promotion strategy for products of a product category comprising a plurality of demand groups. The space tool 308 is employed to determine an optimum placement strategy within stores for products of a product category comprising a plurality of demand groups. The logistics tool 310 is employed to determine an optimum inventory strategy within stores for products of a product category comprising a plurality of demand groups. And the assortment tool 312 is employed to determine an optimum mix of products of a product category comprising a plurality of demand groups. Each of the tools 304, 306, 308, 310, 312 include provisions for determining optimum lever parameters for the maximization of cost-based merchandising figures of merit such as net profit. In one embodiment, the optimization engine 300 comprises computer program modules coded for execution by an optimization analysis program such as GAMS®. The results of an optimization are exported from the application program as tables into a data base server application such as MICROSOFT® SQL Server.

Figure 4:
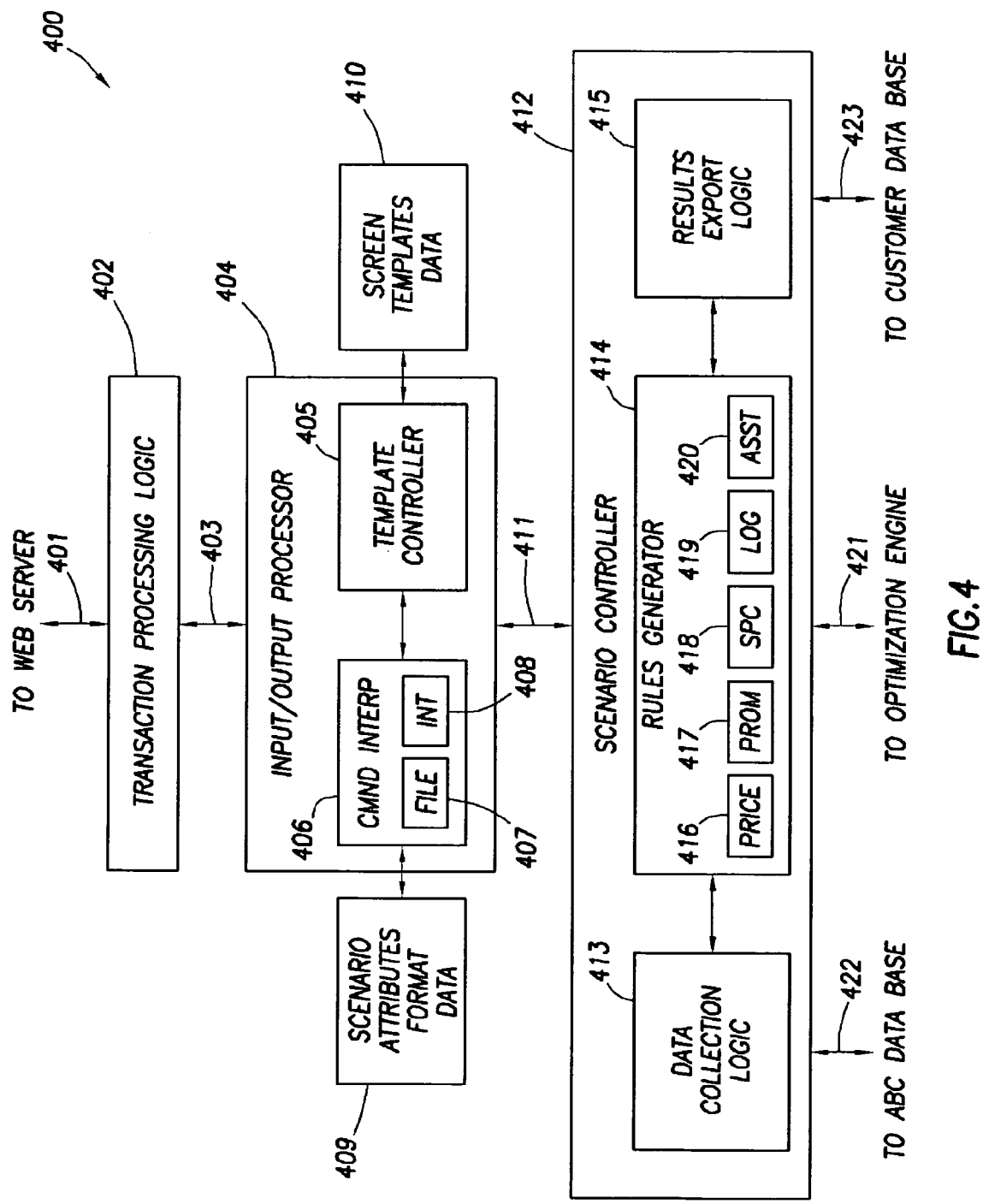
FIG. 4 is a block diagram showing scenario/results processor details according to the present invention.

Now referring to FIG. 4, a block diagram is presented showing details of a scenario/results processor 400 according to the present invention. The scenario/results processor includes transaction processing logic 402 that communicates with a web server (not shown) according to the present invention via bus 401. Bus 403 couples the transaction processing logic 402 to an input/output processor 404. The input/output processor 404 includes a template controller 405 and command interpretation logic 406. The input/output processor 404 is connected to a scenario attributes format data set 409 and a screen templates data set 410. In one embodiment, the data sets 409, 410 are stored within an ABC standards data base (not shown) according to the present invention. The input/output processor 404 communicates with a scenario controller 412 via bus 411. The scenario controller 412 has data collection logic 413, a rules generator 414, and results export logic 415. The scenario controller 412 is coupled to an optimization engine (not shown) according to the present invention via bus 421, an ABC data base (not shown) via bus 422, and a customer data base (not shown) via bus 423.

Operationally, the transaction logic 402 provides application level message services for the scenario/results processor 402 to receive/transmit messages from/to customer/supplier clients via the web server. In one embodiment, sessions are established via conventional socket calls according to MICROSOFT® WINDOWS NT® operating system. The input/output processor 404 directs the acquisition of customer/supplier data to define parameters of an optimization scenario and supplier offers and directs the distribution of scenario results to the customers. The command interpretation logic 406 utilizes a series of scenario configuration templates, or new scenario templates, provided by the template controller 405 to enable a customer to configure parameters of a optimization scenario for execution. The new scenario templates, or windows, are stored in the screen templates data set 410, and are populated with appropriate configuration option data by the command interpretation logic 406. The input/output processor 404 routes these templates to the transaction logic 402, whereby the templates are routed to the user client machines over the data network. The command interpretation logic 406 includes interactive data acquisition logic 408 and file acquisition logic 407. The interactive data acquisition logic 408 is employed to populate selected scenario configuration templates with fields/parameters whereby a user interactively provides data required to configure a scenario or to display the results of an executed scenario. The file acquisition logic 407 is employed to control the reception of electronic files from a client machine required to configure a scenario and to control the transmission of files to export results of an executed scenario to a client machine. The scenario attributes format data set 409 describes the format requirements for product attribute data so that data received by the command interpretation logic 406 can be manipulated into formats that comport with each of the optimization tools 304, 306, 308, 310, 312 described with reference to FIG. 3.

The scenario controller 412 directs the configuration and execution of an optimization scenario, and presentation of the results of an optimization scenario. The scenario controller 412 has data collection logic 413, a rules generator 414, and results export logic 415. The rules generator comprises a plurality of rules logic elements to include a price optimization rules element 416, a promotion optimization rules element 417, a space optimization rules element 418, a logistics optimization rules element 419, and an assortment optimization rules element 420.

Operationally, through a subset of the new scenario templates, a user on a client machine selects to perform one of a plurality of available optimizations. The selected optimization is provided to the scenario controller 412 via bus 411. The data collection logic 413 prescribes client data that is required to execute the selected optimization. The rules generator selects a rules logic element 416–420 that comports with the selected optimization. And the results export logic 415 identifies results templates and/or file designations that are required to present results of the selected optimization. Template designations for additional data that is required from the user are provided to the input/output processor 404 and the selected rules logic element 416–420 provides rules configuration parameters for the optimization scenario to the optimization engine via bus 421.

The template controller 405 and command interpretation logic 406 together configure the designated new scenario templates for presentation to the user, whereby configuration data and additional data (if any) for the optimization scenario are retrieved. Once the configuration/additional data are in place within the data base (not shown), the scenario controller 412 directs the optimization engine to execute the configured optimization scenario. When an optimization is complete, the results export logic 415 retrieves scenario results from the optimization engine and formats the results for export to the user via either result templates or file transfer.

Figure 5:
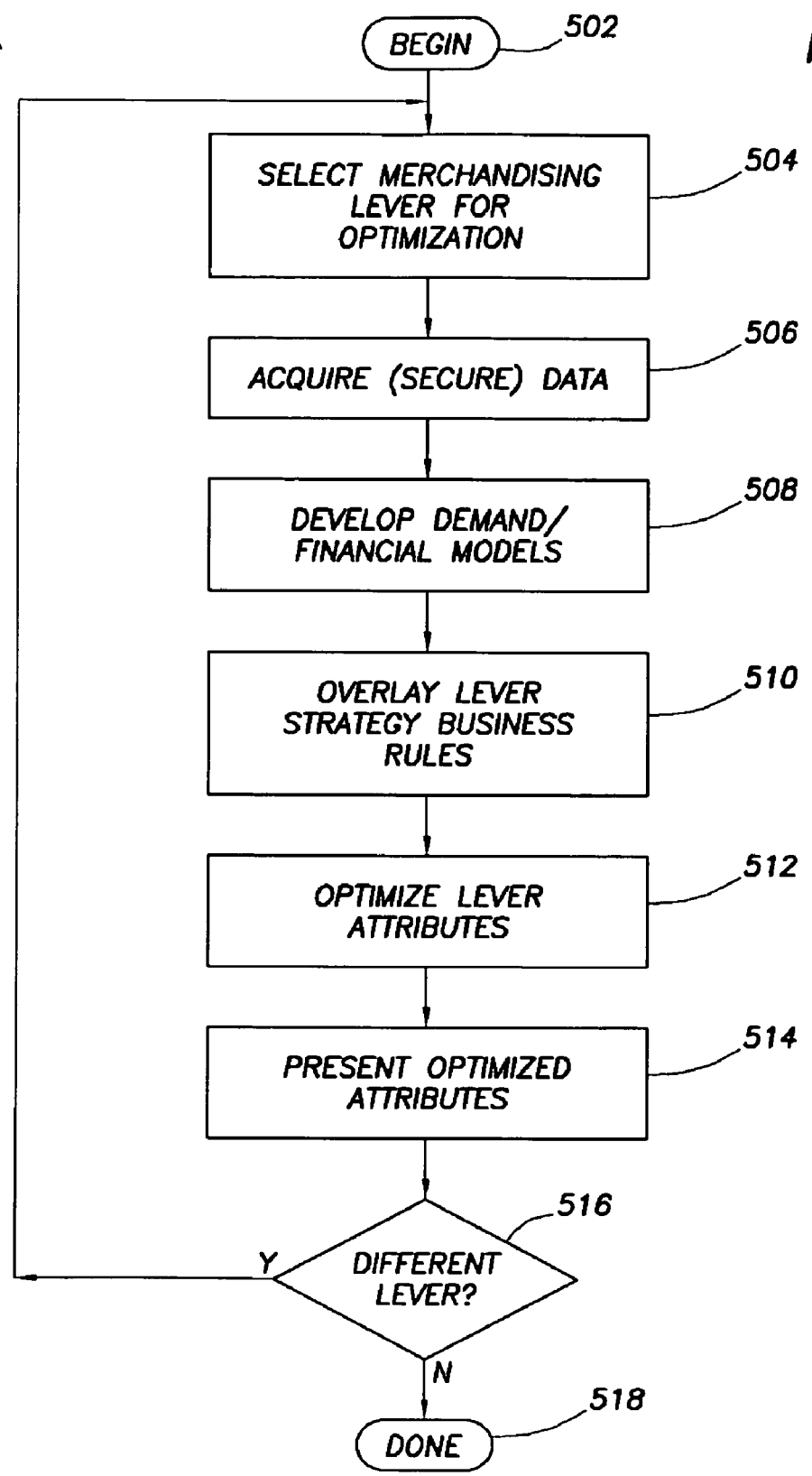
FIG. 5 is a flow chart featuring a method according to the present invention for optimizing selected product merchandising levers.

Now referring to FIG. 5, a flow chart 500 is presented featuring a method according to the present invention for optimizing selected product merchandising levers. The method is provided to illustrate program flow for determining a set of optimum prices for one or more merchandising levers in an optimization system that employs both a demand model and an activity based cost model for optimization. By utilizing cost data as well as demand, optimization scenarios can be executed that maximize meaningful merchandising figures of merit such as net profit.

Flow begins as block 502, where a user selects to perform an optimization according to the present invention. Flow then proceeds to block 504.

At block 504, the user is prompted to select one of a plurality of merchandising levers for which to perform an optimization. In one embodiment, the merchandising levers include sales price, promotion strategy, space strategy, logistics strategy, and product mix. Alternative embodiments provide subsets of the aforementioned levers for optimization. Flow then proceeds to block 506.

At block 506, the system acquires data that is required to perform an optimization according to the selection provided in block 504. In one embodiment, primary point of sale data and supplier offer data is uploaded into a client data base according to the present invention and any additional data required for the optimization is provided interactively by the user. The additional data includes rules and constraints that the user specifies for optimization, selection of stores for optimization, grouping of stores for imputation of data where insufficient sales history exists, swing constraints (i.e., maximum and/or minimum change limits for parameters such as volume, price change, etc.), front end parameters for an activity based cost engine (e.g., labor rates, cost of capitol, etc.), merchandising figure of merit to maximize, and user preference for presentation of results (i.e., list, graph, downloadable file, etc.). In an alternative embodiment, the additional data is stored within a file on a client machine and is uploaded to the data base over a data network. In an embodiment comprising a plurality of clients, access to client data within the data base and control of optimizations is protected by secure measures such as passwords, user privilege restrictions, digital authentication, and encrypted communications. Flow then proceeds to block 508.

At block 508, demand and ABC (i.e. financial) models are developed according to user-supplied scenario data by modeling applications according to the present invention. Flow then proceeds to block 510.

At block 510, rules and constraints provided by the user for the optimization scenario are applied to bound (i.e., constrain) the optimization that is to be performed. Flow then proceeds to block 512.

At block 512, an optimization is performed by the system according to the present invention that utilizes both the demand model data and the financial model data to determine a set of optimum lever attributes for specified products that maximize the specified merchandising figure of merit within the rules and constraints provided by the user. Flow then proceeds to block 514.

At block 514, results of the optimization are provided to the user in the form previously specified within block 506. Flow then proceeds to decision block 516.

At decision block 516, the user is provided with an opportunity to select another one of the plurality of merchandising levers for which to perform a new optimization. If the user selects to configure and execute another optimization, then flow is directed to block 504. If the user elects to exit, then flow proceeds to block 518.

At block 518, the method completes.

Having now described the architecture and detailed design of the present invention to support optimization systems having a plurality of merchandising levers available for manipulation, attention is now directed to FIGS. 6–22, where an exemplary embodiment of a thin client-based promotion plan optimization apparatus will now be discussed. The thin client-based promotion plan optimization apparatus is presented in terms of a sequence of web templates (i.e., HTML and/or XML generated content displayed within a user's thin web client program) provided to users for the purpose of optimizing promotion plans for specified products to maximize specified merchandising figures of merit in accordance with user-supplied rules/constraints.

Figure 6:
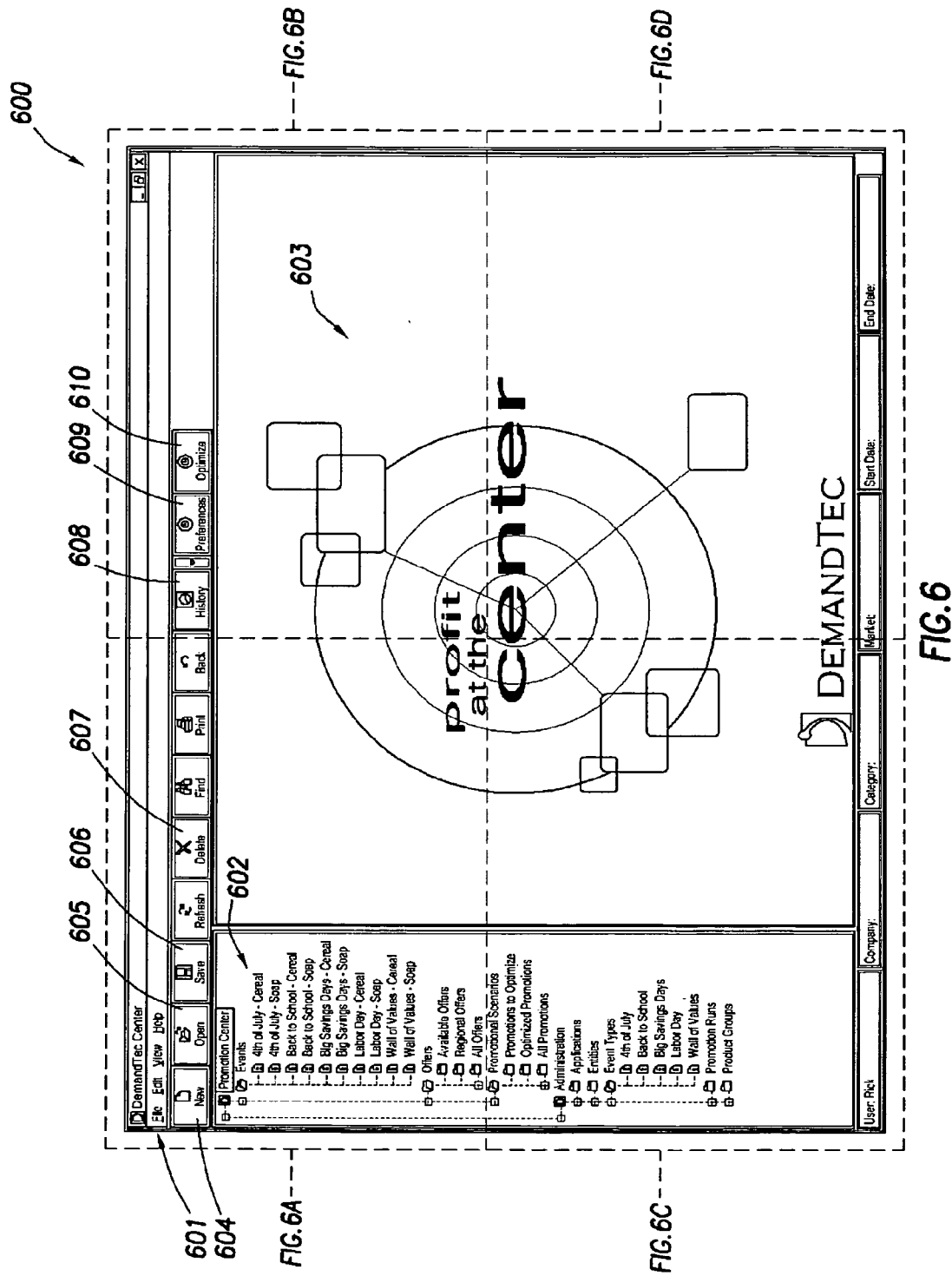
FIG. 6 is a diagram illustrating a home navigation template according to an exemplary embodiment of the present invention.
Figure 6A:
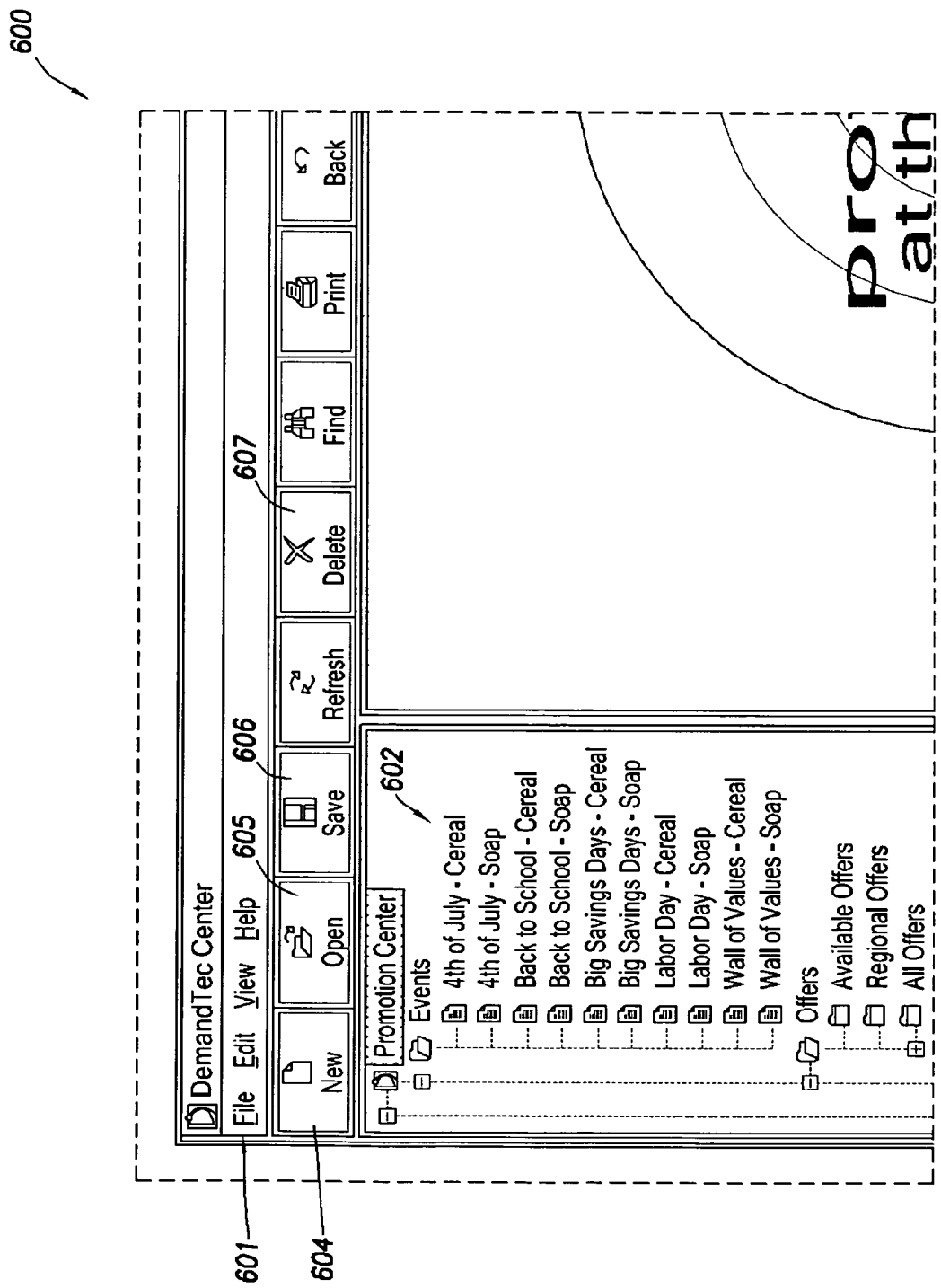
Figure 6B:
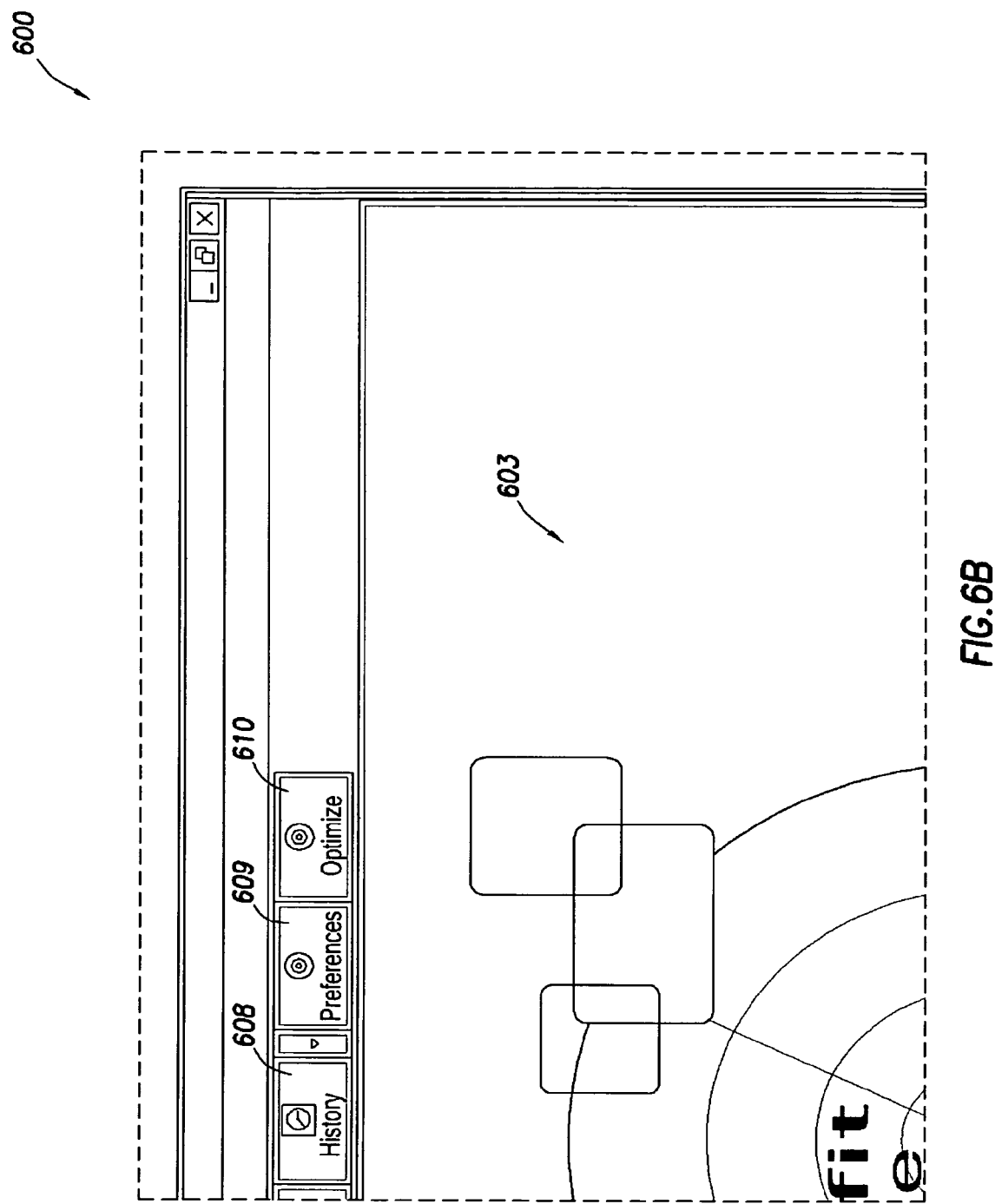
Figure 6C:
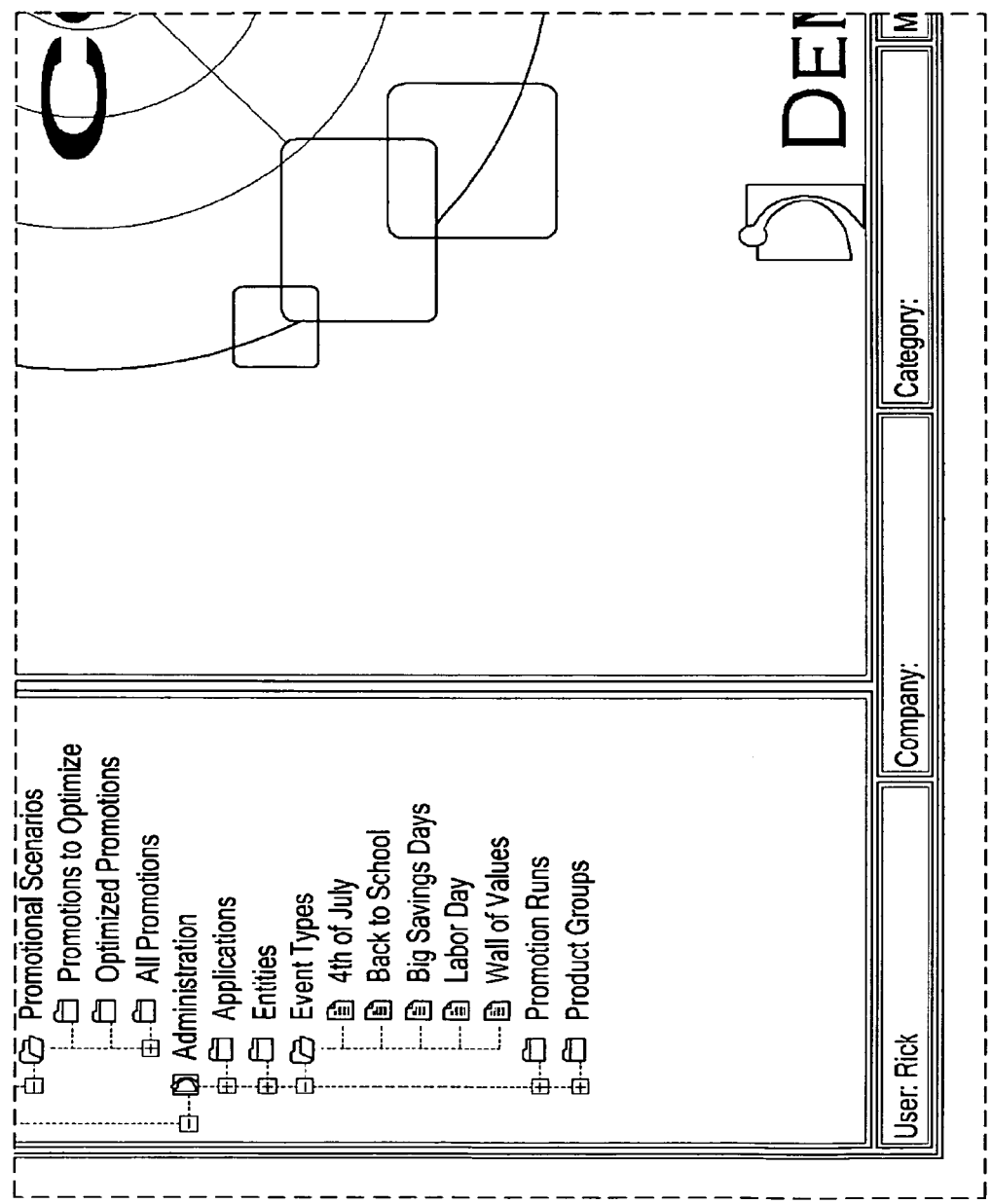
Figure 6D:
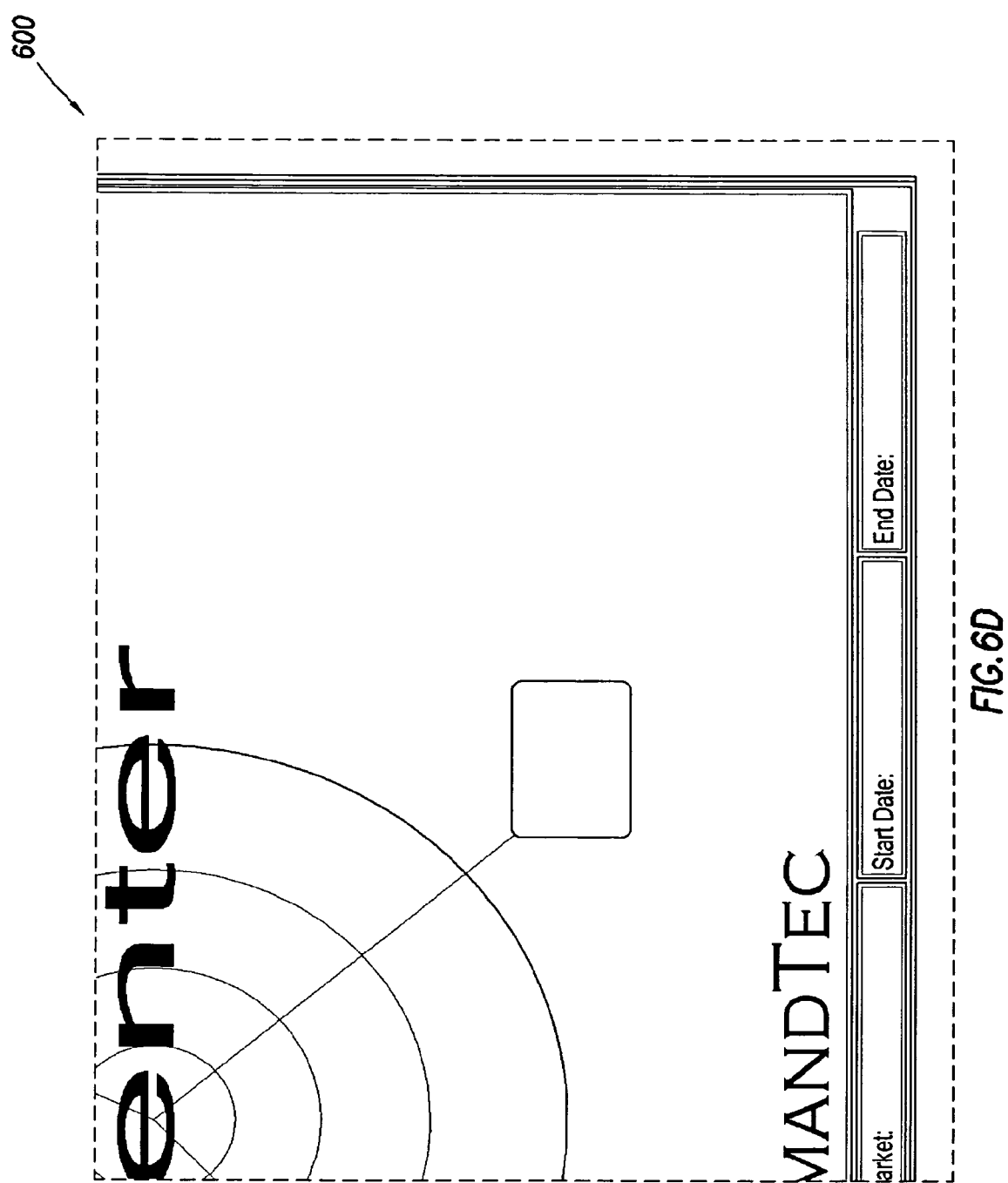

Now referring to FIG. 6, a diagram is presented illustrating a home navigation template 600 according to an exemplary embodiment of the present invention for optimizing promotion scenarios. The template 600 has a menu area 601 providing menu-selectable functions for configuring, executing, and viewing results of promotion plan optimizations according to the present invention. The template 600 also has a plurality of function selection buttons 604–610, providing initiation of functions via a standard pointing device (e.g., a mouse). The template 600 includes a promotion object directory area 602 listing a plurality of promotion objects to include promotion event types, promotion events, supplier offers, and promotion scenarios. The template 600 has a welcome message area 603 to inform a user that has just logged into a network operations center according to the present invention that he/she is accessing a promotion plan optimization model. A new button 604 enables the user to initiate a new object. An open button 605 enables the user to open an object selected from within the object directory area 602. A save button 606 enables the user to save objects. A delete button 607 enables the user to delete objects. A history button 608 provides the user with the ability to access previously accessed templates and objects. A preferences button 609 enables the user to set global parameter preferences (i.e., default values) for promotion plan optimizations. And an optimize button 610 enables the user to initiate optimization of a promotion scenario that has been selected within the object directory area.

Figure 7:
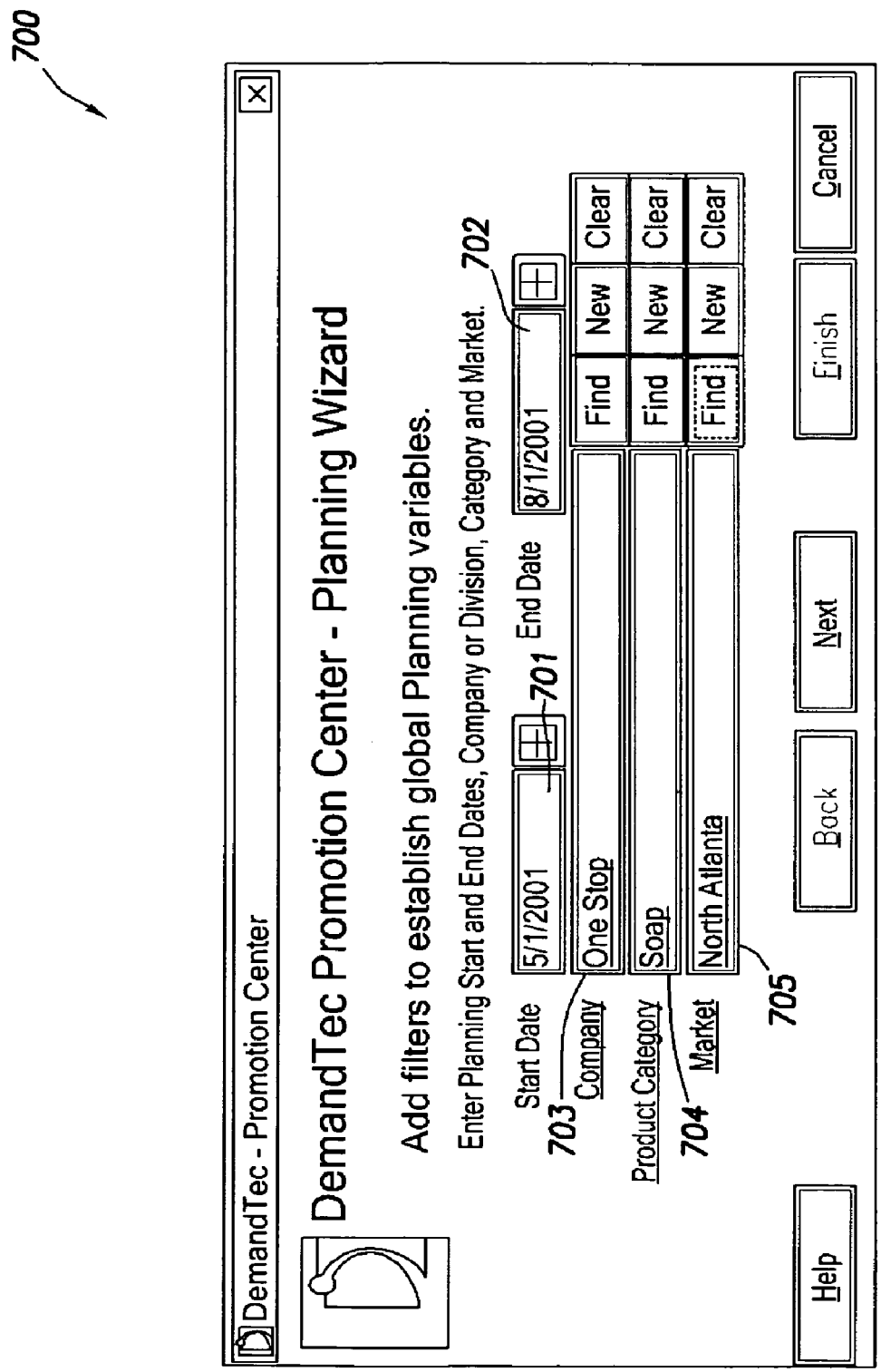
FIG. 7 is a diagram featuring a promotion optimization preferences template according to the exemplary embodiment.
Figure 8A:
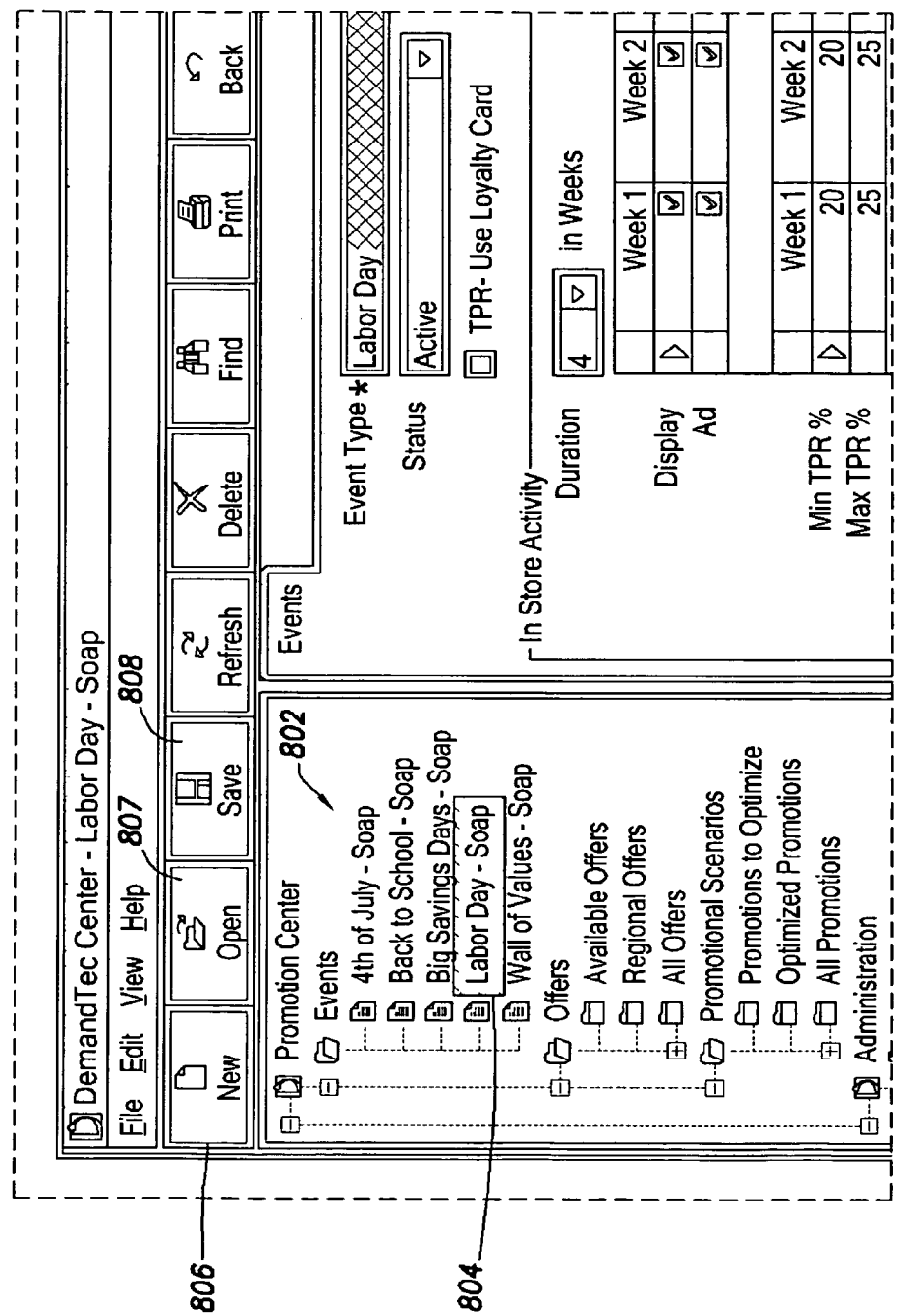
FIG. 8 is a diagram depicting a promotion event configuration template according to the exemplary embodiment.
Figure 8B:
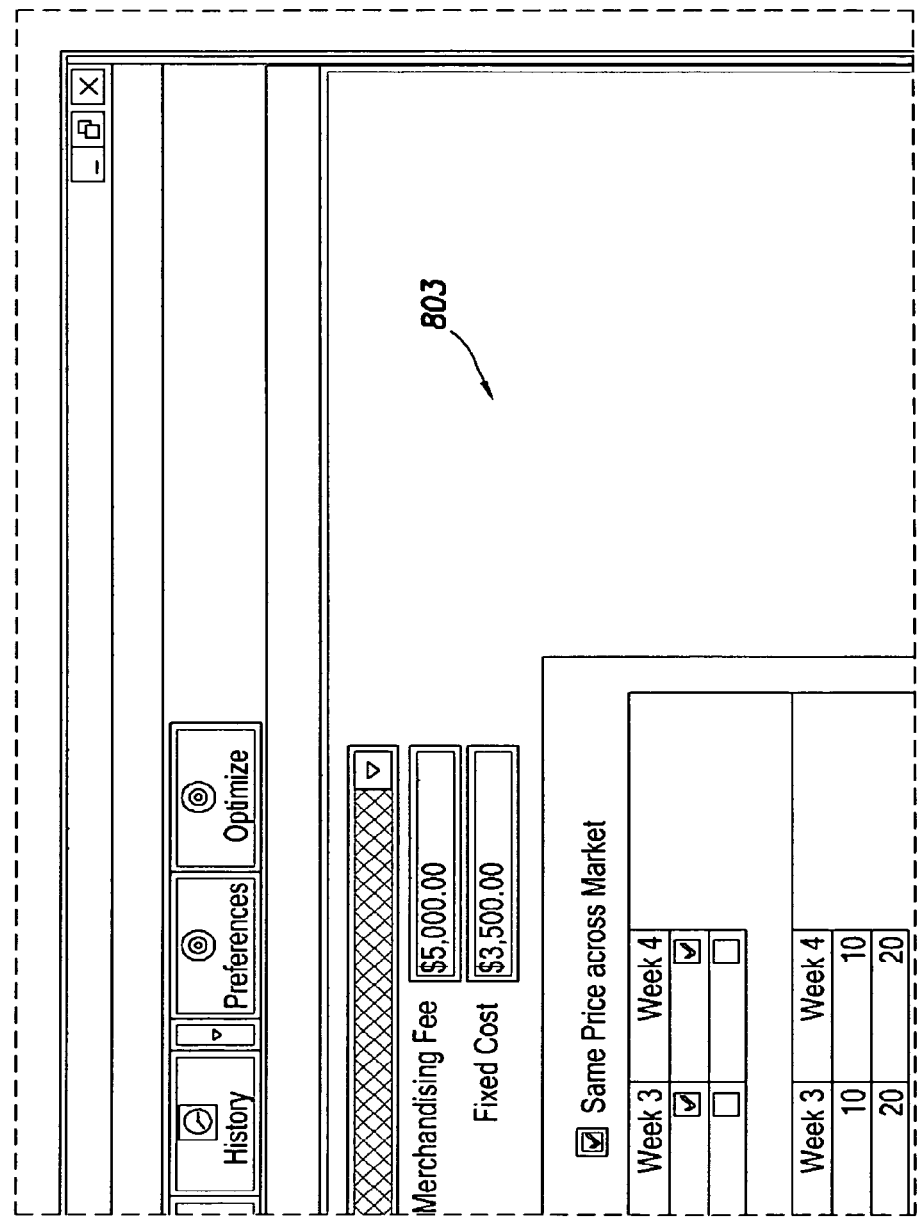
Figure 8C:
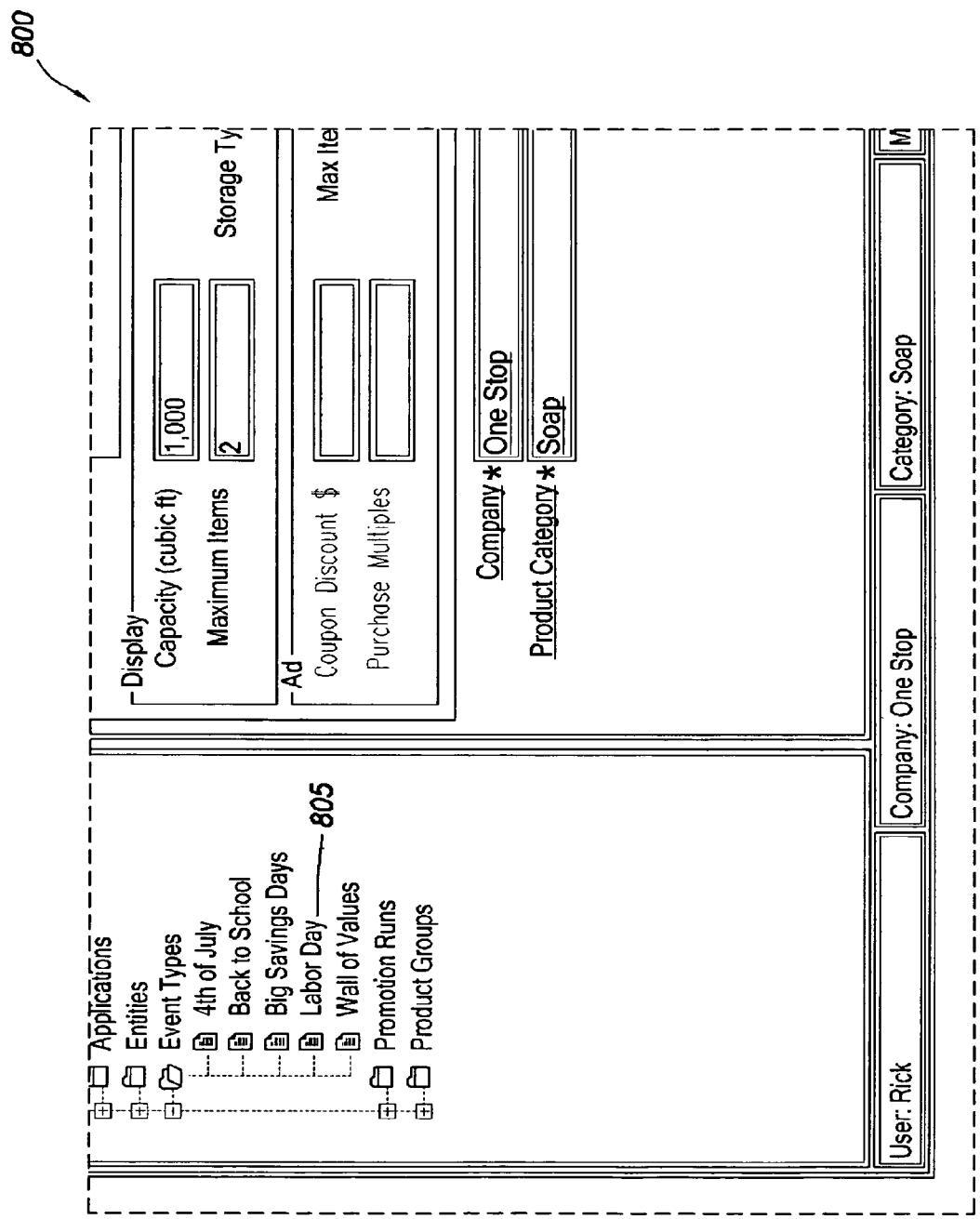
Figure 8D:
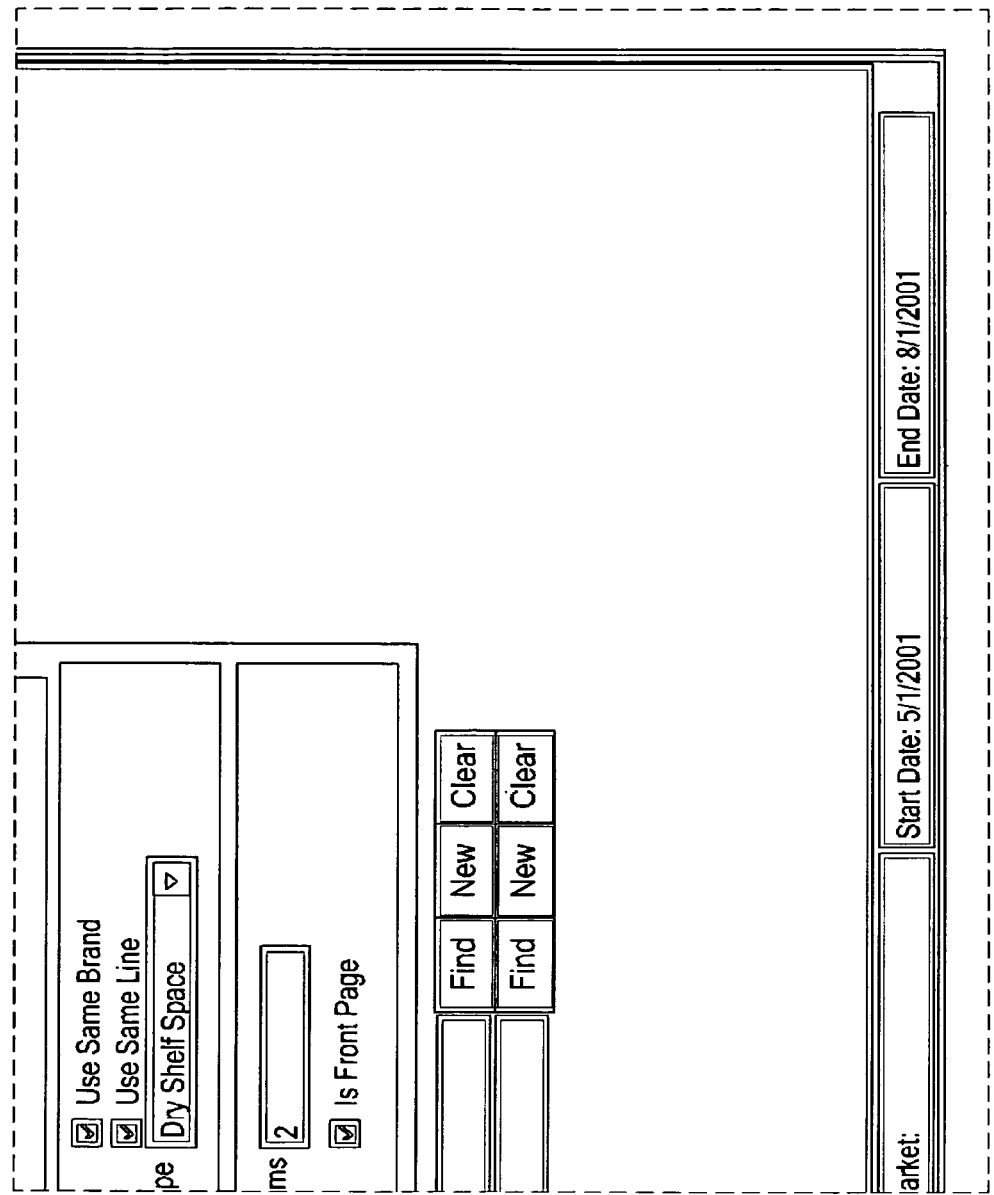

FIG. 7 is a diagram featuring a promotion optimization preferences template 700 according to the exemplary embodiment. The preferences template 700 is provided to the user's web browser in response to selection of the preferences button 609. The preferences template 700 provides a start date field 702, an end date field 702, a company field 703, a product category field 704, and a market field 705. The date fields 701, 702 enable the user to prescribe default start and end dates for promotion events that are subsequently configured. The company field 703, product category field 704, and market field 705 allow the user to specify a default company, default product category, and default market for prescription of subsequent promotion scenarios.

Figure 8:
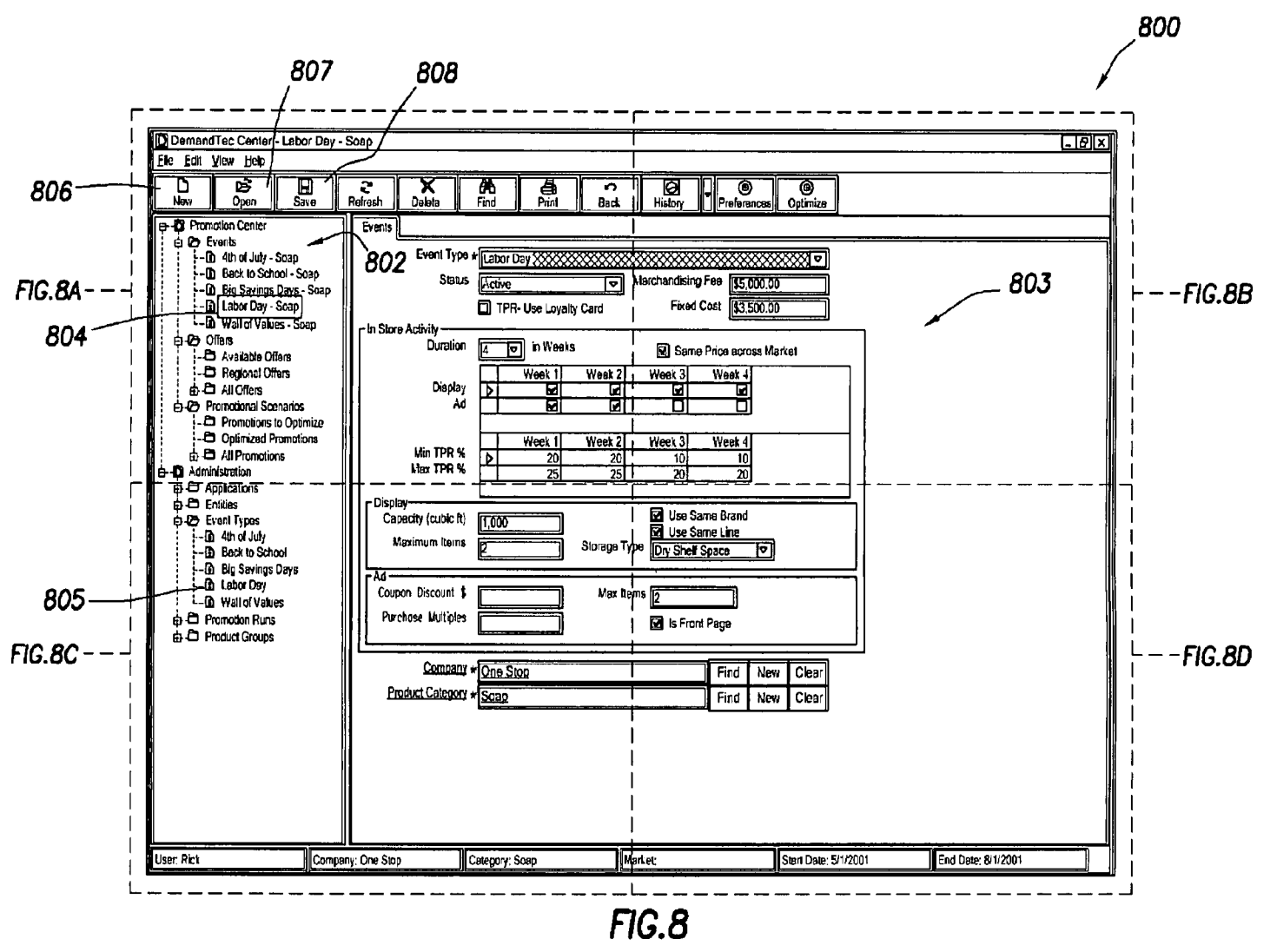

FIG. 8 is a diagram depicting a promotion event configuration template 800 according to the exemplary embodiment. Promotion events 804 are listed within the object directory area 802 and are configured from a selected promotion event type 805, which is also selected from within the object directory area 802 A promotion event 804 is a promotion event type 805 that is associate with a particular product category. The template 800 has an event configuration area 803. The user employs the event configuration area 803 to establish a new promotion event (via a new button 806) or to modify an existing promotion event (via an open button 807 and a save button 808).

Figure 9:
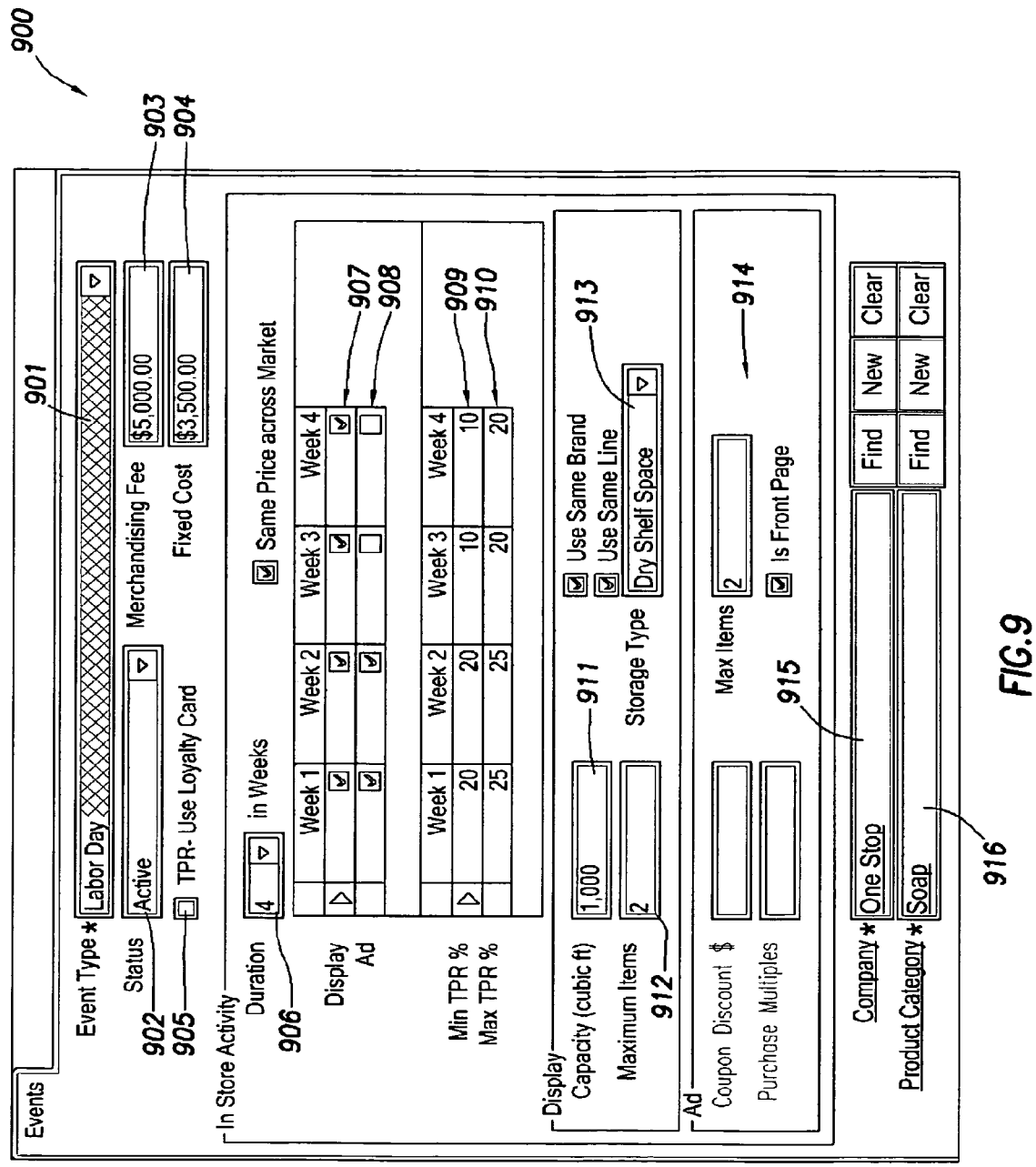
FIG. 9 is a diagram portraying a promotion event configuration area within the promotion event configuration template of FIG. 8.

FIG. 9 is a diagram portraying a promotion event configuration area 900 within the promotion event configuration template of FIG. 8. The promotion event configuration area has an event type chooser 901 enabling the user to specify a particular promotion event type that corresponds to the promotion event that is being configured. The area 900 provides a status chooser 902 allowing the user to enable/disable the configured promotion event. A merchandising fee field 903 is provided to allow the user to specify a fee charged to a supplier for participation in the promotion event. A fixed cost field 904 allows the user to input a cost for the event. The template 900 has a duration chooser 906 for prescribing a number of weeks that the event will span. The template 900 also provides checkboxes for each of the weeks prescribed via chooser 906 to allow the user to select/deselect promotion display (area 907), promotion ad (area 908), and to prescribe minimum and maximum acceptable temporary price reduction percentages (areas 909 and 910) for each of the prescribed event weeks. The template 900 provides fields 911–912 that allow the user to assign a cubic feet capacity for the event (field 911) and a maximum number of items (field 913) for the event. Chooser 913 enables the user to specify storage type to be used for the promotion event. An add area 914 provides fields enabling the user to configure advertising parameters for the event to include coupon discount amount, purchase multiples, max items, and whether or not advertising is to be front page. In addition, the template 900 provides a company field 915 and a product category field 916 enabling the user to prescribe a company and product category that is to be associated with the promotion event.

Figure 10:
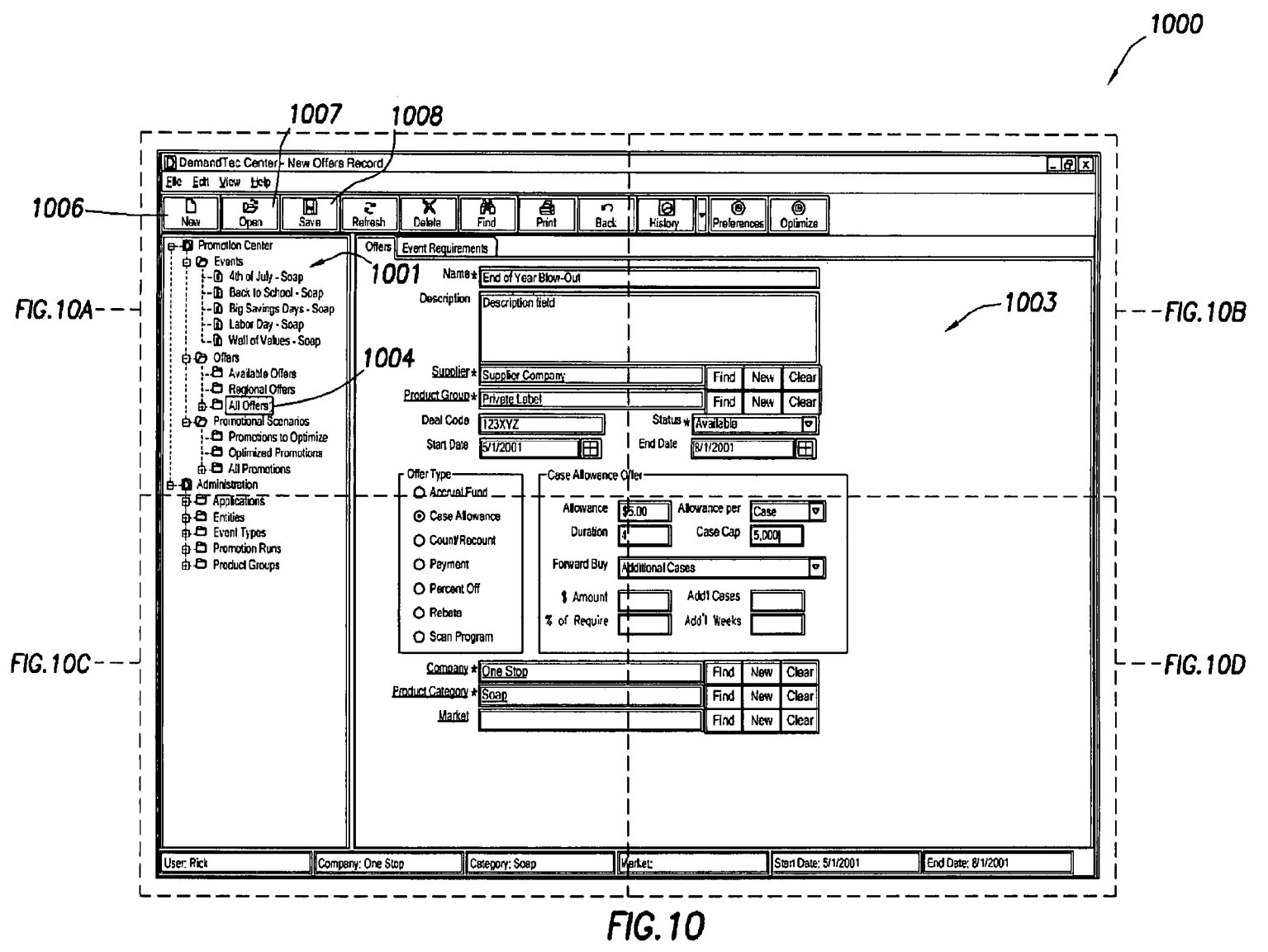
Figure 10A:
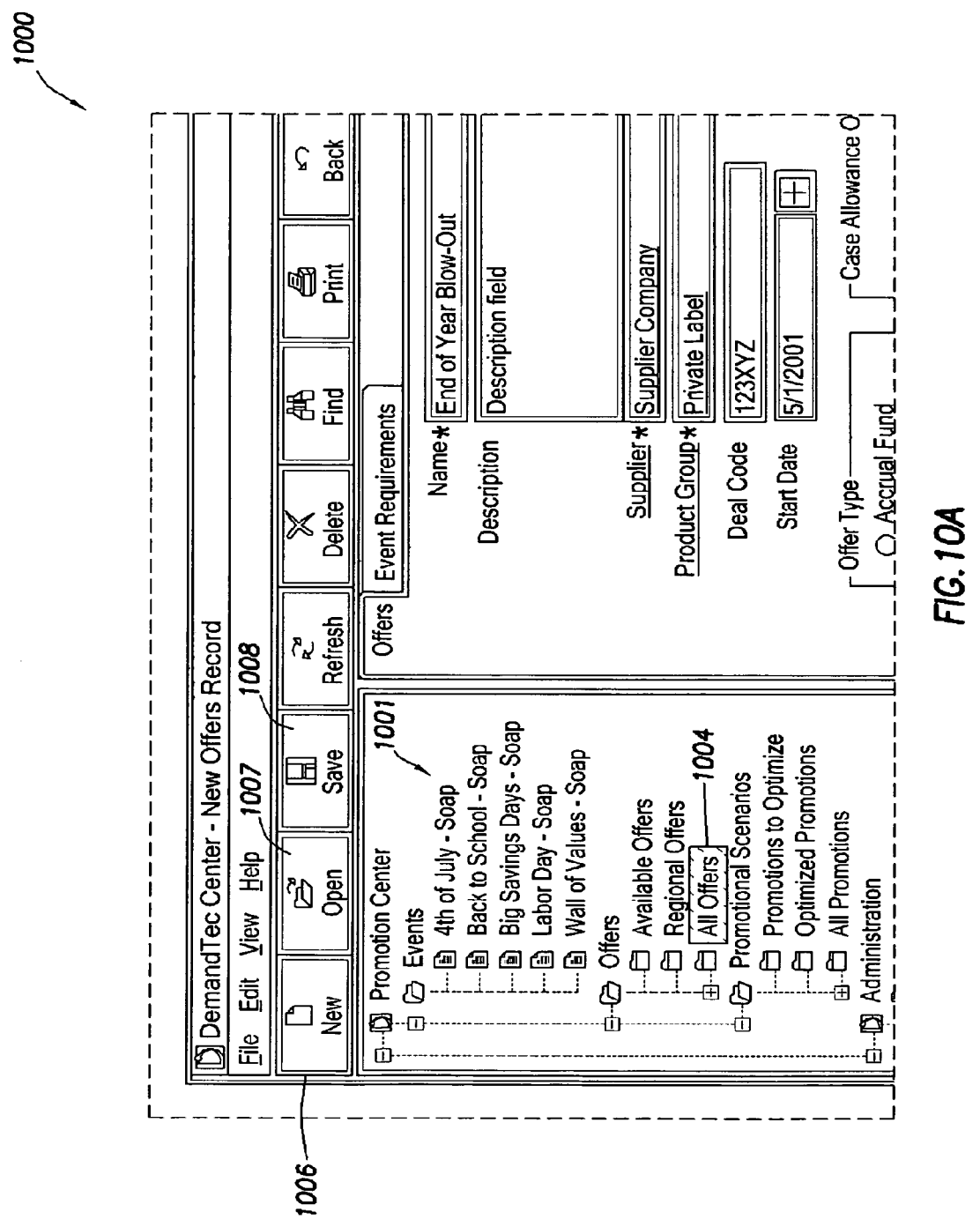
Figure 10C:
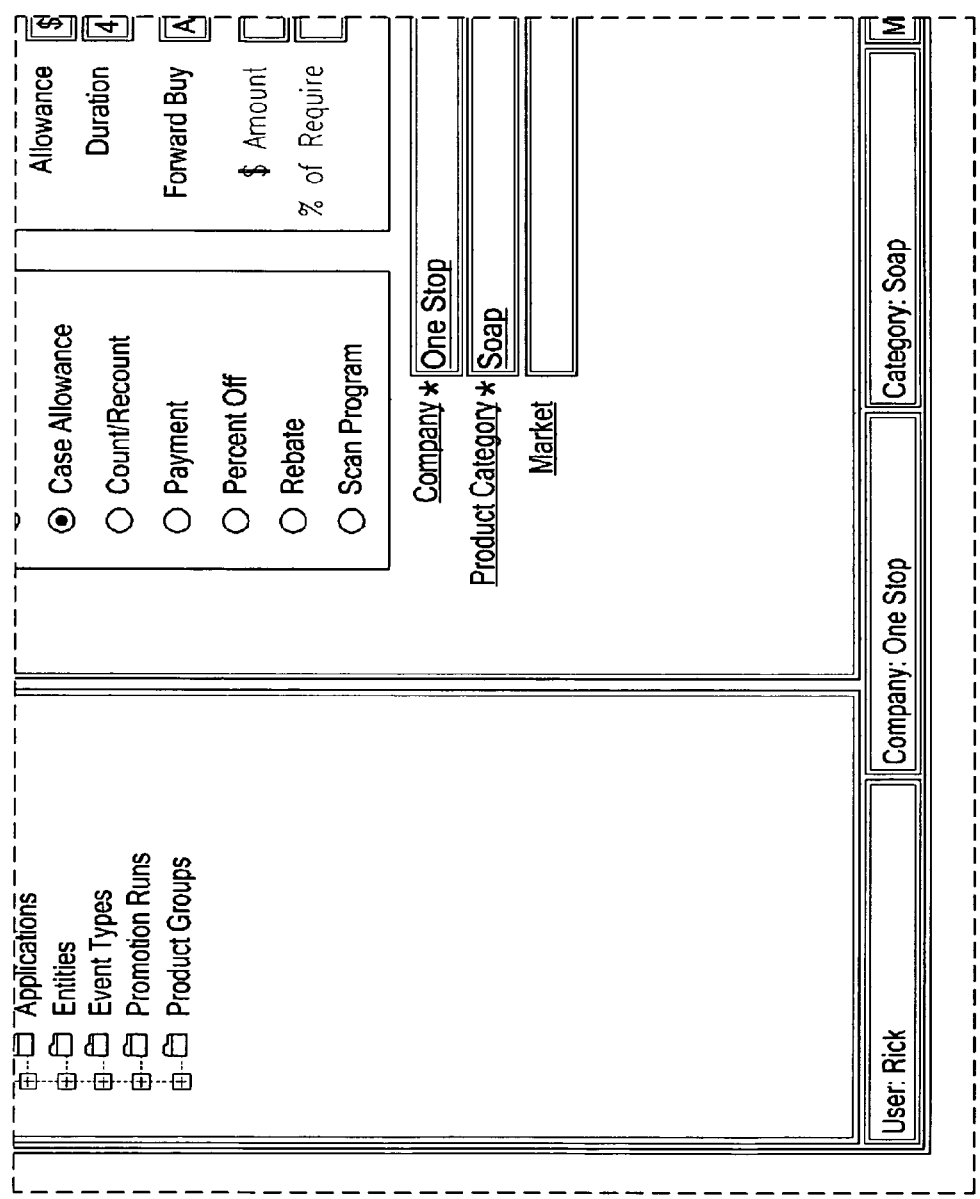
FIG. 10 is a diagram showing a supplier offer configuration template according to the exemplary embodiment.
Figure 10D:
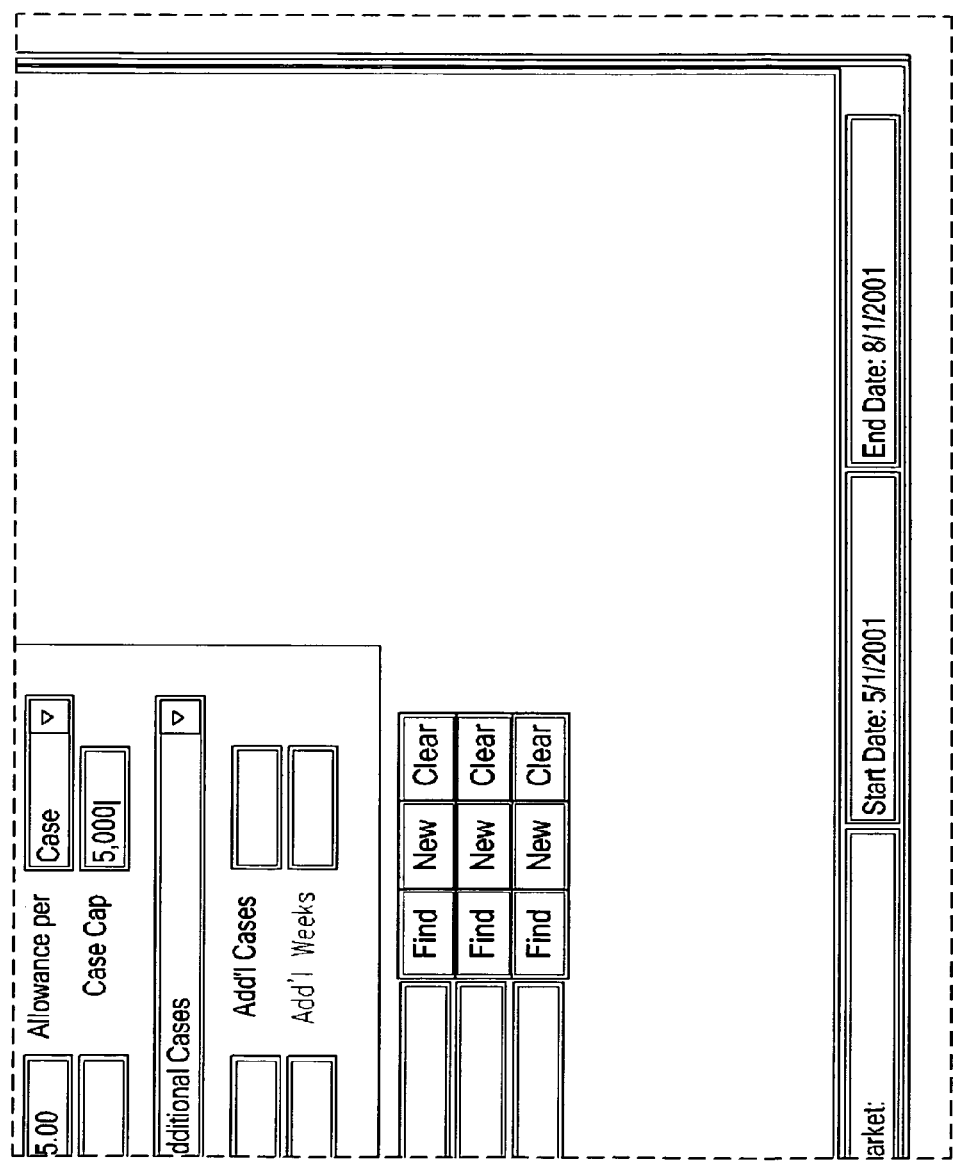

Now referring to FIG. 10, a diagram is presented showing a supplier offer configuration template 1000 according to the exemplary embodiment. In one embodiment, the supplier offer template 1000 is provided to the user's web browser for manual entry of supplier offer data. In an alternative embodiment, the template 1000 is provided to a supplier's web browser to enable the supplier to configure and upload offers for entry into to the user's data base. The template 1000 is provided by selecting a supplier offer object 1004 within an object directory area 1001. Like promotion events, supplier offers can be newly created (via new button 1006) or modified (via open and save buttons 1007, 1008). For both new and opened offers, the template 1000 provides an offer configuration area 1003.

Figure 11:
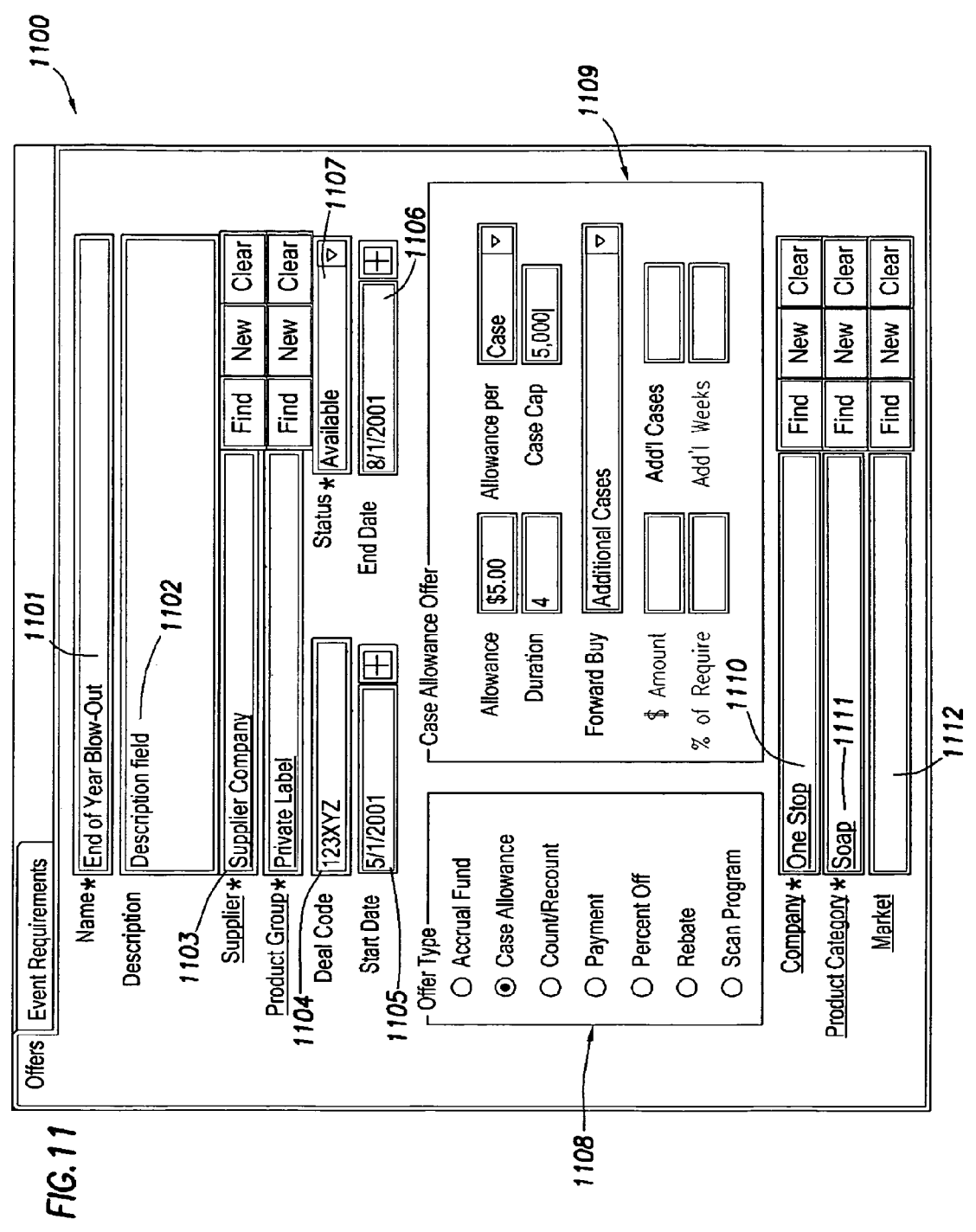

FIG. 11 is a diagram illustrating a supplier offer configuration area 1100 within the supplier offer configuration template of FIG. 10. The offer configuration area enables a user or supplier to configure parameters associated with a particular supplier offer. Parameters that are configured according to the exemplary embodiment include offer name (field 1101), offer description (field 1102), supplier name (field 1103), applicable product group (field 1104), offer start date (field 1105), offer end date (field 1106), offer status (chooser 1107), offer type (buttons within area 1108), offer type parameters (fields within area 1109), company to which the offer is made (field 1110), product category corresponding to the offer (field 1111), and market (field 1112).

Figure 12:
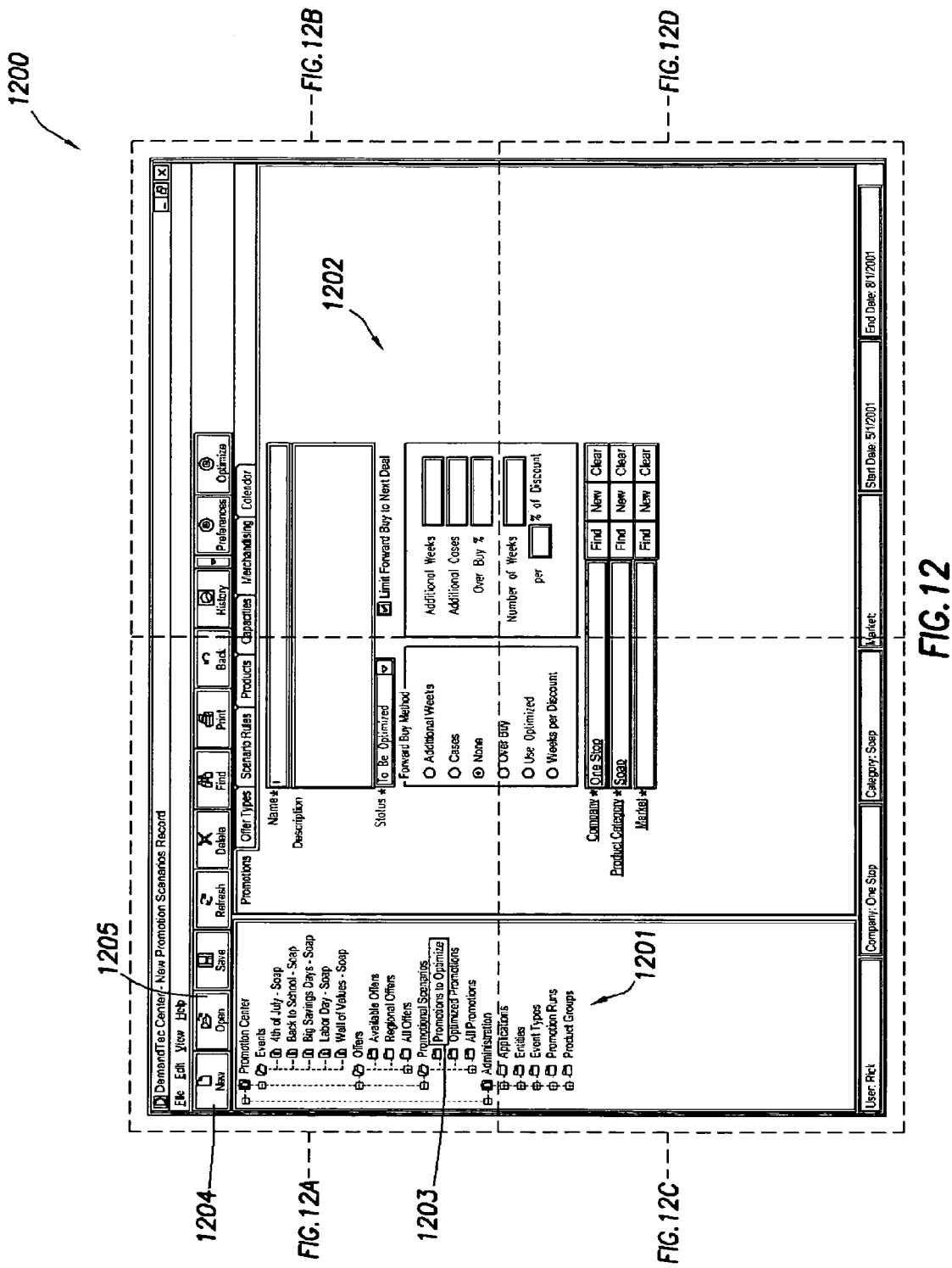
FIG. 12 is a diagram depicting a promotion scenario configuration template according to the exemplary embodiment.
Figure 12A:
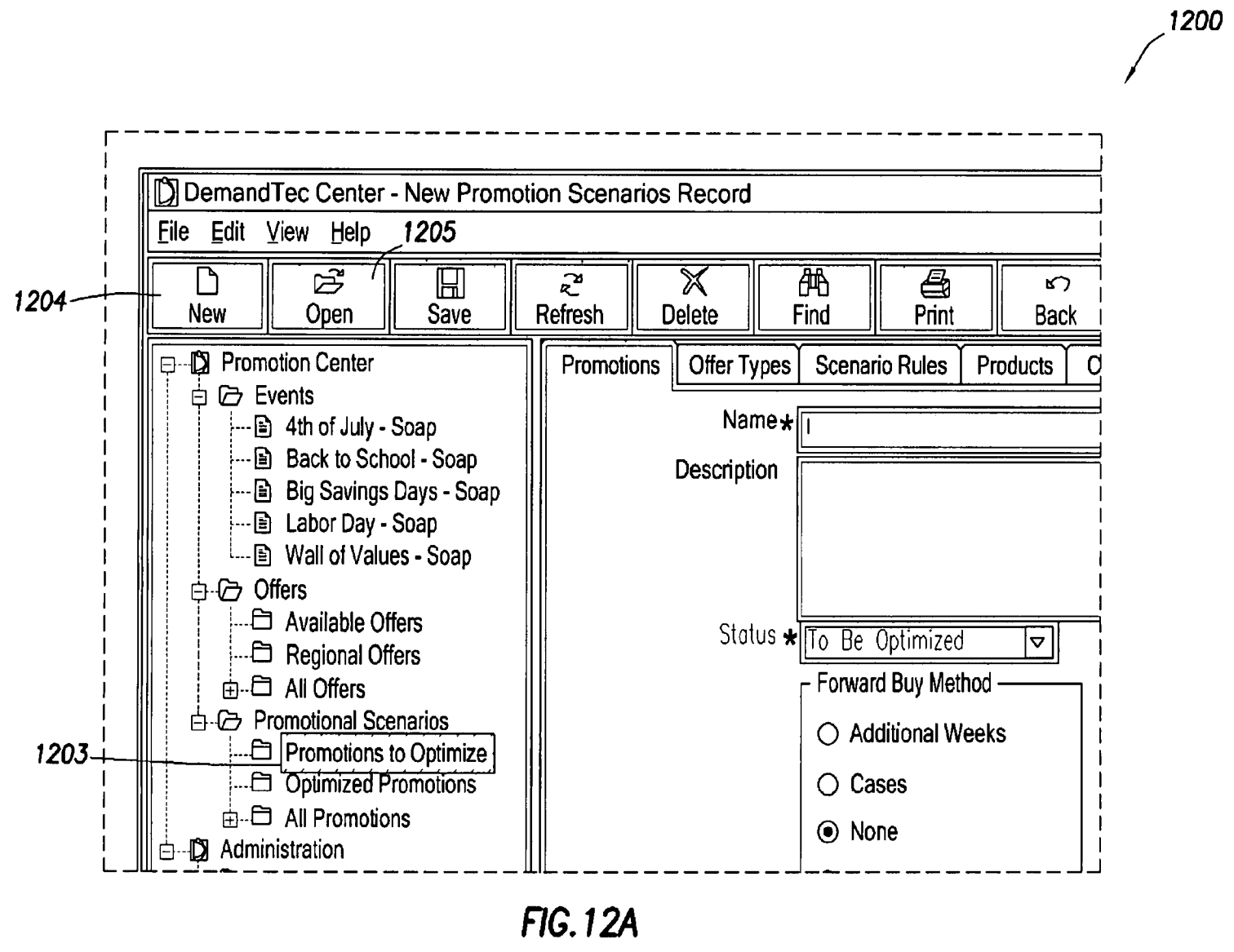
Figure 12B:
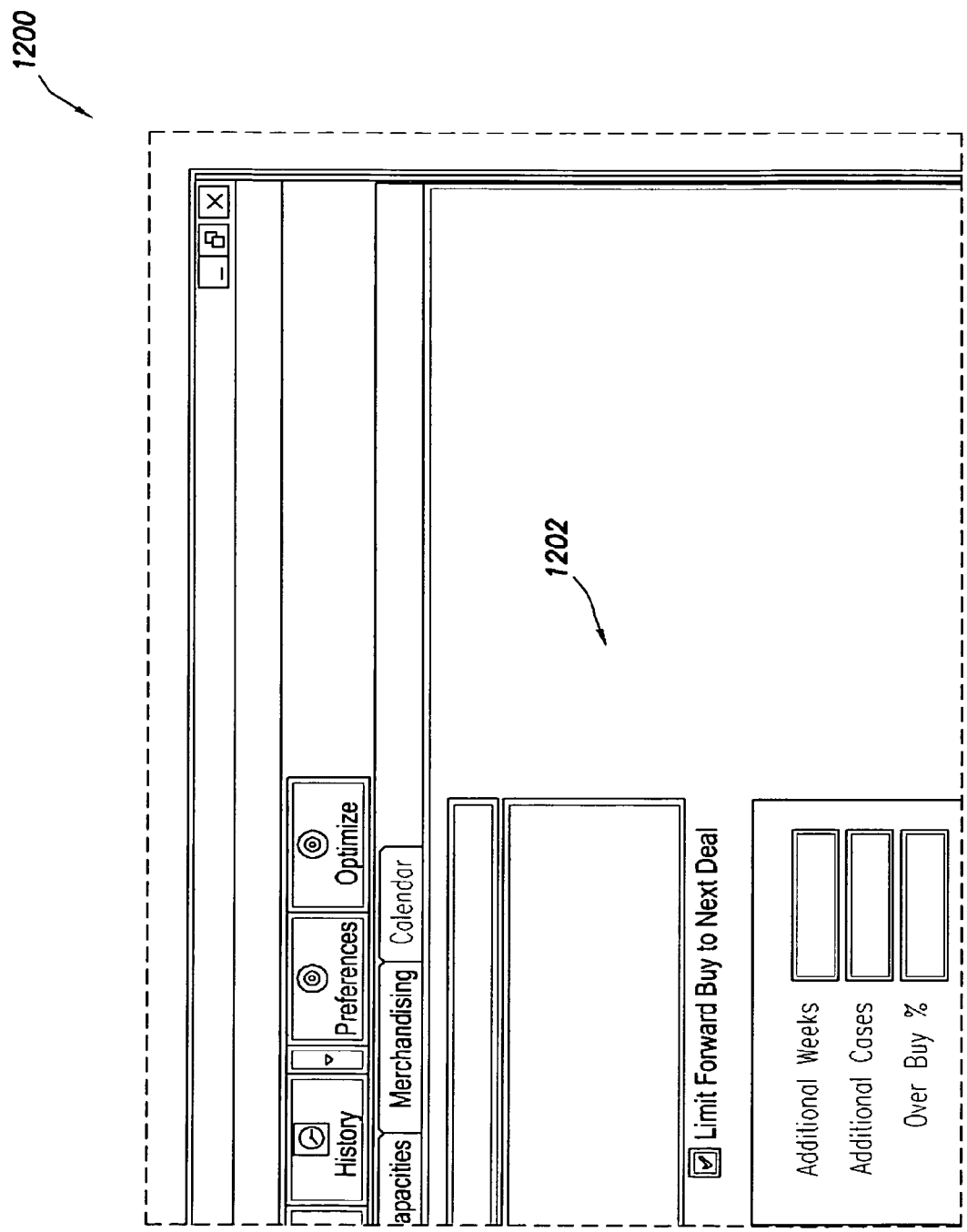
Figure 12C:
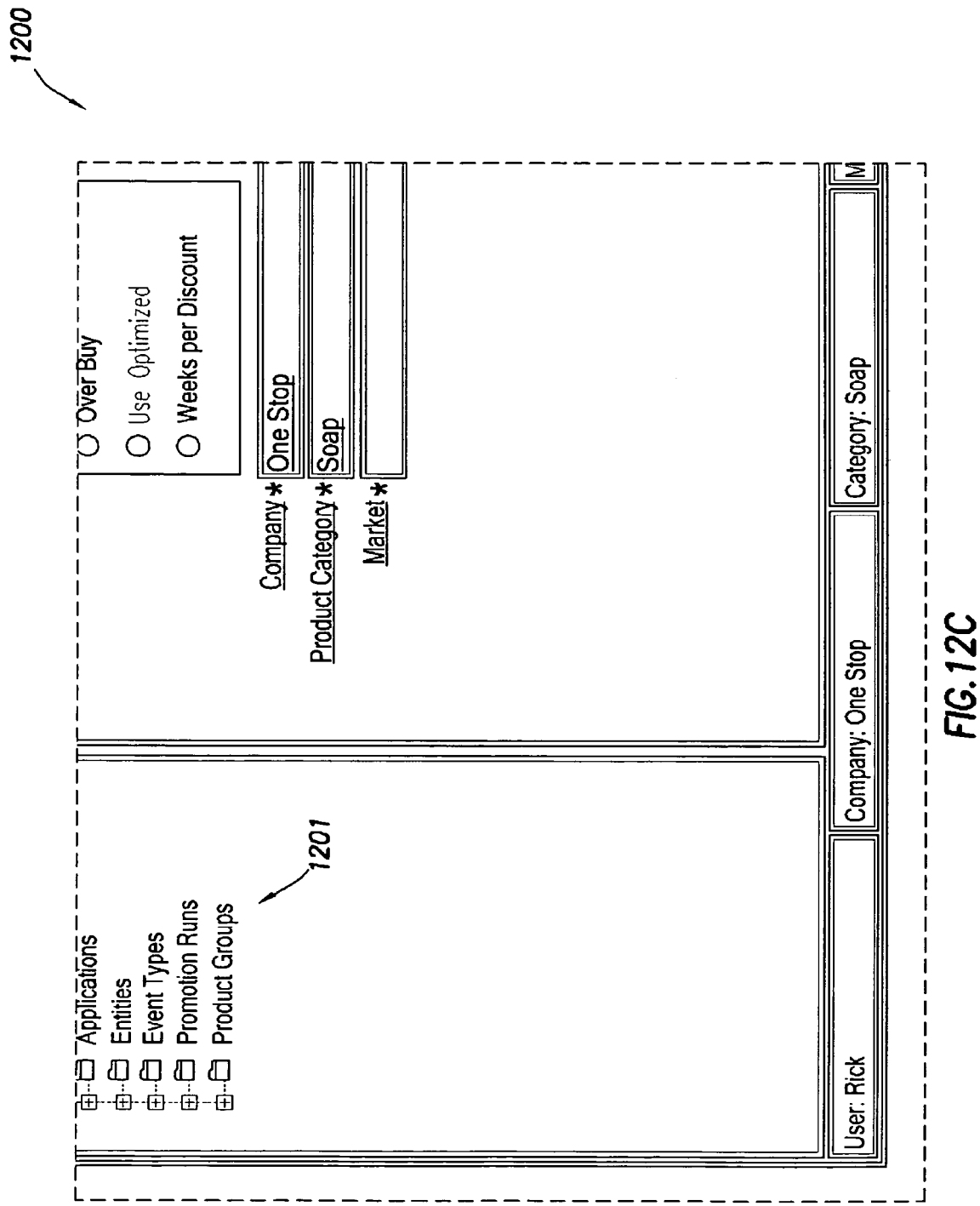
Figure 12D:
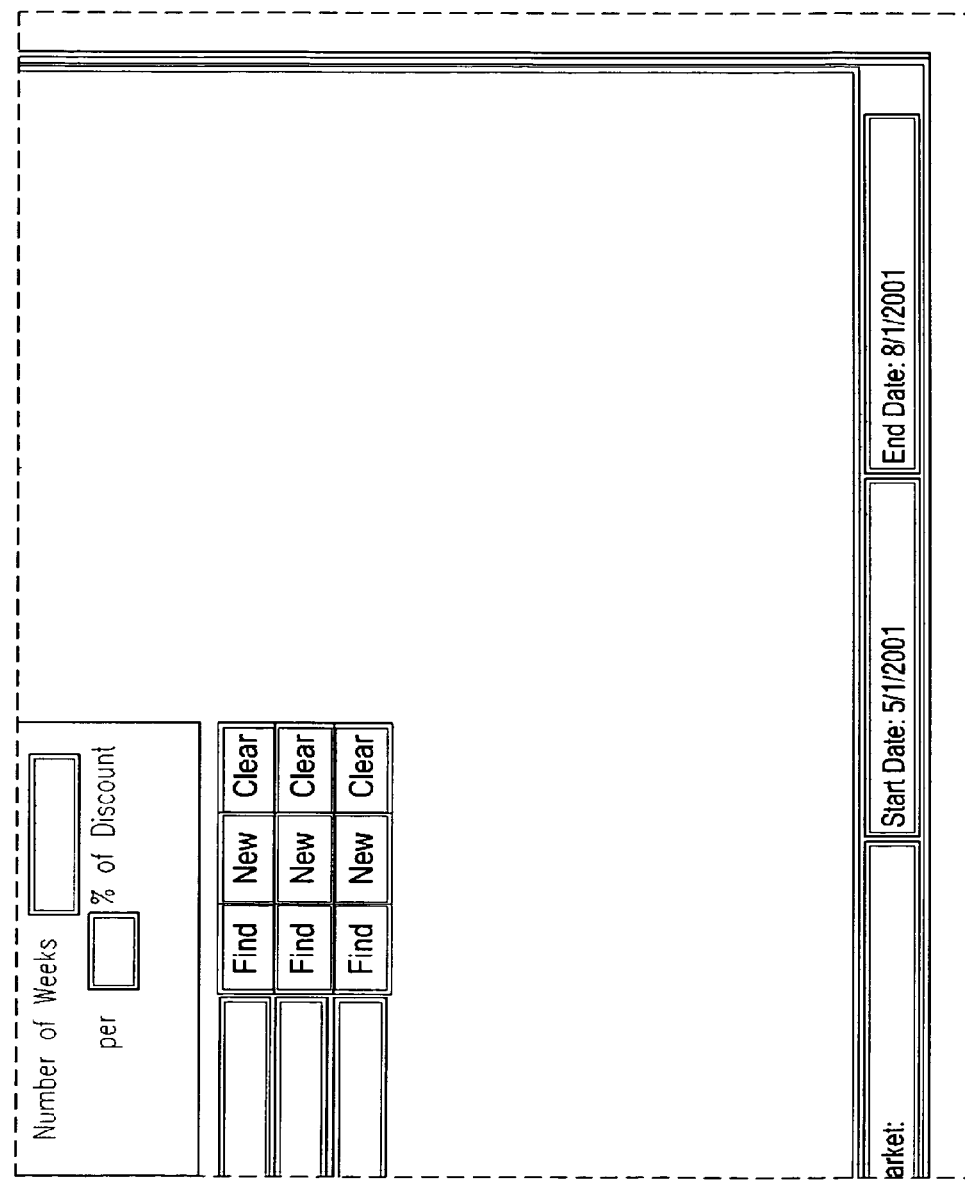

Once a plurality of promotion events and offers have been configured, the user can configure a promotion scenario, or promotion plan, for optimization. FIG. 12 is a diagram depicting a promotion scenario configuration template 1200 according to the exemplary embodiment. The template 1200 is provided to the user's web browser when a new button (1204) is selected (for configuration of a new promotion scenario) or when an existing promotion scenario 1203 is selected within object directory area 1201 and opened via open button 1205. The template 1200 has a promotion configuration area 1202 for viewing summary information about a new/existing promotion scenario.

Figure 13:
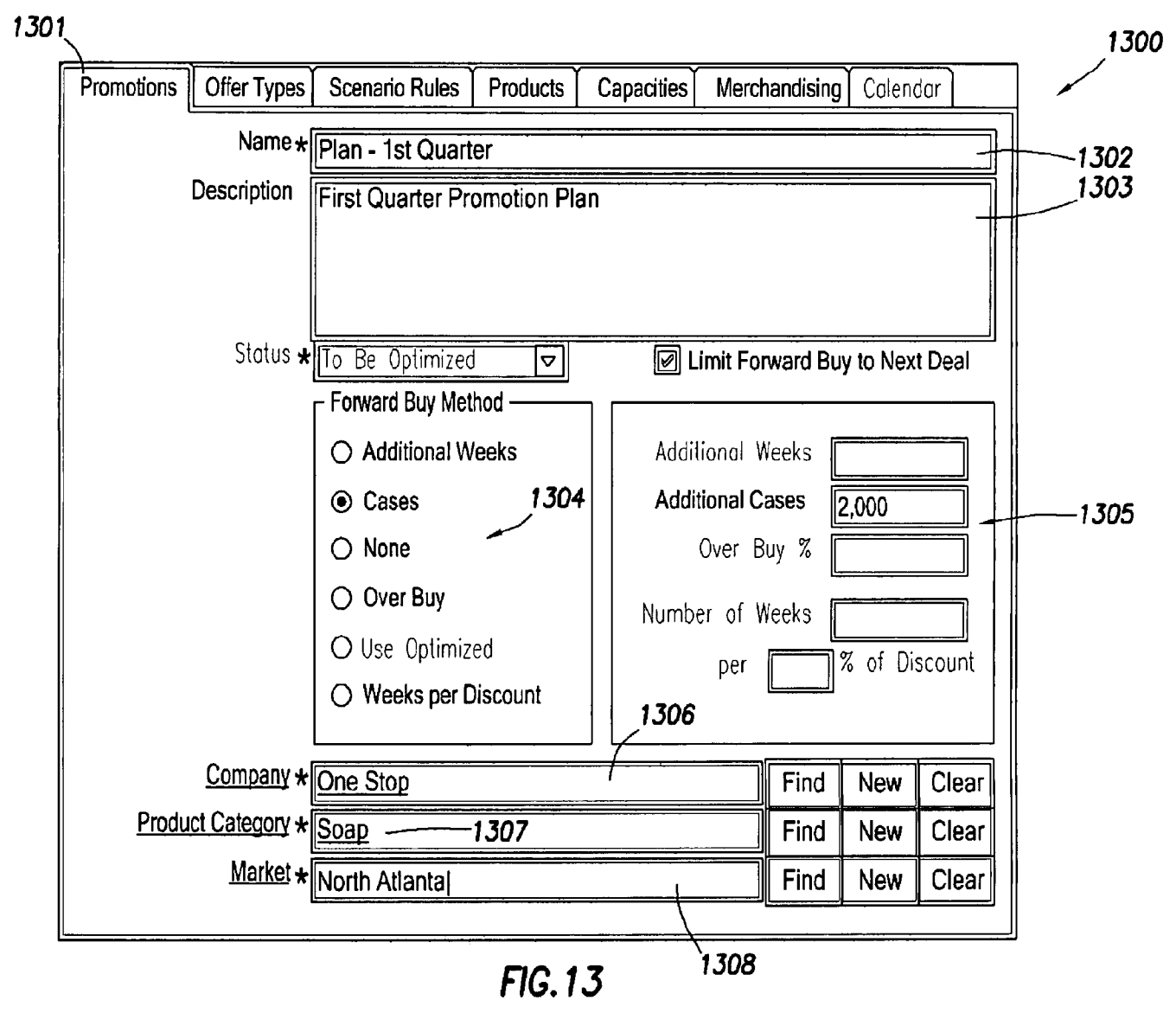

FIG. 13 is a diagram portraying a promotions area 1300 within the configuration template of FIG. 12. The promotions area 1300 is provided to the user's web browser via selection of promotion tab 1301 and enables the user to prescribe summary information for a promotion scenario to include name (field 1302), description (field 1303), forward buy method (via buttons in area 1304), parameters for selected forward buy method (via fields in area 1305), company (field 1306), product category (1307), and market (field 1308).

Figure 14:
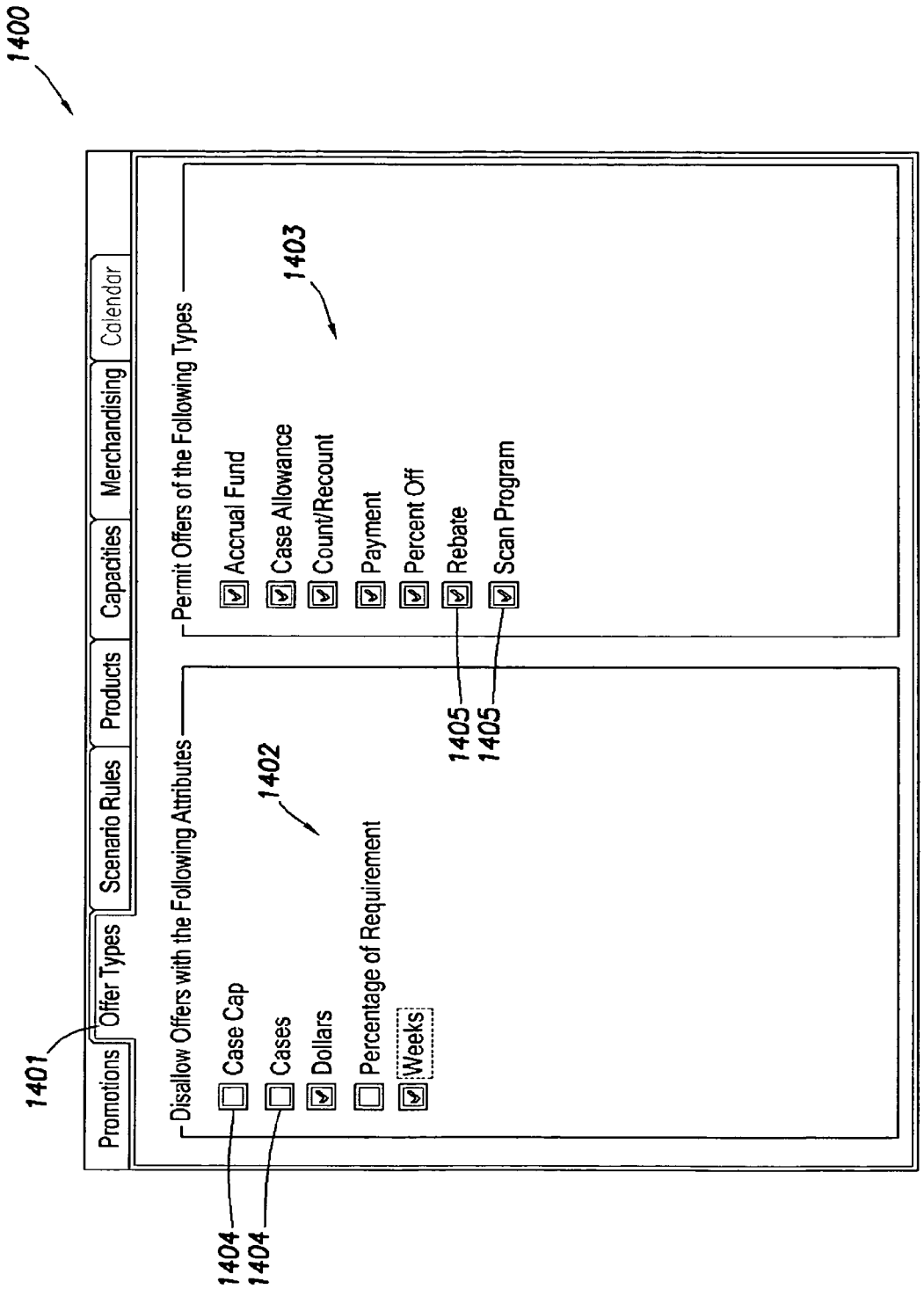
FIG. 14 is a diagram portraying an offer types area within the configuration template of FIG. 12.

FIG. 14 is a diagram portraying an offer types area 1400 within the configuration template of FIG. 12. The offer types area 1400 is provided to the user's web browser via selection of offer types tab 1401 and enables the user to specify parameters to enable or exclude certain supplier offers for consideration during optimization of a promotion plan. The offers area 1400 has a disallow offers field 1402 that provides a plurality of offer attribute checkboxes 1404 enabling the user to prescribe particular offer attributes that exclude certain supplier offers from consideration such as case cap, cases, dollars, percentage of requirement, and weeks. The area 1400 also has a permit offers area 1403 providing checkboxes 1405 for selection of offer types to include in an optimization. The offer type selections include accrual fund, case allowance, count/recount, payment, percent off, rebate, and scan program.

Figure 15:
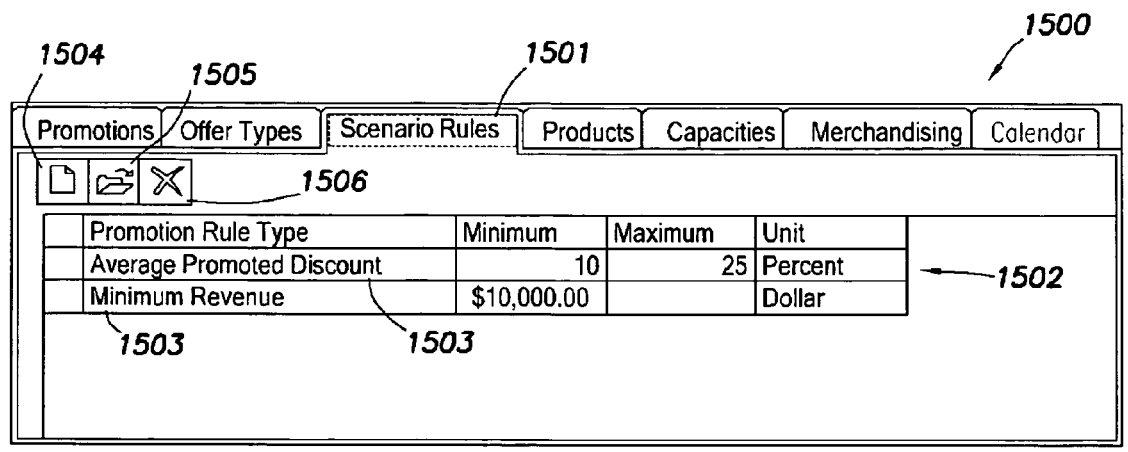
FIG. 15 is a diagram showing a scenario rules area within the configuration template of FIG. 12.

FIG. 15 is a diagram showing a scenario rules area 1500 within the configuration template of FIG. 12. The scenario rules area 1500 enables the user to view a list of rules 1502 that have been established to constrain optimization of the promotion scenario. The rules area is provided in response to selection of scenario rules tab 1501. Each rule 1503 is listed in the list area 1502. A selected rule 1503 can be opened via open button 1505 or deleted via delete button 1506. A new rule button 1504 enables the user to configure a new rule to constrain the optimization scenario.

Figure 16:
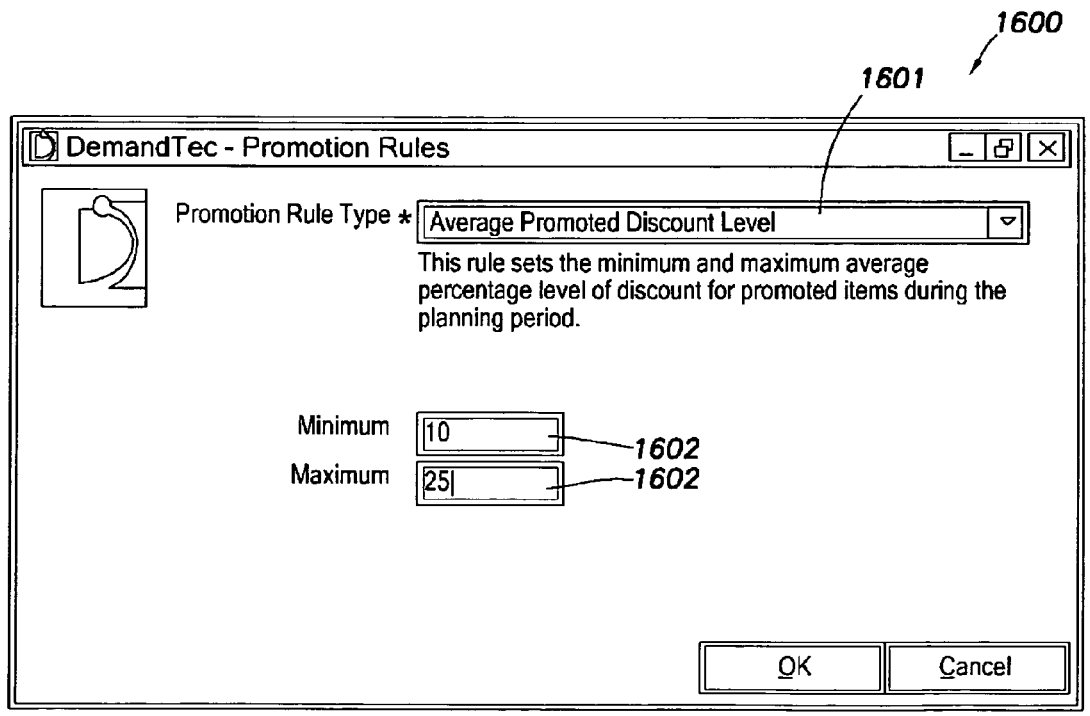
FIG. 16 is a diagram illustrating a rule specification template according to the exemplary embodiment.

When the user selects the new rule button 1504, a rule specification template 1600 is provided, as shown in FIG. 16. The rule template 1600 has a promotion rule type chooser 1601 that enables the user to choose from a plurality of rule types for constraint of the optimization. Upon selection of a particular rule type via chooser 1601, associated fields 1602 are provided to allow the user to enter parameters corresponding to the selected rule type.

Figure 17:
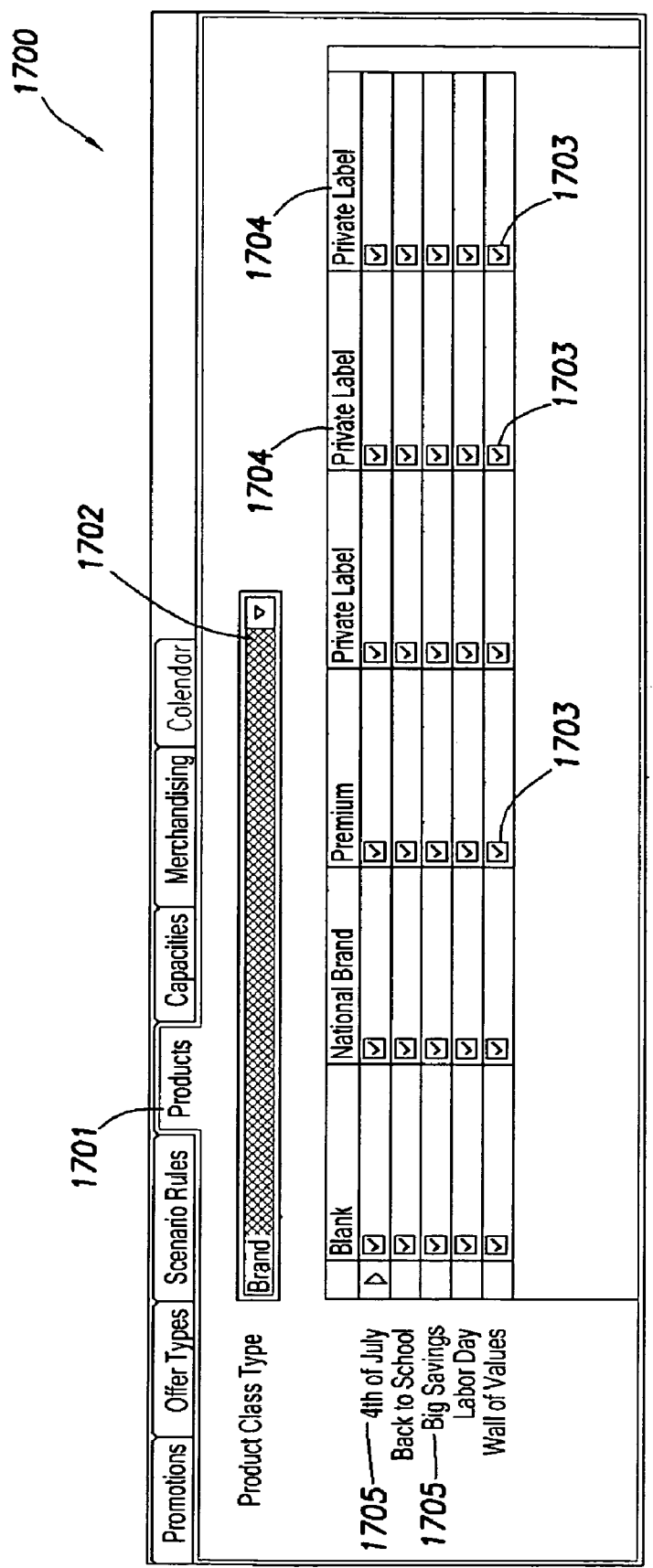
FIG. 17 is a diagram featuring a products area within the configuration template of FIG. 13.

FIG. 17 is a diagram featuring a products area 1700 within the configuration template of FIG. 13. The products area 1700 is selected via products tab 1701 and enables the user to associate products with promotion event types. The user first chooses a product class via chooser 1702. Exemplary product classes include brand and size. Following selection of product class via chooser 1702, checkboxes 1703 are provided to enable the user to specify which members 1704 of the selected product class are to be associated with each promotion event 1705 under consideration for the optimization.

Figure 18:
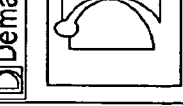
FIG. 18 is a diagram depicting a capacities area within the configuration template of FIG. 13.

FIG. 18 is a diagram depicting a capacities area 1800 within the configuration template of FIG. 13. The capacities area 1800 is provided in response to selection of a capacities tab 1801 and enables the user to prescribe, for a previously selected market, start date (via field 1802) and end date (via field 1803) bounding a merchandising capacity assessment provided in area 1804. Within area 1804, the user prescribes capacities of the previously selected market (i.e., a store or group of stores) for each of the merchandising, or promotion events associated with the optimization.

Figure 19:
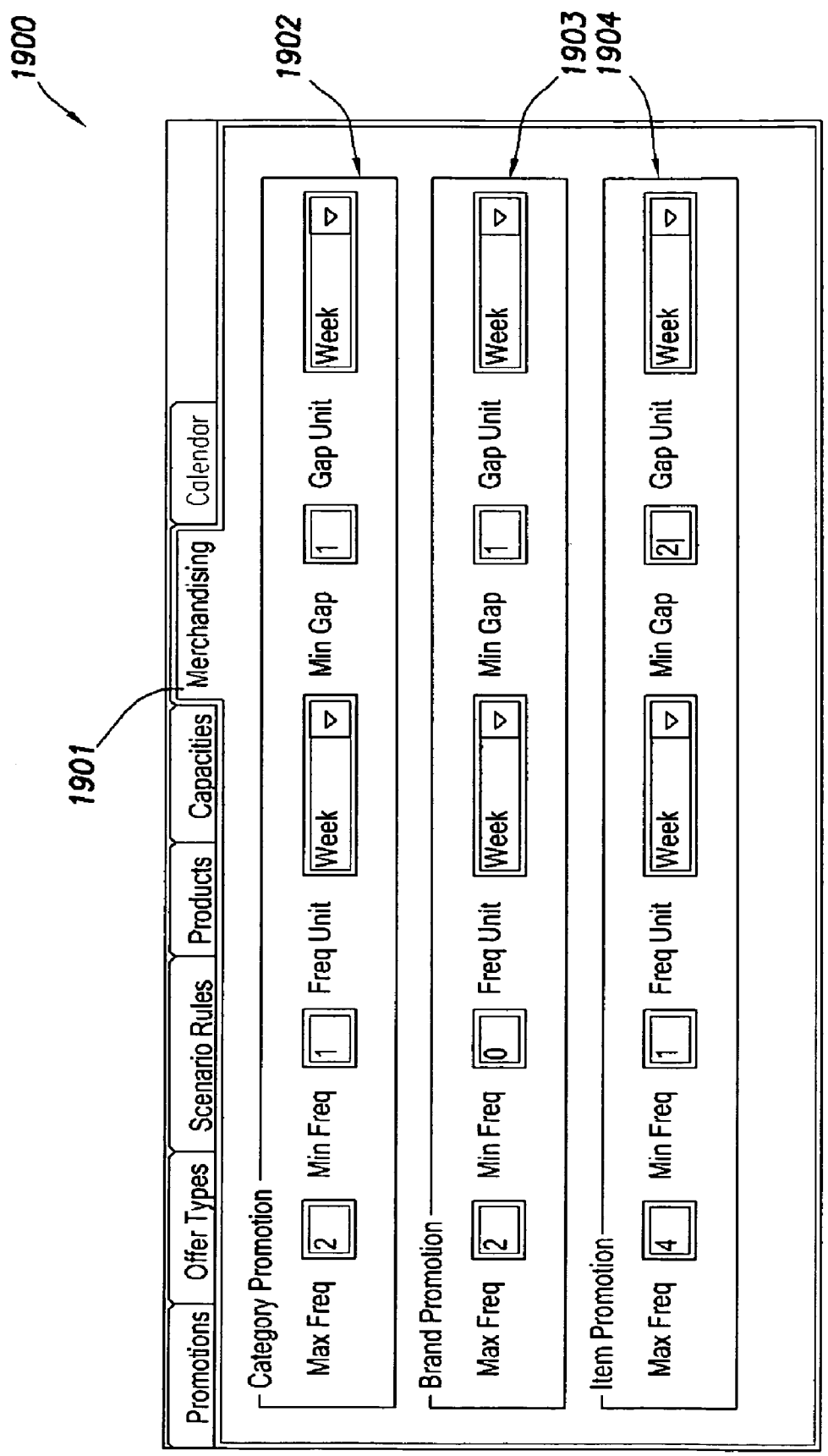
FIG. 19 is a diagram portraying a merchandising area within the configuration template of FIG. 13.

FIG. 19 is a diagram portraying a merchandising area 1900 within the configuration template of FIG. 13. The merchandising area 1900 is provided in response to selection of merchandising tab 1901 and enables the user to specify merchandising event constraints (e.g., maximum event frequency, minimum event frequency, frequency units, minimum gap between events, and gap units) for promotion events corresponding to product category (area 1902), product brand (area 1903), and item (area 1904).

Upon specification of optimization scenario parameters via the templates described with reference to FIGS. 13–19, the user can select to perform a promotion plan optimization by selecting the optimize button 610 described with reference to FIG. 6. Upon selection of the optimize button 610, a promotion scenario selection template 2000 within an optimization wizard according to the exemplary embodiment is provided as shown in FIG. 20. The promotion scenario template 2000 has a chooser 2001 whereby the user selects a specific promotion plan that has previously been configured, for optimization.

Figure 21:
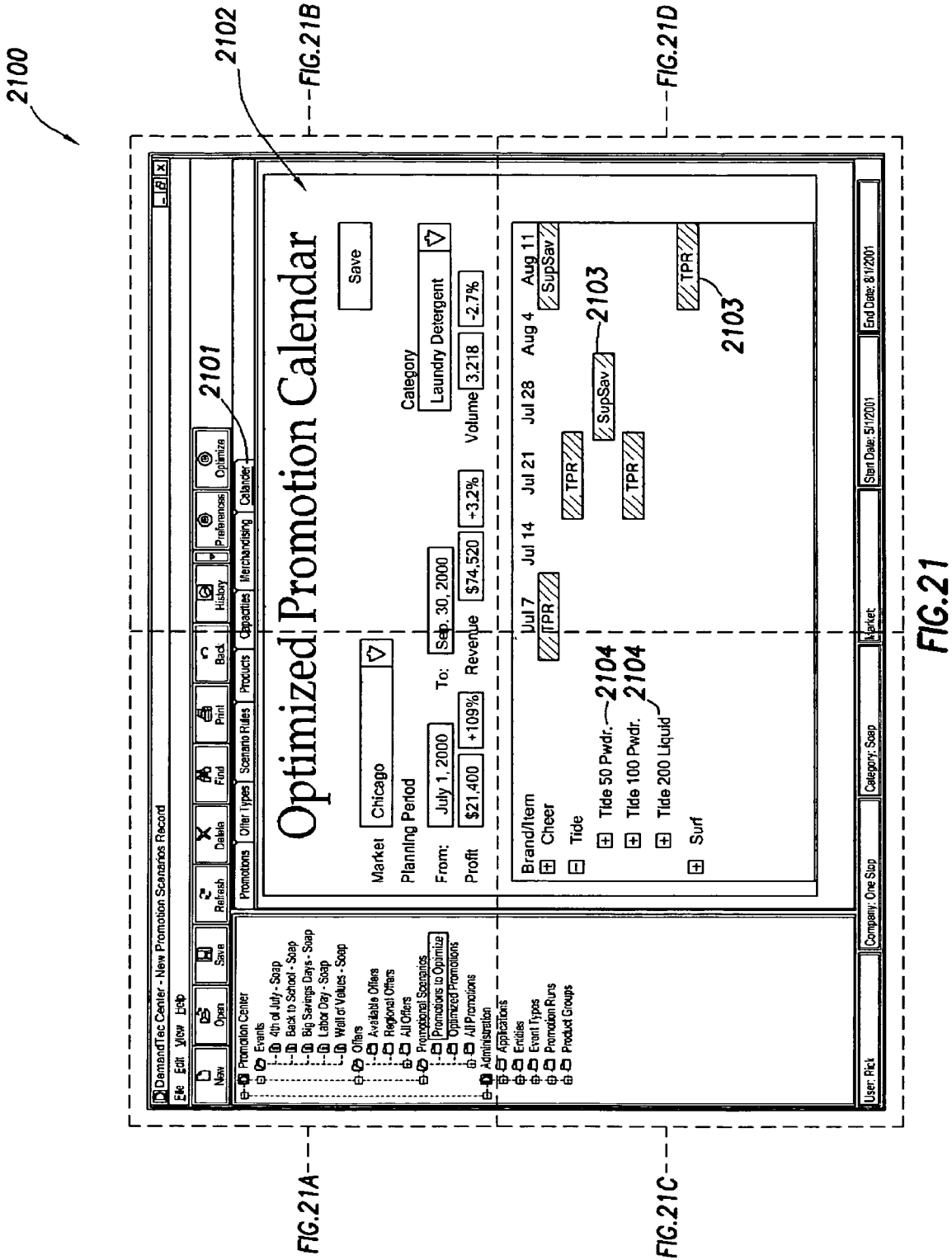
FIG. 21 is a diagram illustrating a results template featuring an optimized promotion calendar according to the exemplary embodiment.
Figure 21A:
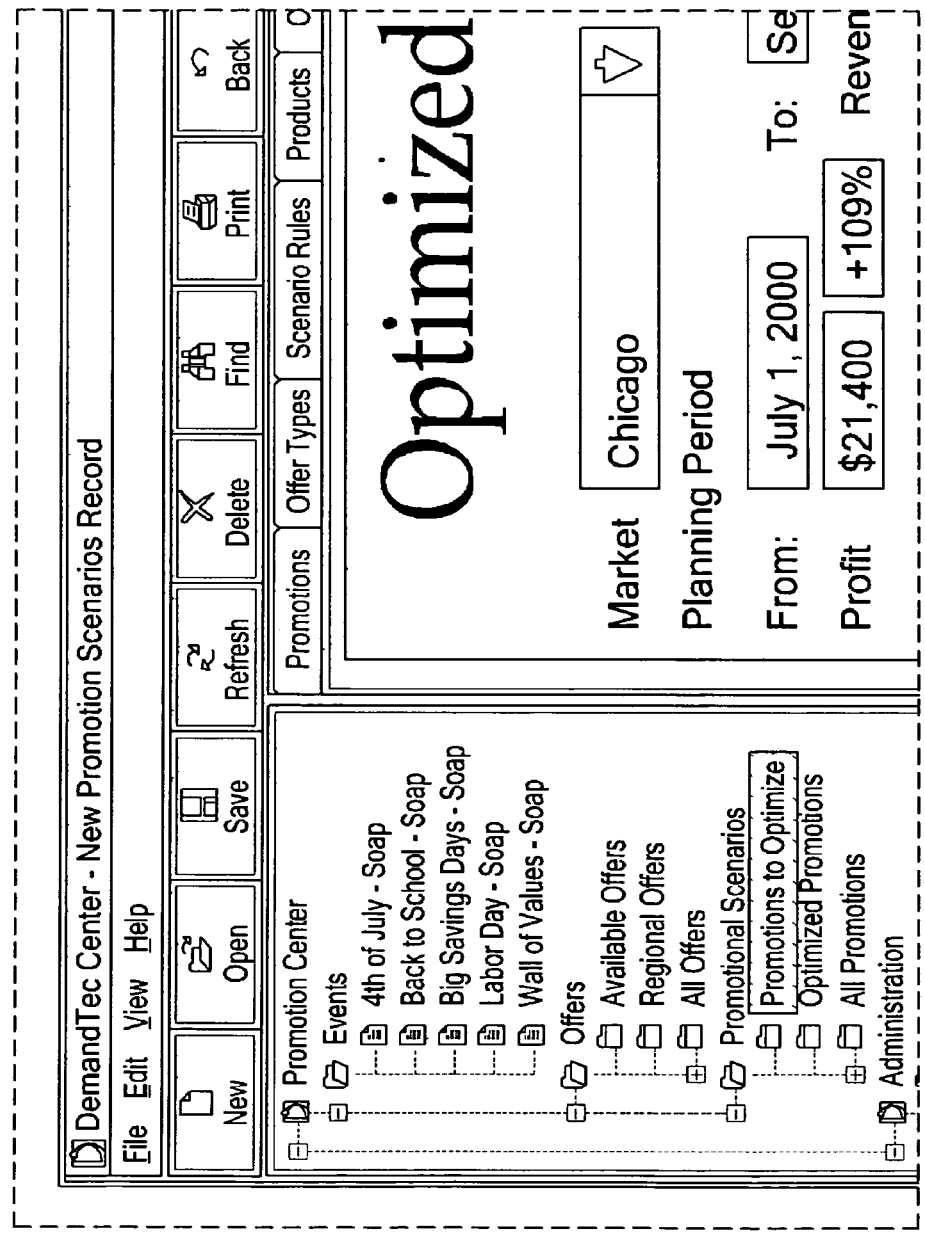
Figure 21B:
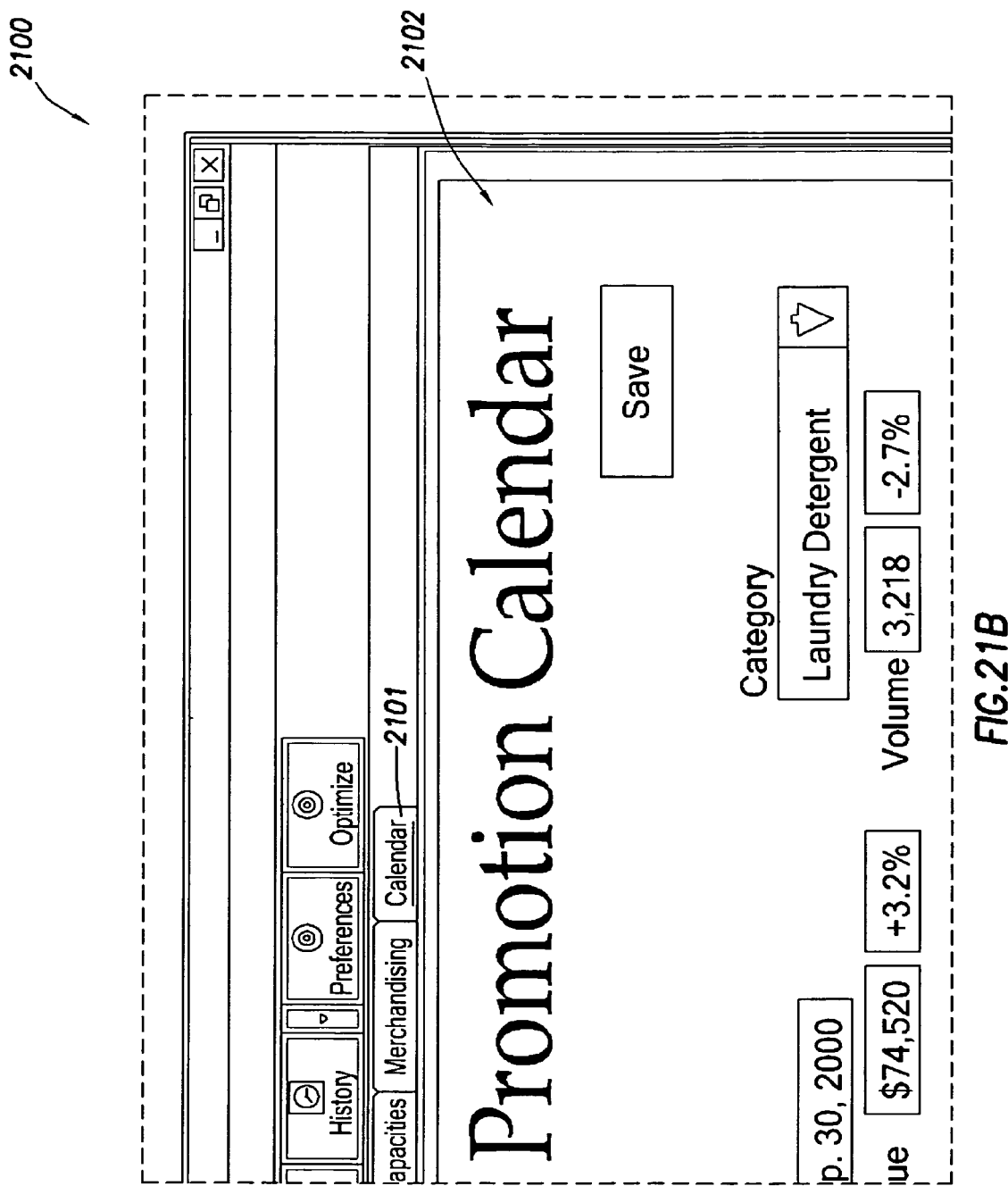
Figure 21C:
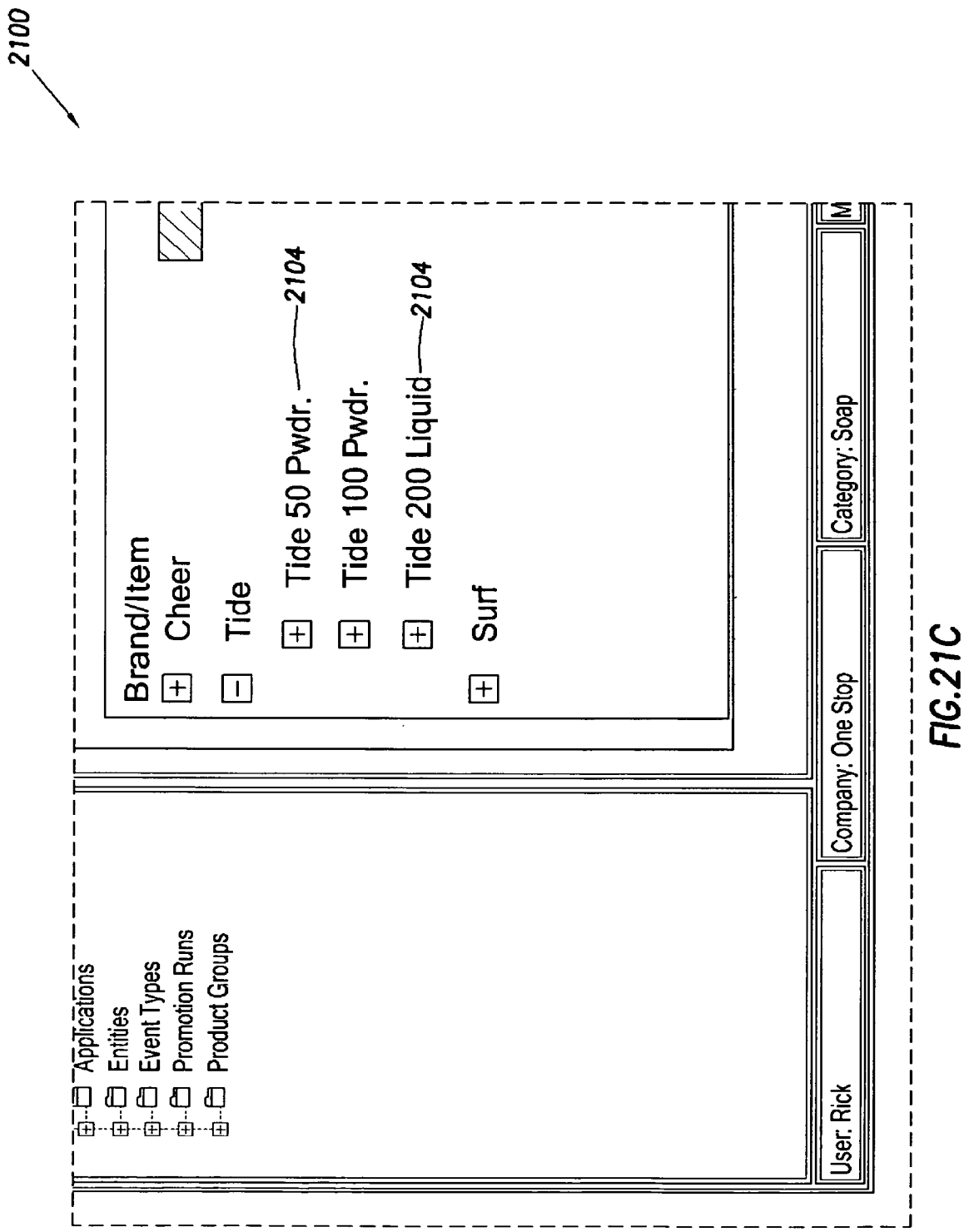
Figure 21D:
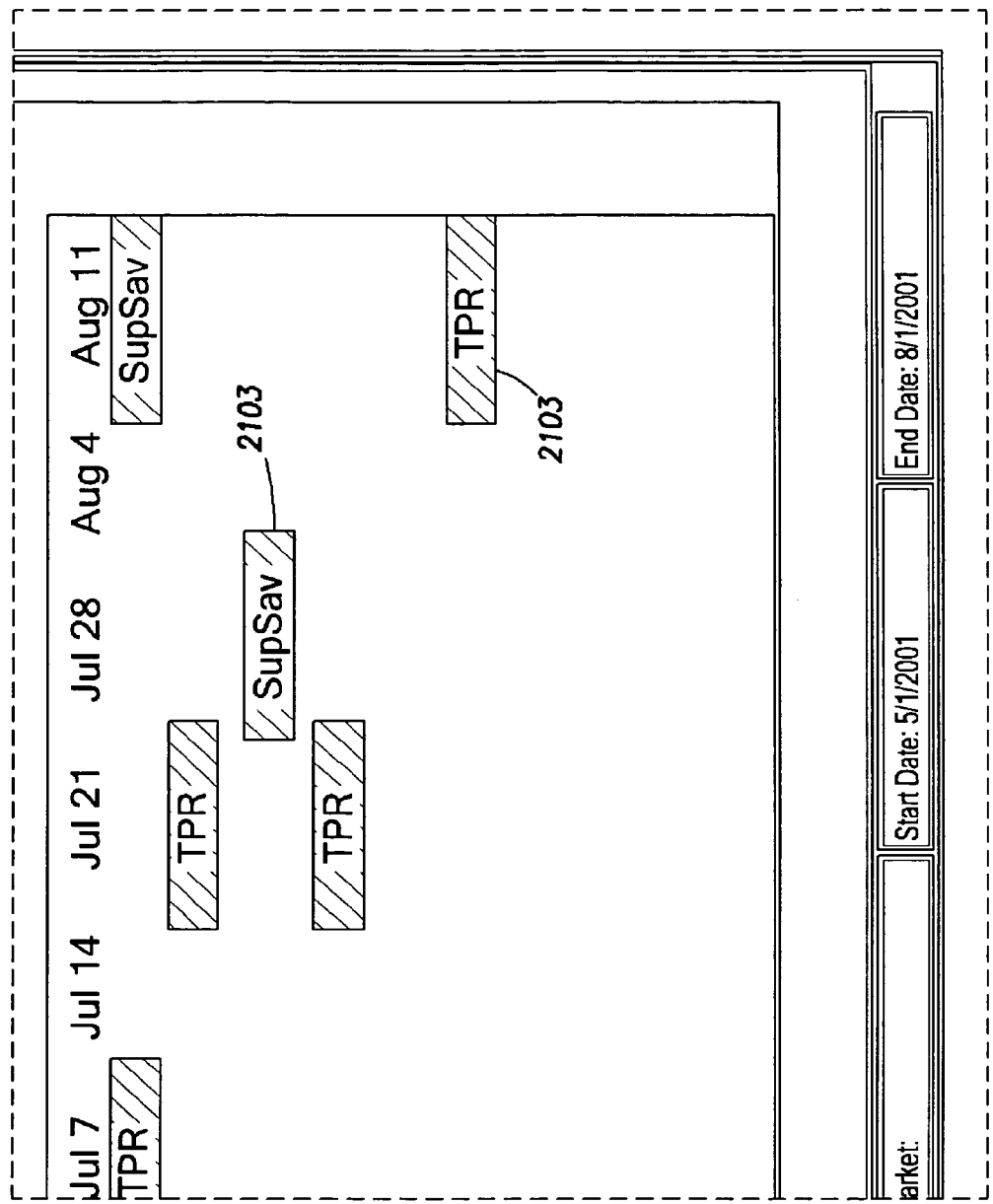

Now referring to FIG. 21, a diagram is presented illustrating a results template 2100 featuring an optimized promotion calendar according to the exemplary embodiment. The results template 2100 is selected via calendar tab 2101 for a given promotion scenario that has been optimized. The template 2100 has an optimized calendar area 2102 that graphically depicts an optimized promotion calendar corresponding to a selected, and optimized promotion scenario. The calendar area 2101 provides an optimum schedule of promotion events 2103 for products 2104 that have been selected for inclusion in the optimization.

Figure 22:
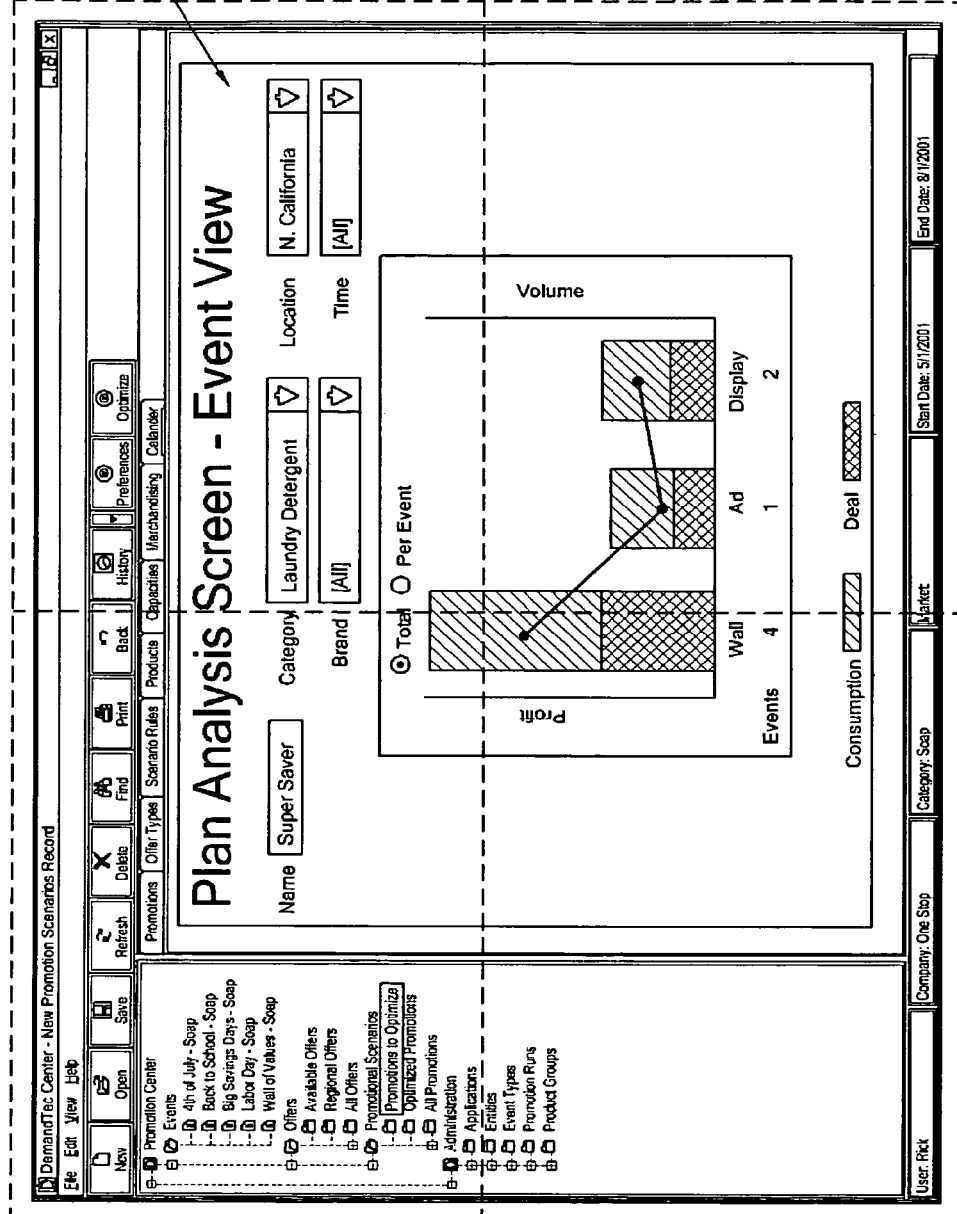
FIG. 22 is a diagram showing a results template that features an event view window according to the exemplary embodiment.
Figure 22A:
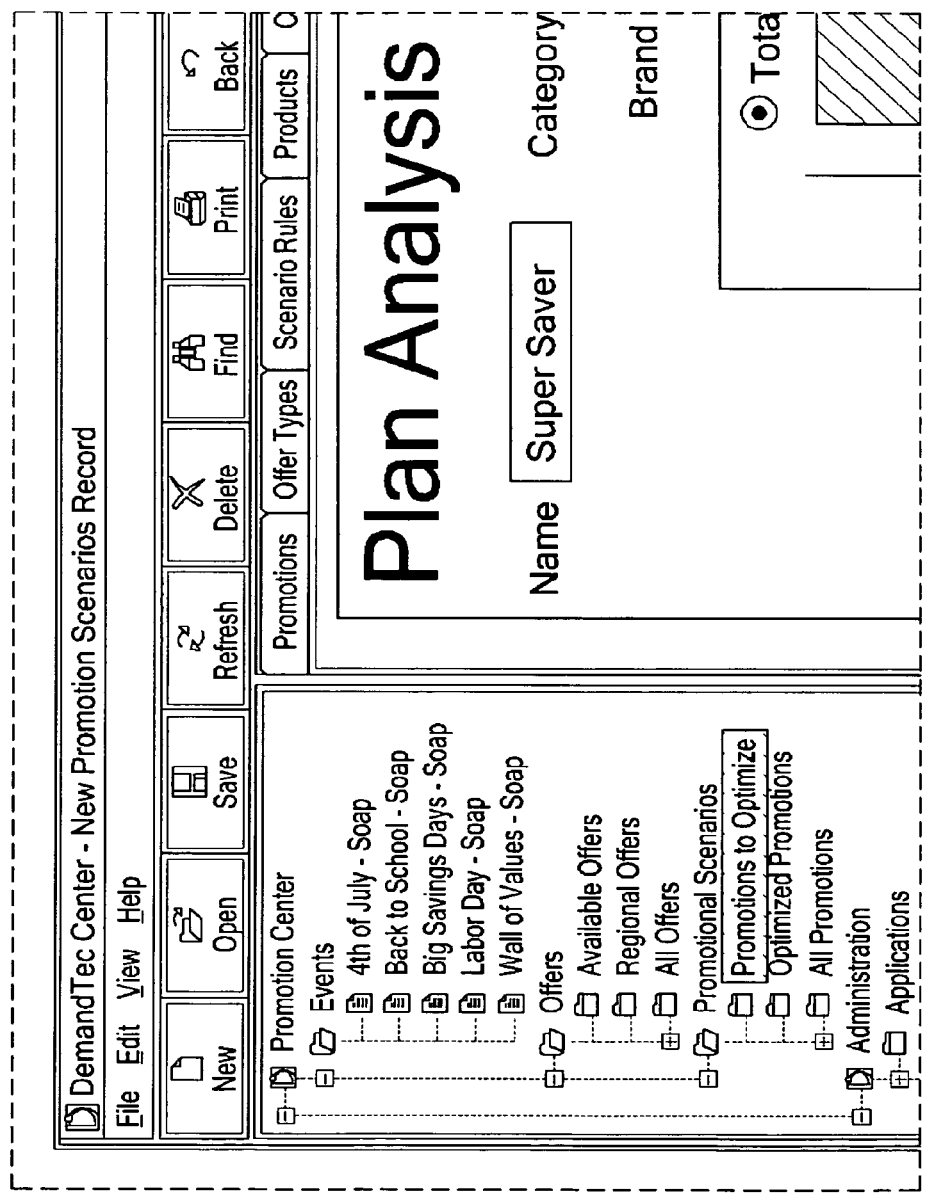
Figure 22B:
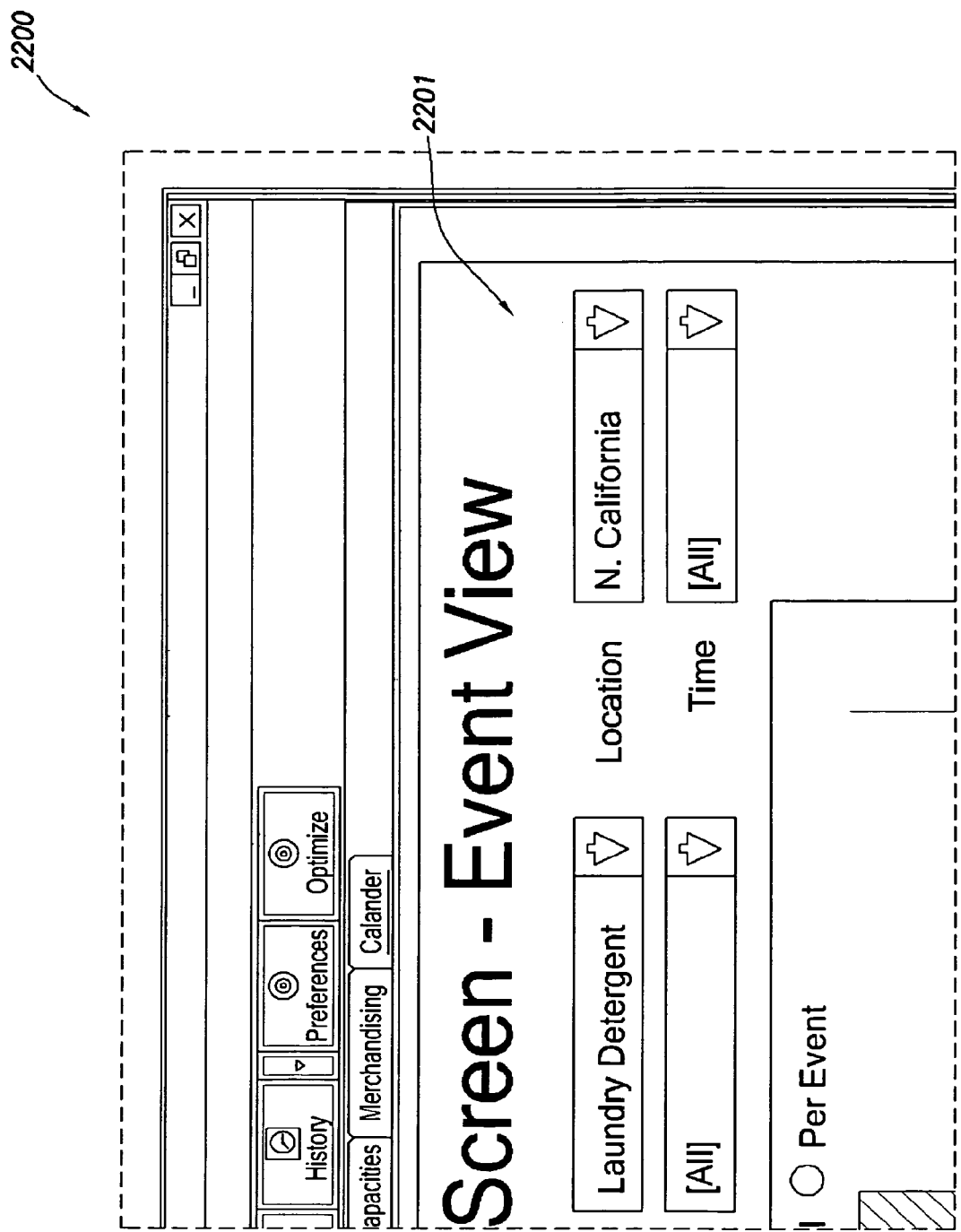
Figure 22C:
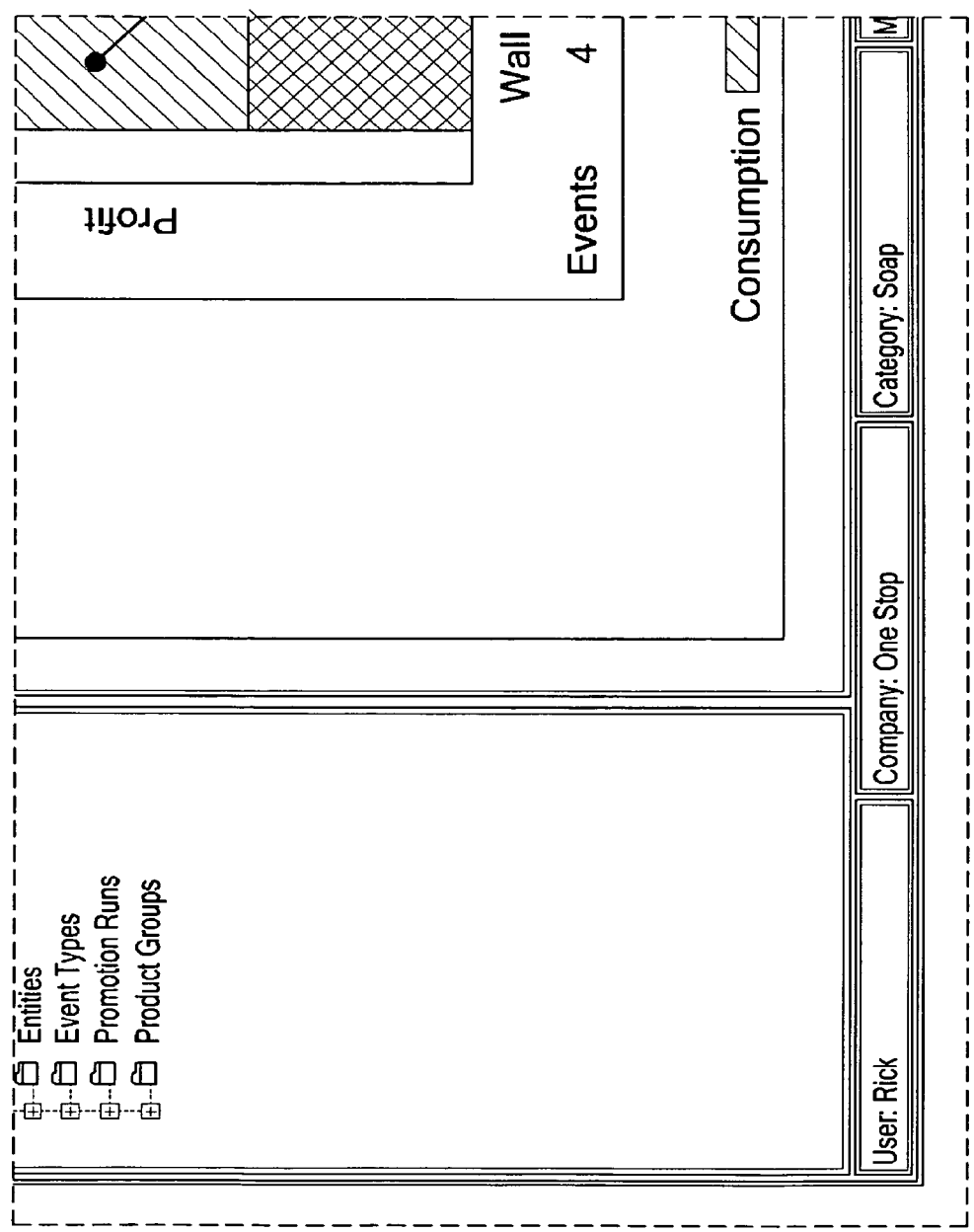

Now referring to FIG. 22, a diagram is presented showing a results template 2200 that features an event view window 2201 according to the exemplary embodiment. The event view window 2201 graphically portrays optimized promotion plan results for each type of activity associated with a particular promotion event that is part of the optimized plan.

Although the present invention and its objects, features, and advantages have been described in detail, other embodiments are encompassed by the invention as well. For example, the present invention has been particularly characterized as a web-based system whereby clients and suppliers access a centralized network operations center in order to perform optimizations. However, the scope of the present invention is not limited to application within a client-server architecture that employs the Internet as a communication medium. Direct client connection is also provided for by the system according to the present invention.

In addition, the present invention has been particularly characterized in terms of a servers, controllers, and management logic for optimization of various merchandising parameters. These elements of the present invention can also be embodied as application program modules that are executed on a WINDOWS NT® UNIX®-based operating system.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. A method for optimizing a promotion plan for merchandising products, comprising:
utilizing a computer-based scenario/results processor within an optimization server to present a sequence of data entry templates to a user, whereby the user specifies an optimization scenario, wherein said utilizing comprises:
first providing a promotion event configuration template, for prescribing the potential promotion events;
second providing a supplier offer configuration template, for prescribing the potential supplier offers; and
third providing a promotion scenario configuration template, for associating the potential promotion events to the products, wherein said third providing comprises:
specifying a forward buy method;
enabling/disabling certain ones of the potential supplier offers;
adding rules and constraints to the optimization scenario; and
indicating store merchandising capacities;
within the optimization server, modeling the relationship between potential prices of the products and market demand for the products, wherein the potential prices correspond to potential promotion events and potential supplier offers;
within the optimization server, estimating demand chain costs for the products according to the modeled market demand, wherein the demand chain costs include fixed and variable costs for the products;

within the optimization server, employing the market demand and the demand chain costs to determine optimum promotion events and optimum supplier offers, wherein the optimum promotion events and optimum supplier offers maximize a merchandising performance figure of merit according to the optimization scenario; and generating a plurality of optimization results templates and providing these templates to the user, wherein the optimum promotion events and optimum supplier offers are presented.

2. The method as recited in claim 1, wherein said utilizing comprises:

acquiring data corresponding to the optimization scenario from the user; and formatting the data into a format suitable for performing a promotion plan optimization according to the optimization scenario.

3. The method as recited in claim 2, wherein said acquiring comprises:

obtaining the data from the user over a data network that employs a packet-switched protocol.

4. The method as recited in claim 3, wherein said acquiring further comprises:

employing TCP/IP protocol to obtain the data over the Internet.

5. The method as recited in claim 2, wherein the data is interactively provided by the user.

6. The method as recited in claim 2, wherein the data is acquired from a source electronic file that is designated by the user.

7. The method as recited in claim 1, wherein the data entry templates and the optimization results templates are generated in hypertext markup language (HTML).

8. The method as recited in claim 1, wherein the data entry templates and the optimization results templates are generated in extensible markup language (XML).

9. The method as recited in claim 1, wherein the data entry templates and the optimization results templates are generated as applets.

10. The method as recited in claim 1, wherein said utilizing comprises:

providing an optimization template, for specifying a promotion scenario and a time period for which the optimum promotion plan is to be determined.

11. The method as recited in claim 1, wherein said generating comprises:

providing an optimization results template, for supplying the user with scenario results corresponding to the optimization scenario, wherein the scenario results include selected ones of the potential promotion events and selected ones of the potential supplier offers.

* * * * *

UNITED STATES PATENT AND TRADEMARK OFFICE
CERTIFICATE OF CORRECTION

PATENT NO. : 7,130,811 B1
APPLICATION NO. : 09/849621
DATED : October 31, 2006
INVENTOR(S) : Phil Delurgio et al.

Page 1 of 1

It is certified that error appears in the above-identified patent and that said Letters Patent is hereby corrected as shown below:

On the Title Page of the Patent, Item (75) Inventors: replace "Hua Lee", with -- Hau Lee --.

Signed and Sealed this
Eighth Day of October, 2013

Teresa Stanek Rea
*Deputy Director of the United States Patent and Trademark Office*